US012438283B2

(12) United States Patent
Choi et al.

(10) Patent No.: US 12,438,283 B2
(45) Date of Patent: Oct. 7, 2025

(54) ANTENNA MODULE ARRANGED IN VEHICLE

(71) Applicant: LG ELECTRONICS INC., Seoul (KR)

(72) Inventors: Kukheon Choi, Seoul (KR); Kangjae Jung, Seoul (KR); Ilnam Cho, Seoul (KR); Byungwoon Jung, Seoul (KR); Soyeon Lee, Seoul (KR); Dongjin Kim, Seoul (KR); Byeongyong Park, Seoul (KR); Uisheon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/998,975

(22) PCT Filed: Aug. 2, 2022

(86) PCT No.: PCT/KR2022/011425
§ 371 (c)(1),
(2) Date: Jan. 27, 2025

(87) PCT Pub. No.: WO2024/029641
PCT Pub. Date: Feb. 8, 2024

(65) Prior Publication Data
US 2025/0260178 A1 Aug. 14, 2025

(51) Int. Cl.
*H01Q 21/06* (2006.01)
*H01Q 1/12* (2006.01)

(52) U.S. Cl.
CPC ............. *H01Q 21/064* (2013.01); *H01Q 1/12* (2013.01); *H01Q 1/1271* (2013.01)

(58) Field of Classification Search
CPC ....... H01Q 21/064; H01Q 1/1271; H01Q 1/12
See application file for complete search history.

(56) References Cited

U.S. PATENT DOCUMENTS

| | | | | |
|---|---|---|---|---|
| 2012/0068896 A1* | 3/2012 | White | H01Q 1/1271 343/713 |
| 2018/0151939 A1 | 5/2018 | Hashimoto et al. | |

(Continued)

FOREIGN PATENT DOCUMENTS

| | | |
|---|---|---|
| KR | 10-1116851 | 3/2012 |
| KR | 10-1945397 | 2/2019 |

(Continued)

OTHER PUBLICATIONS

PCT International Application No. PCT/KR2022/011425, International Search Report dated May 2, 2023, 4 pages Application No. 10-2024-7016534, Notice of Allowance dated Oct. 4, 2024,.

(Continued)

*Primary Examiner* — Hai V Tran
(74) *Attorney, Agent, or Firm* — LEE, HONG, DEGERMAN, KANG & WAIMEY

(57) ABSTRACT

The vehicle comprises: a metal frame having an opening formed therein; a glass panel including a transparent area and an opaque area; and an antenna assembly disposed on the glass panel. The antenna assembly comprises: a first dielectric substrate which is disposed on the transparent area of the glass panel, and which has a first transparent antenna and a second transparent antenna formed on one surface thereof, a second dielectric substrate which includes a first ground area and a second ground area, and which is disposed in a recessed portion of the metal frame and in the opaque area of the glass panel; and a slot pattern formed in a pattern area arranged between the first ground area and the second ground area.

20 Claims, 40 Drawing Sheets

(56) References Cited

U.S. PATENT DOCUMENTS

| | | | | |
|---|---|---|---|---|
| 2020/0176872 | A1 | 6/2020 | Baranski | |
| 2022/0320736 | A1* | 10/2022 | Jung | H01Q 1/48 |
| 2023/0094098 | A1* | 3/2023 | Kim | H01Q 1/48 343/713 |
| 2023/0099558 | A1* | 3/2023 | Jung | H01Q 5/385 343/713 |
| 2023/0163450 | A1* | 5/2023 | Lee | H01Q 1/48 343/702 |
| 2023/0261357 | A1* | 8/2023 | Jung | H01Q 1/48 343/713 |
| 2024/0014538 | A1* | 1/2024 | Park | H01Q 1/52 |

FOREIGN PATENT DOCUMENTS

| | | |
|---|---|---|
| KR | 10-2020-0039321 | 4/2020 |
| KR | 10-2022-0123133 | 9/2022 |
| KR | 10-2022-0131335 | 9/2022 |
| WO | 2021241962 | 12/2021 |
| WO | 2022075587 | 4/2022 |

OTHER PUBLICATIONS

Korean Intellectual Property Office Application No. 10-2024-7016534, Notice of Allowance dated Oct. 4, 2024, 3 pages.

European Patent Office Application Serial No. 22954096.8, Search Report dated Jun. 17, 2025, 7 pages.

* cited by examiner (a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(c)

ANTENNA MODULE ARRANGED IN VEHICLE

CROSS-REFERENCE TO RELATED APPLICATION

This application is the National Stage filing under 35 U.S.C. 371 of International Application No. PCT/KR2022/011425, filed on Aug. 2, 2022, the contents of which are hereby incorporated by reference herein its entirety.

TECHNICAL FIELD

The present specification relates to a transparent antenna disposed on a vehicle. One specific implementation relates to an antenna assembly made of a transparent material to suppress an antenna region from being visible on vehicle glass.

BACKGROUND ART

A vehicle may perform wireless communication services with other vehicles or nearby objects, infrastructures, or base stations. In this regard, various communication services may be provided through a wireless communication system to which an LTE communication technology or a 5G communication technology is applied. Meanwhile, some of LTE frequency bands may be allocated to provide 5G communication services.

On the other hand, there is a problem in that the body and roof of a vehicle are formed of a metallic material to block radio waves. Accordingly, a separate antenna structure may be disposed on top of the body or roof of the vehicle. Or, when the antenna structure is disposed on the bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

To increase communication capacity without changing the exterior design of a vehicle, a transparent antenna may be disposed on glass corresponding to a vehicle window. However, antenna radiation efficiency and impedance bandwidth characteristics are deteriorated due to an electrical loss of the transparent antenna.

An antenna assembly for a vehicle implemented as such a transparent antenna may be configured to perform 4G wireless communications and 5G wireless communications. Meanwhile, the antenna assembly for the vehicle needs to be configured to perform Wi-Fi and Bluetooth (BT) wireless communications in addition to the 4G and 5G wireless communications. There is a problem in that the overall size of the antenna assembly increases when an antenna module configured to perform Wi-Fi and Bluetooth (BT) wireless communications is configured separately from an antenna module performing 4G wireless communications and 5G wireless communications.

DISCLOSURE OF INVENTION

Technical Problem

One aspect of this specification is to solve the aforementioned problems and other drawbacks. Another aspect of the specification is to provide a broadband transparent antenna assembly that can be arranged on vehicle glass.

Another aspect of this specification is to design a Wi-Fi/BT antenna structure that may coexist with a transparent antenna by considering the arrangement structure of the transparent antenna placed on vehicle glass and a vehicle body structure.

Another aspect of this specification is to optimize the electrical characteristics of an antenna in a structure in which a Wi-Fi/BT antenna and a transparent antenna are arranged.

Another aspect of this specification is to minimize the influence of radiation loss caused by a vehicle metal frame of a transparent antenna for vehicle glass and a Wi-Fi/BT antenna.

Another aspect of this specification is to maintain the isolation between a Wi-Fi/BT antenna and a transparent antenna below a certain level.

Another aspect of this specification is to provide a broadband antenna structure made of a transparent material that can reduce feeding loss and improve antenna efficiency while operating in a wide band.

Another aspect of the present specification is to improve the antenna efficiency of a feeding structure of a broadband transparent antenna assembly that can be placed on vehicle glass, and secure the reliability of a mechanical structure including the feeding structure.

Solution to Problem

According to one aspect of the specification for achieving the above or other purposes, a vehicle includes: a metal frame having an opening formed therein; a glass panel including a transparent region and an opaque region; and an antenna assembly disposed on the glass panel. The antenna assembly may include: a first dielectric substrate disposed in the transparent region of the glass panel, and having a first transparent antenna and a second transparent antenna formed on one side thereof; a second dielectric substrate having a first ground region and a second ground region, and arranged in a recess portion of the metal frame and the opaque region of the glass panel; and a slot pattern formed in a pattern region positioned between the first ground region and the second ground region.

In an embodiment, the slot pattern may include: a first slot pattern formed vertically in one axial direction on the pattern region, and configured to radiate a signal of a first operating frequency band; and a second slot pattern formed horizontally in another axial direction perpendicular to the one axial direction on one point of the first slot pattern, and configured to radiate a signal of a second operating frequency band higher than the first operating frequency band.

In an embodiment, the first slot pattern, the third slot pattern, and the fourth slot pattern may be configured to radiate a first signal of the first operating frequency band toward the transparent region of the glass panel. A lower region of the first slot pattern, the second slot pattern, the third slot pattern, and the fourth slot pattern may be configured to radiate a second signal of the second operating frequency band toward the transparent region of the glass panel. The signals of the first and second operating frequency bands may be Wi-Fi signals or Bluetooth signals.

In an embodiment, the slot pattern may further include a fifth slot pattern formed horizontally in the another axial direction perpendicular to the one axial direction on a second point of the first slot pattern and arranged parallel to the second slot pattern. The second slot pattern may be configured to radiate a second signal of a first sub-frequency band of the second operating frequency band. The fifth slot pattern may be configured to radiate a third signal of a second sub-frequency band higher than the first sub-frequency band of the second operating frequency band.

In an embodiment, the second slot pattern may include: a first sub-slot pattern having one end extending from an end of the first slot pattern and formed perpendicularly to the first slot pattern; and a second sub-slot pattern formed perpendicularly to the first sub-slot pattern on an end of the first sub-slot pattern and arranged parallel to the first slot pattern. The slot pattern may further include a fifth slot pattern formed horizontally in the another axial direction perpendicular to the one axial direction on one point of the second sub-slot pattern. The second sub-slot pattern of the second slot pattern may be configured to radiate a second signal of a first sub-frequency band of the second operating frequency band. The fifth slot pattern may be configured to radiate a third signal of a second sub-frequency band higher than the first sub-frequency band of the second operating frequency band.

In an embodiment, the second slot pattern may include: a first sub-slot pattern having one end extending from an end of the first slot pattern and formed perpendicularly to the first slot pattern; and a second sub-slot pattern formed perpendicularly to the first sub-slot pattern on an end of the first sub-slot pattern and arranged parallel to the first slot pattern. The slot pattern may further include: a fifth slot pattern formed horizontally in the another axial direction perpendicular to the one axial direction on an end of the second sub-slot pattern; and a sixth slot pattern formed vertically in the one axial direction on an end of the fifth slot pattern. The second sub-slot pattern of the second slot pattern may be configured to radiate a second signal of a first sub-frequency band of the second operating frequency band. The sixth slot pattern may be configured to radiate a third signal of a second sub-frequency band higher than the first sub-frequency band of the second operating frequency band.

In an embodiment, the first transparent antenna may include: a first conductive pattern including a first part and a second part, wherein the first part is perpendicularly connected to the second part, and the second part is electrically connected to a first feeding pattern; a second conductive pattern electrically connected to a first part of a first ground conductive pattern of the first ground region; and a third conductive pattern electrically connected to a second part of the first ground conductive pattern, wherein a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern.

In an embodiment, the second transparent antenna may include: a fourth conductive pattern comprising a third part and a fourth part, wherein the third part is perpendicularly connected to the fourth part, and the fourth part is electrically connected to a second feeding pattern; a fifth conductive pattern electrically connected to a first part of a second ground conductive pattern; and a sixth conductive pattern electrically connected to a second part of the second ground conductive pattern, wherein a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern. The third conductive pattern may face the sixth conductive pattern.

In an embodiment, one end of the pattern region where the slot pattern is formed and another end of the first ground region may be spaced apart from each other by a first separation distance. Another end of the pattern region and one end of the second ground region may be spaced apart from each other by a second separation distance equal to the first separation distance. The first separation distance and the second separation distance may be longer than a horizontal distance between the third conductive pattern and the sixth conductive pattern that constitute the first transparent antenna and the second transparent antenna.

In an embodiment, one end of the pattern region where the slot pattern is formed may form a first gap distance to a boundary side of the third conductive pattern constituting the first transparent antenna. Another end of the pattern region may form a second gap distance, equal to the first gap distance, to a boundary side of the sixth conductive pattern constituting the second transparent antenna. The first gap distance and the second gap distance may be set to $\alpha\times\lambda min$ of a wavelength $\lambda min$, which corresponds to a lowest frequency of the first operating frequency band. Here, $\alpha$ may denote a positive real number.

In an embodiment, the first conductive pattern and the third conductive pattern may operate in a first dipole antenna mode in a first frequency band. The first conductive pattern and the third conductive pattern may form an asymmetrical structure. The fourth conductive pattern and the sixth conductive pattern may operate in a second dipole antenna mode in the first frequency band. The fourth conductive pattern and the sixth conductive pattern may form an asymmetrical structure.

In an embodiment, the first conductive pattern may operate in a first monopole antenna mode in a second frequency band higher than the first frequency band. The fourth conductive pattern may operate in a second monopole antenna mode in the second frequency band. The slot pattern may operate in a first slot mode through the first slot pattern in the first operating frequency band. The second frequency band and the first operating frequency band may overlap at least partially with each other. The third conductive pattern may be arranged between the first conductive pattern and the first slot pattern to suppress interference between a first current component in a horizontal direction, formed in the first conductive pattern, and a second current component in a vertical direction, formed in the first slot pattern.

In an embodiment, the second conductive pattern may operate as a radiator in a third frequency band higher than the second frequency band. The fifth conductive pattern may operate as a radiator in the third frequency band. The slot pattern may operate in a first slot mode through the second slot pattern in the second operating frequency band.

The third frequency band and the third operating frequency band may overlap at least in part. The third conductive pattern may be arranged between the second conductive pattern and the second slot pattern to suppress interference between a third current component of a first horizontal direction, formed on the second conductive pattern and a fourth current component of a second horizontal direction, opposite to the first horizontal direction, formed on the second slot pattern.

In an embodiment, a vertical length in the one axial direction of the first slot pattern may be formed with a first length and a first width within a certain range based on 10 mm. A horizontal length in the another axial direction of the second slot pattern may be formed with a second length and a second width within a certain range based on 6.8 mm.

In an embodiment, a signal may be applied by a feeding pattern formed below a third dielectric substrate where the pattern region is formed, and radiated through the third slot pattern. The third slot pattern may be formed with a third length and a third width, which correspond to a horizontal length in the another axial direction. The third width of the third slot pattern may be set to be narrower than the first width of the first slot pattern and the second width of the second slot pattern.

According to another aspect of the specification, a vehicle includes: a metal frame having an opening formed therein; a glass panel including a transparent region and an opaque region; and an antenna assembly disposed on the glass panel. The antenna assembly includes: a first dielectric substrate disposed in the transparent region of the glass panel, and comprising a first transparent antenna and a second transparent antenna formed on one side thereof; a second dielectric substrate comprising a first ground region and a second ground region, and arranged in a recess portion of the metal frame and the opaque region of the glass panel; and a third dielectric substrate spaced apart from one side of at least one of the first ground region and the second ground region. The third dielectric substrate may include a slot pattern formed in a pattern region on one side thereof.

In an embodiment, the slot pattern may include: a first slot pattern formed vertically in one axial direction on the pattern region, and configured to radiate a signal of a first operating frequency band; and a second slot pattern formed horizontally in another axial direction perpendicular to the one axial direction on one point of the first slot pattern, and configured to radiate a signal of a second operating frequency band higher than the first operating frequency band.

In an embodiment, the first slot pattern may form a vertical slot region, and the second slot pattern may form a horizontal slot region in a first direction of the another axial direction. The slot pattern may include: a third slot pattern having one end extending from one end of the first slot pattern and formed horizontally in a second direction of the another axial direction, and configured to feed the signal of the first or second operating frequency band; and a fourth slot pattern having one end extending from another end of the third slot pattern and formed parallel to the first slot pattern.

In an embodiment, the first slot pattern, the third slot pattern, and the fourth slot pattern may be configured to radiate a first signal of the first operating frequency band toward the transparent region of the glass panel. A lower region of the first slot pattern, the second slot pattern, the third slot pattern, and the fourth slot pattern may be configured to radiate a second signal of the second operating frequency band toward the transparent region of the glass panel. The signals of the first and second operating frequency bands may be Wi-Fi signals or Bluetooth signals.

In an embodiment, the first transparent antenna may include: a first conductive pattern comprising a first part and a second part, wherein the first part is perpendicularly connected to the second part, and the second part is electrically connected to a first feeding pattern; a second conductive pattern electrically connected to a first part of a first ground conductive pattern of the first ground region; and a third conductive pattern electrically connected to a second part of the first ground conductive pattern, wherein a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern.

In an embodiment, the second transparent antenna may include: a fourth conductive pattern comprising a third part and a fourth part, wherein the third part is perpendicularly connected to the fourth part, and the fourth part is electrically connected to a second feeding pattern; a fifth conductive pattern electrically connected to a first part of a second ground conductive pattern; and a sixth conductive pattern electrically connected to a second part of the second ground conductive pattern, wherein a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern. The third conductive pattern may face the sixth conductive pattern.

In an embodiment, the vehicle may further include a second slot pattern region formed in a pattern region positioned between the first ground region and the second ground region. One end of the pattern region where the slot pattern is formed and one end of the first ground region may be spaced apart from each other by a first separation distance. Another end of the pattern region where the second slot pattern region is formed and one end of the second ground region may be spaced apart from each other by a second separation distance equal to the first separation distance. The first separation distance and the second separation distance may be longer than a horizontal distance between the third conductive pattern and the sixth conductive pattern that constitute the first transparent antenna and the second transparent antenna.

In an embodiment, one end of the pattern region where the slot pattern is formed may form a first gap distance to a boundary side of the first conductive pattern constituting the first transparent antenna. Another end of the pattern region where the second slot pattern region is formed may form a second gap distance, equal to the first gap distance, to a boundary side of the sixth conductive pattern constituting the second transparent antenna. The first gap distance and the second gap distance may be set to $\alpha\times\lambda min$ of a wavelength $\lambda min$, which corresponds to a lowest frequency of the first operating frequency band. Here, $\alpha$ may denote a positive real number.

Advantageous Effects of Invention

Hereinafter, the technical effects of a broadband transparent antenna assembly that may be disposed on vehicle glass will be described.

According to the specification, 4G/5G broadband wireless communications in a vehicle can be allowed by providing a broadband transparent antenna assembly having a plurality of conductive patterns that may be placed on vehicle glass.

According to the specification, the entire size of an antenna assembly can be minimized by arranging a WIFI/BT antenna structure, which may coexist with a transparent antenna, in an opaque region of vehicle glass in consideration of the arrangement structure of the transparent antenna placed on the vehicle glass and a vehicle body structure.

According to the specification, in a structure in which a WIFI/BT antenna and a transparent antenna are arranged, the electrical characteristics of the antennas, such as impedance matching characteristics and antenna efficiency, can be optimized.

According to the specification, radiation can be induced in a direction toward glass in an opaque region of a WIFI/BT antenna for vehicle glass, thereby minimizing the influence of radiation loss caused by a metal frame in a frit portion of the opaque region.

According to the specification, a WIFI/BT antenna can be implemented as a slot pattern of a dielectric substrate and arranged at certain separation distances or more from conductive patterns of a transparent antenna, so that the isolation between the WIFI/BT antenna and a transparent antenna can be maintained below a certain level.

According to the specification, a broadband antenna structure made of a transparent material that can reduce a feeding loss and improve antenna efficiency while operating in a wide band can be provided.

According to the specification, the efficiency of a feeding structure of a broadband transparent antenna assembly that may be disposed on vehicle glass can be improved, and reliability of a mechanical structure including the feeding structure can be secured.

Further scope of applicability of the disclosure will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
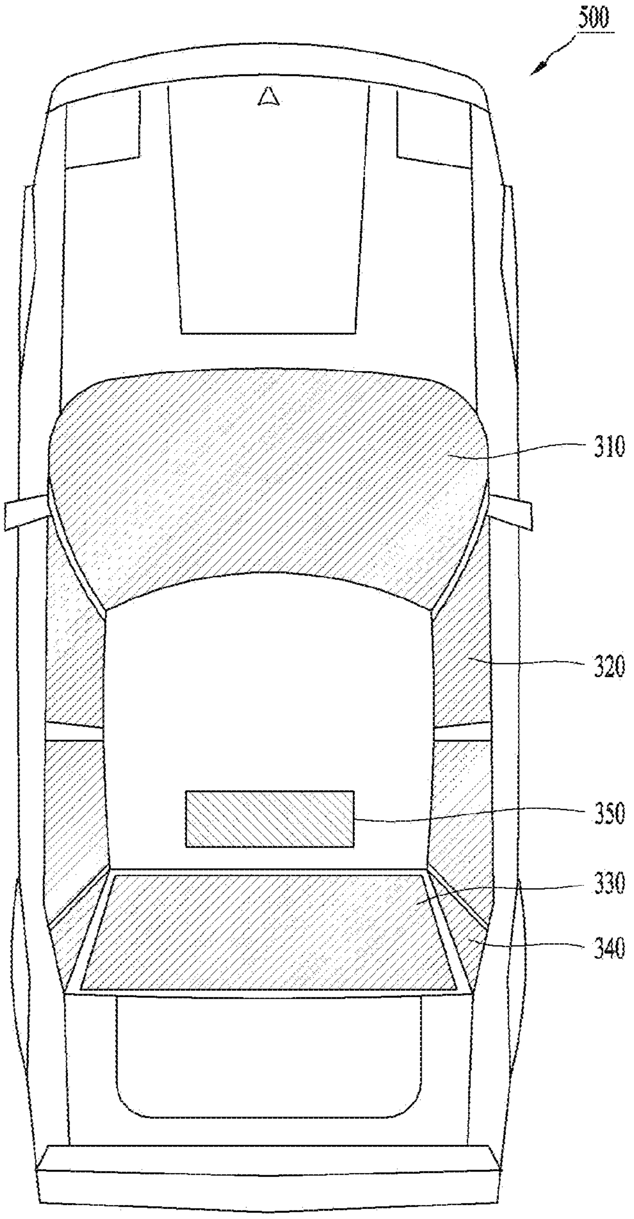
FIG. 1 is a diagram illustrating vehicle glass on which an antenna structure according to an embodiment of the present specification is to be arranged.

A description will now be given in detail according to exemplary embodiments disclosed herein, with reference to the accompanying drawings. For the sake of a brief description with reference to the drawings, the same or equivalent components may be provided with the same or similar reference numbers, and the description thereof will not be repeated. A suffix "module" or "unit" used for elements disclosed in the following description is merely intended for easy description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a different meaning from the context.

Terms "include" or "has" used herein should be understood that they are intended to indicate the existence of a feature, a number, a step, an element, a component, or a combination thereof disclosed in the specification, and it may also be understood that the existence or additional possibility of one or more other features, numbers, steps, elements, components, or combinations thereof are not excluded in advance.

An antenna system described herein may be mounted on a vehicle. Configurations and operations according to embodiments may also be applied to a communication system, namely, an antenna system mounted on a vehicle. In this regard, the antenna system mounted on the vehicle may include a plurality of antennas, and a transceiver circuitry and a processor that control the plurality of antennas.

Hereinafter, an antenna assembly (antenna module) that may be arranged on a window of a vehicle according to the present specification and an antenna system for a vehicle including the antenna assembly will be described. In this regard, the antenna assembly may refer to a structure in which conductive patterns are combined on a dielectric substrate, and may also be referred to as an antenna module.

In this regard, FIG. 1 illustrates vehicle glass on which an antenna structure according to an embodiment of the present specification is to be arranged. Referring to FIG. 1, a vehicle 500 may include front glass 310, door glass 320, rear glass 330, and quarter glass 340. In some examples, the vehicle 500 may further include top glass 350 that is arranged on a roof in an upper region.

Therefore, the glass constituting the window of the vehicle 500 may include the front glass 310 disposed in the front region of the vehicle, the door glass 320 disposed in the door region of the vehicle, and the rear glass 330 disposed in the rear region of the vehicle. In some examples, the glass constituting the window of the vehicle 500 may further include the quarter class 340 disposed in the partial region of the door region of the vehicle. In addition, the glass constituting the window of the vehicle 500 may further include the top glass 350 spaced apart from the rear glass 330 and disposed in the upper region of the vehicle. Accordingly, each glass constituting the window of the vehicle 500 may also be referred to as a window.

The front glass 310 may be referred to as a front windshield because it suppresses wind blown from the front side from entering the inside of the vehicle. The front glass 310 may have a two-layer bonding structure having a thickness of about 5.0 to 5.5 mm. The front glass 310 may have a bonding structure of glass/shatterproof film/glass.

The door glass 320 may have a two-layer bonding structure or may be formed of single-layer compressed glass. The rear glass 330 may have a two-layer bonding structure with a thickness of about 3.5 to 5.5 mm or may be formed of single-layer compressed glass. In the rear glass 330, a spaced distance between a transparent antenna and hot wire and AM/FM antenna is required. The quarter glass 340 may be formed of single-layer compressed glass with a thickness of about 3.5 to 4.0 mm, but is not limited thereto.

The size of the quarter glass 340 may vary depending on a type of vehicle, and may be smaller than the sizes of the front glass 310 and the rear glass 330.

Figure 2A:
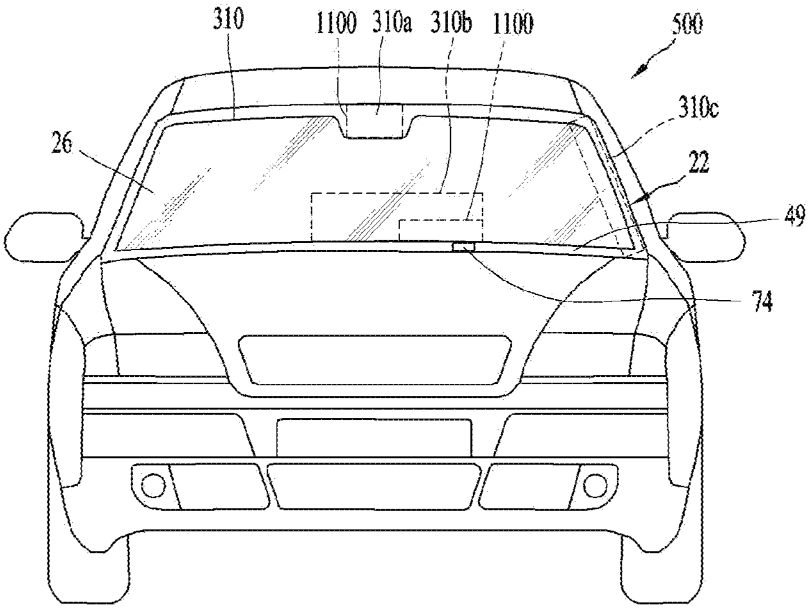
FIG. 2A is a front view of the vehicle with antenna assemblies arranged in different regions of a front glass of the vehicle of FIG. 1.
Figure 2B:
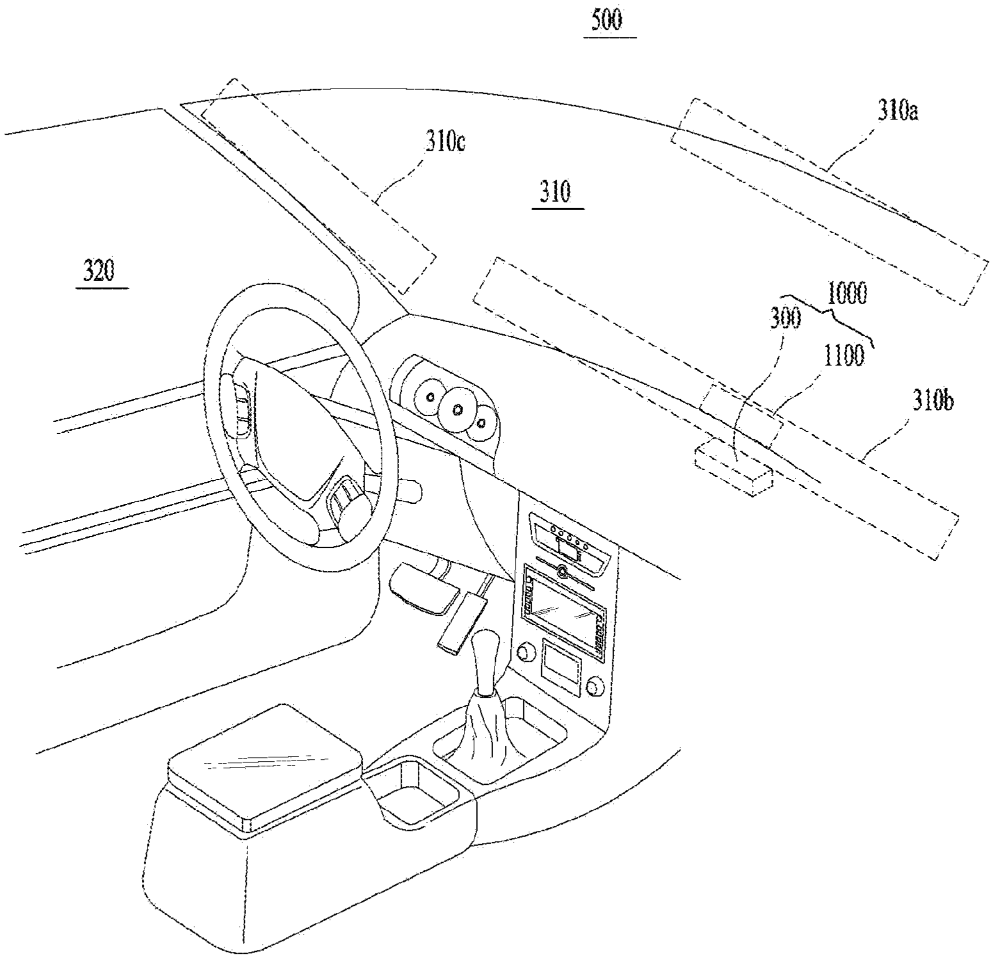
FIG. 2B is a front perspective view illustrating the inside of the vehicle with the antenna assemblies arranged in the different regions of the front glass of the vehicle of FIG. 1.
Figure 2C:
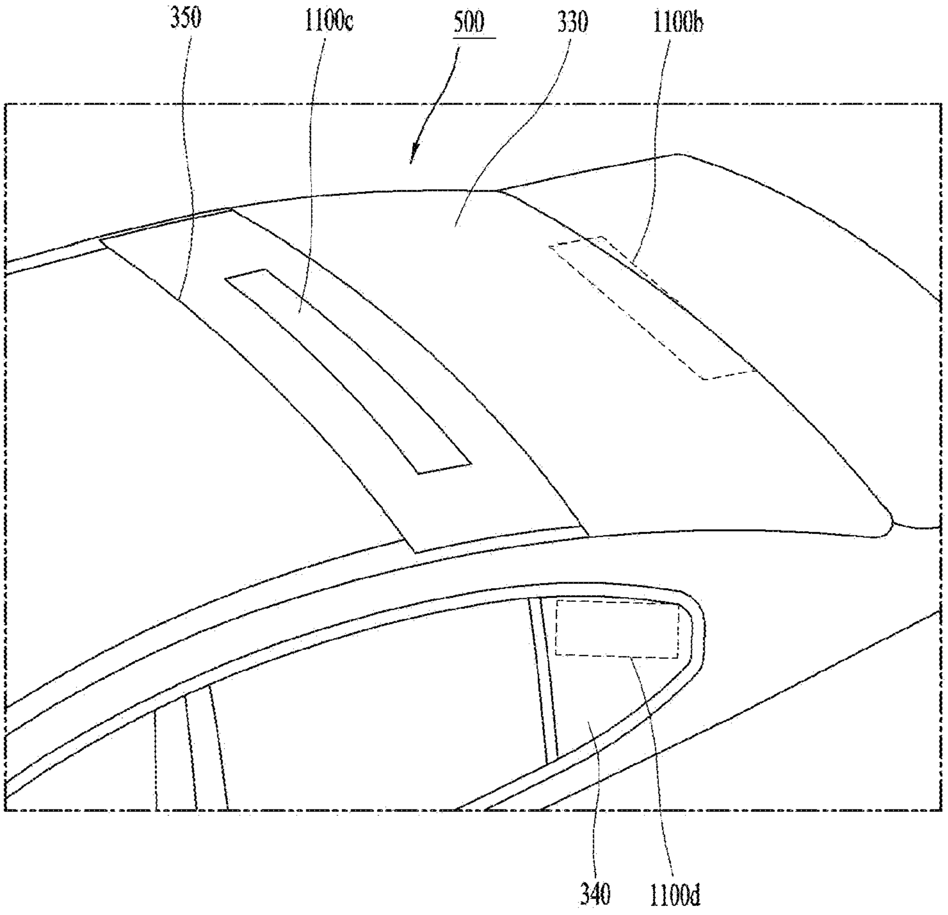
FIG. 2C is a side perspective view of the vehicle with the antenna assembly disposed on an upper glass of the vehicle of FIG. 1.

Hereinafter, a structure in which an antenna assembly according to the present specification is arranged on different regions of the front glass of a vehicle will be described. An antenna assembly attached to vehicle glass may be implemented as a transparent antenna. In this regard, FIG. 2A is a front view of the vehicle where antenna assemblies are arranged in different regions of the front glass of the vehicle of FIG. 1. FIG. 2B is an internal front perspective view of the vehicle where the antenna assemblies arranged in the different regions of the front glass of the vehicle of FIG. 1. FIG. 2C is a side perspective view of the vehicle where the antenna assembly is arranged on the upper glass of the vehicle of FIG. 1.

Referring to FIG. 2A which is the front view of the vehicle 500, a configuration in which the transparent antenna for the vehicle according to the specification may be arranged is illustrated. A pane assembly 22 may include an antenna in an upper region 310*a*. The pane assembly 22 may include an antenna in the upper region 310*a*, an antenna in a lower region 310*b*, and/or an antenna in a side region 310*c*. In addition, the pane assembly 22 may include translucent pane glass 26 formed of a dielectric substrate. The antenna in the upper region 310*a*, the antenna in the lower region 310*b*, and/or the antenna in the side region 310*c* may be configured to support any one or more of various communication systems.

An antenna module 1100 may be disposed in the upper region 310*a*, the lower region 310*b*, or the side region 310*c* of the front glass 310. When the antenna module 1100 is arranged in the lower region 310*b* of the front glass 310, the antenna module 1100 may extend to a body 49 of a lower region of the translucent pane glass 26. The body 49 of the lower region of the translucent pane glass 26 may have lower transparency than other portions. A portion of a feeder and other interface lines may be arranged on the body 49 of the lower region of the translucent pane glass 26. A connector assembly 74 may be implemented on the body 49 of the lower region of the translucent pane glass 26. The body 49 of the lower region may constitute a vehicle body made of a metal material.

Referring to FIG. 2B, an antenna assembly 1000 may include a telematics control unit (TCU) 300 and an antenna module 1100. The antenna module 1100 may be located in a different region of vehicle glass.

Referring to FIGS. 2A and 2B, the antenna assembly may be arranged in the upper region 310*a*, the lower region 310*b*, and/or the side region 310*c* of the vehicle glass. Referring to FIGS. 2A to 2C, the antenna assemblies may be arranged on the front glass 310, rear glass 330, quarter glass 340, and upper glass 350 of the vehicle.

Referring to FIGS. 2A to 2C, the antenna arranged in the upper region 310*a* of the front glass 310 of the vehicle may be configured to operate in a low band (LB), a mid band (MB), a high band (HB), and a 5G Sub6 band of 4G/5G communication systems. The antenna in the lower region 310*b* and/or the antenna in the side region 310*c* may also be configured to operate in the LB, MB, HB, and 5G Sub6 band of the 4G/5G communication systems. An antenna structure 1100*b* on the rear glass 330 of the vehicle may also be configured to operate in the LB, MB, HB, and 5G Sub6 band of the 4G/5G communication systems. An antenna structure 1100*c* on the upper glass 350 of the vehicle may also be configured to operate in the LB, MB, HB, and 5G Sub6 band of the 4G/5G communication systems. An antenna structure 1100*d* on the quarter glass 350 of the vehicle may also be configured to operate in the LB, MB, HB, and 5G Sub6 band of the 4G/5G communication systems.

At least a portion of an outer region of the front glass 310 of the vehicle may be defined by the translucent pane glass 26. The translucent pane glass 26 may include a first part in which an antenna and a portion of a feeder are formed, and a second part in which another portion of the feeder and a dummy structure are formed. The translucent pane glass 26 may further include a dummy region in which conductive patterns are not formed. For example, a transparent region of the translucent pane glass 22 may be transparent to secure light transmission and a field of view.

Although it is exemplarily illustrated that conductive patterns may be formed in a partial region of the front glass 310, the conductive patterns may extend to the side glass 320 and the rear glass 330 of FIG. 1, and an arbitrary glass structure. In the vehicle 500, occupants or a driver may view road and surrounding environment through the pane assembly 22. In addition, the occupants or driver may view the road and surrounding environment without interference with the antenna in the upper region 310*a*, the antenna in the lower region 310*b*, and/or the antenna in the side region 310*c*.

Figure 3:
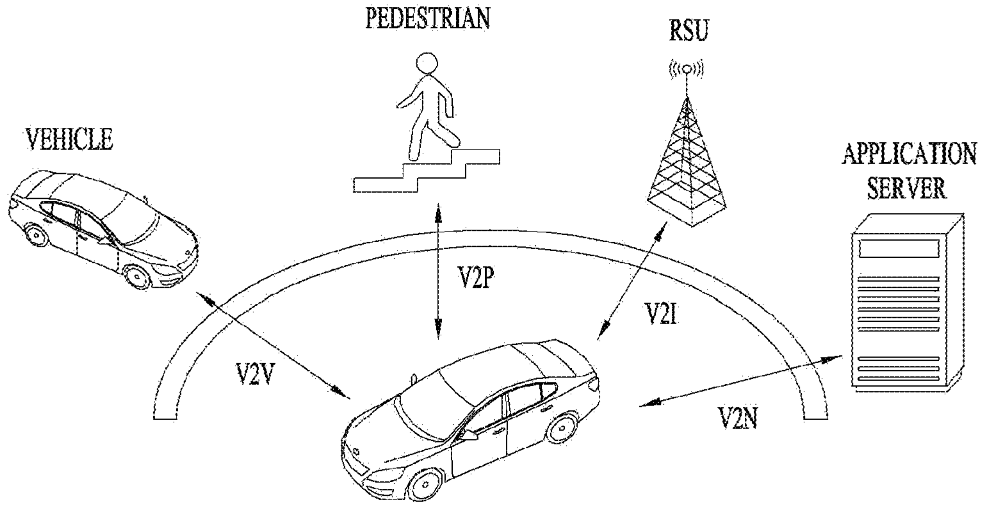
FIG. 3 illustrates types of V2X applications.

The vehicle 500 may be configured to communicate with pedestrians, surrounding infrastructures, and/or servers in addition to adjacent vehicles. FIG. 3 illustrates types of V2X applications. Referring to FIG. 3, V2X communications may include communications between a vehicle and all entities, such as V2V (Vehicle-to-Vehicle) which refers to communication between vehicles, V2I (Vehicle-to-Infrastructure) which refers to communication between a vehicle and an eNB or RSU (Road Side Unit), V2P (Vehicle-to-Pedestrian) which refers to communication between a vehicle and a terminal possessed by a person (pedestrian, cyclist, vehicle driver, or passenger), V2N (vehicle-to-network), and the like.

Figure 4:
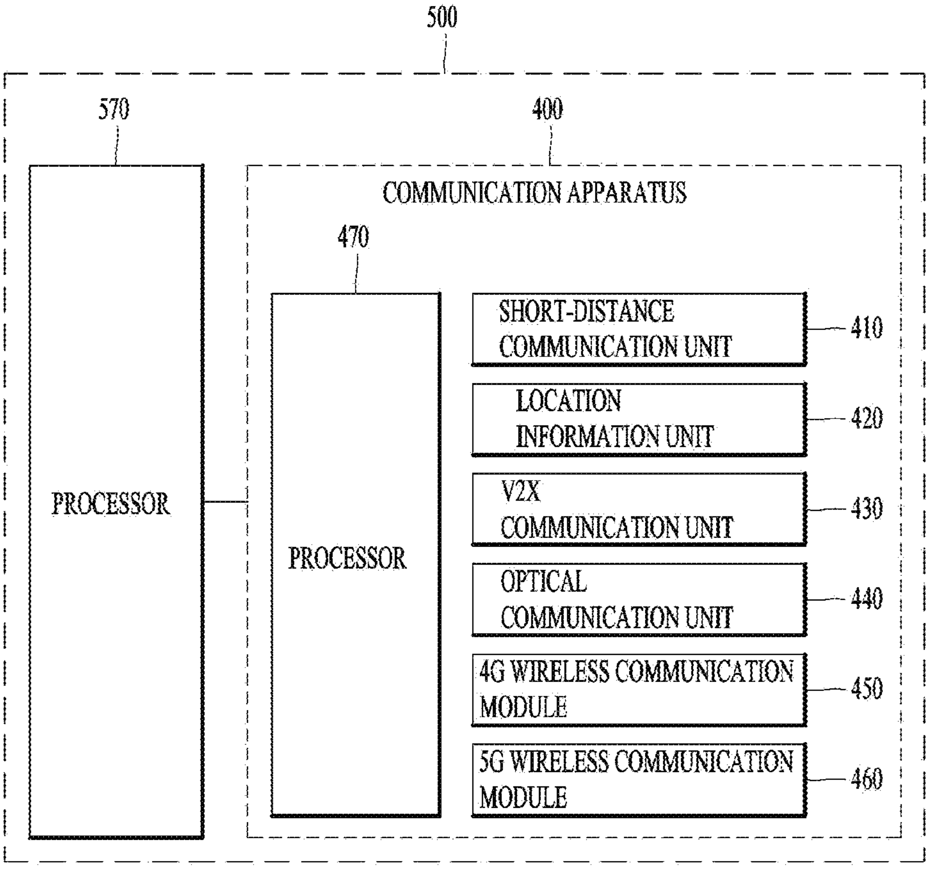
FIG. 4 is a block diagram referenced for explaining a vehicle and an antenna system mounted on the vehicle according to an embodiment of the present specification.

Meanwhile, FIG. 4 is a block diagram illustrating a vehicle and an antenna system mounted on the vehicle according to an embodiment of the specification.

The vehicle 500 may include a communication apparatus 400 and a processor 570. The communication apparatus 400 may correspond to the telematics control unit of the vehicle 500.

The communication apparatus 400 may be an apparatus for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. In this regard, the communication apparatus 400 may include at least one of a short-range communication unit 410, a location information unit 420, a V2X communication unit 430, an optical communication unit 440, a 4G wireless communication module 450, and a 5G wireless communication module 460. The communication apparatus 400 may include a processor 470. According to an embodiment, the communication apparatus 400 may further include other components in addition to the components described, or may not include some of the components described.

A 4G wireless communication module 450 and a 5G wireless communication module 460 perform wireless communication with one or more communication systems through one or more antenna modules. The 4G wireless communication module 450 may transmit and/or receive signals to and/or from a device in a first communication system through a first antenna module. In addition, the 5G wireless communication module 460 may transmit and/or receive signals to and/or from a device in a second communication system through a second antenna module. The 4G wireless communication module 450 and 5G wireless communication module 460 may also be physically implemented as one integrated communication module. For example, the first communication system and the second communication system may be an LTE communication system and a 5G communication system, respectively. However, the first communication system and the second communication system may not be limited thereto, and may change depending on applications.

The processor of the device in the vehicle 500 may be implemented as a micro control unit (MCU) or a modem. The processor 470 of the communication apparatus 400 may correspond to a modem, and the processor 470 may be implemented as an integrated modem. The processor 470 may obtain surrounding information from other adjacent vehicles, objects, or infrastructures through wireless communication. The processor 470 may perform vehicle control using the acquired surrounding information.

The processor 570 of the vehicle 500 may be a processor of a car area network (CAN) or advanced driving assistance system (ADAS), but is not limited thereto. When the vehicle 500 is implemented in a distributed control manner, the processor 570 of the vehicle 500 may be replaced with a processor of each device.

In some examples, the antenna module arranged in the vehicle 500 may include a wireless communication unit. The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input/Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform broadband high-speed communication. When the mm Wave band is used, the electronic device may perform beamforming for coverage expansion of an area where communication with a base station is possible.

Regardless of the 5G frequency band, the 5G communication system may support Multi-Input and Multi-Output (MIMO) to be performed multiple times, to improve a transmission rate. In this instance, UL MIMO may be performed by a plurality of 5G transmission signals that are transmitted to the 5G base station. In addition, DL MIMO may be performed by a plurality of 5G reception signals that are received from the 5G base station.

In some examples, a state of dual connectivity (DC) to both the 4G base station and the 5G base station may be attained through the 4G wireless communication module 450 and the 5G wireless communication module 460. As such, the dual connectivity to the 4G base station and the 5G base station may be referred to as EUTRAN NR DC (EN-DC). In some examples, when the 4G base station and the 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, CA may be carried out using at least one of the 4G wireless communication module 450 and the 5G wireless communication module 460 and a Wi-Fi communication module. In this regard, 4G+Wi-Fi CA may be performed using the 4G wireless communication module 450 and the Wi-Fi communication module 113. Or, 5G+Wi-Fi CA may be performed using the 5G wireless communication module 460 and the Wi-Fi communication module.

In some examples, the communication apparatus 400 may implement a display apparatus for a vehicle together with a user interface apparatus. In this instance, the display apparatus for the vehicle may be referred to as a telematics apparatus or an Audio Video Navigation (AVN) apparatus.

In some examples, a broadband transparent antenna structure that can be disposed on vehicle glass may be implemented as a single dielectric substrate on the same plane as a CPW feeder. In addition, the broadband transparent antenna structure that can be disposed on the vehicle glass may be implemented as a structure in which grounds are formed at both sides of a radiator to constitute a broadband structure.

Figure 5A:
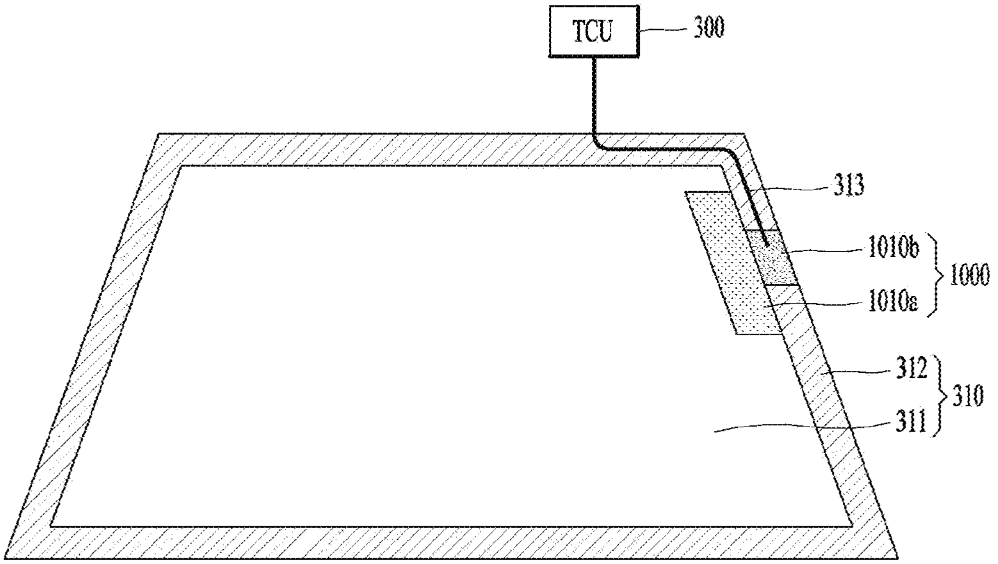
FIGS. 5A to 5C illustrate configuration where an antenna assembly according to the present specification is arranged on vehicle glass.
Figure 5B:
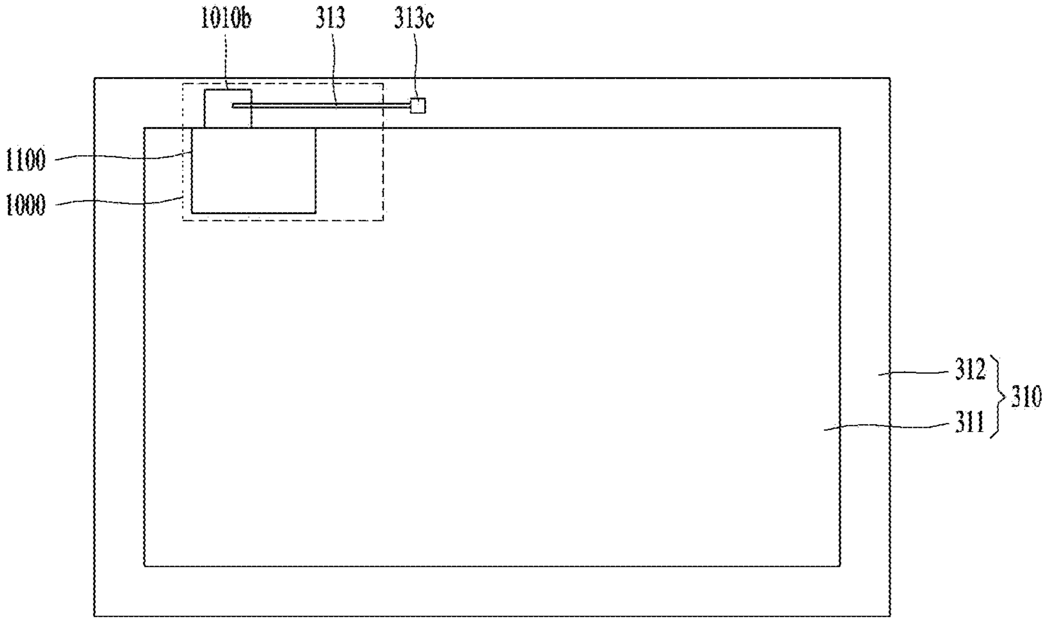

Hereinafter, an antenna assembly associated with a broadband transparent antenna structure according to the present specification will be described. In this regard, FIGS. 5A and 5B illustrate configurations that an antenna assembly according to the present specification is arranged on vehicle glass. Referring to FIG. 5A, the antenna assembly 1000 may include a first dielectric substrate 1010*a* and a second dielectric substrate 1010*b*. The first dielectric substrate 1010*a* is implemented as a transparent substrate and thus may be referred to as a transparent substrate 1010*a*. The second dielectric substrate 1010*b* may be implemented as an opaque substrate 1010*b*.

The glass panel 310 may be configured to include a transparent region 311 and an opaque region 312. The opaque region 312 of the glass panel 310 may be a frit region as a frit layer. The opaque region 312 may be formed to surround the transparent region 311. The opaque region 312 may be formed outside the transparent region 311. The opaque region 312 may form a boundary region of the glass panel 310.

A signal pattern formed on a dielectric substrate 1010 may be connected to the telematics control unit (TCU) 300 through a connector part 313 such as a coaxial cable. The telematics control unit (TCU) 300 may be mounted inside the vehicle, but is not limited thereto. The telematics control unit (TCU) 300 may be arranged on a dashboard inside the vehicle or a ceiling region inside the vehicle, but is not limited thereto.

Figure 5C:
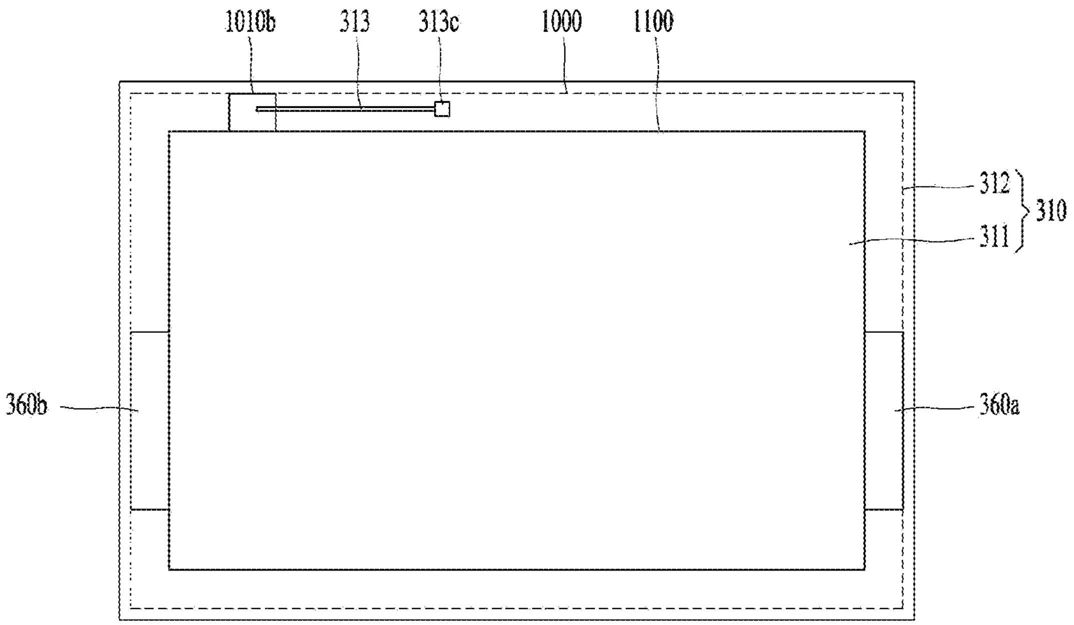

FIG. 5B illustrates a configuration in which the antenna assembly 1000 is arranged in a partial region of the glass panel 310. FIG. 5C illustrates a configuration in which the antenna assembly 1000 is arranged in an entire region of the glass panel 310.

Referring to FIGS. 5B and 5C, the glass panel 310 may include the transparent region 311 and the opaque region 312. The opaque region 312 that is a non-visible area with transparency below a certain level may be referred to as a frit region, black printing (BP) region, or black matrix (BM) region. The opaque region 312 corresponding to the non-visible area may be formed to surround the transparent region 311. The opaque region 312 may be formed in a region outside the transparent region 311. The opaque region 312 may form a boundary region of the glass panel 310. The second dielectric substrate 1010*b* or heating pads 360*a* and 360*b* corresponding to a feeding substrate may be arranged in the opaque region 312. The second dielectric substrate 1010*b* arranged in the opaque region 312 may be referred to as an opaque substrate. Even when the antenna assembly 1000 is arranged in the entire region of the glass panel 310 as illustrated in FIG. 5C, the heating pads 360*a* and 360*b* may be arranged in the opaque region 312.

Referring to FIG. 5B, the antenna assembly 1000 may include the first transparent dielectric substrate 1010*a* and the second dielectric substrate 1010*b*. Referring to FIGS. 5B and 5C, the antenna assembly 1000 may include the antenna module 1100 configured with conductive patterns, and the second dielectric substrate 1010*b*. The antenna module 1100 may include a transparent electrode part to be implemented as a transparent antenna module. The antenna module 1100 may include one or more antenna elements. The antenna module 1100 may include a MIMO antenna and/or other antenna elements for wireless communication. The other antenna elements may include at least one of GNSS/radio/broadcasting/Wi-Fi/satellite communication/UWB, and remote keyless entry (RKE) antennas for vehicle applications.

Referring to FIGS. 5A to 5C, the antenna assembly 1000 may be interfaced with the TCU 300 through the connector part 313. The connector part 313 may include a connector 313*c* on an end of a cable to be electrically connected to the TCU 300. A signal pattern formed on the second dielectric substrate 1010*b* of the antenna assembly 1000 may be connected to the TCU 300 through the connector part 313 such as a coaxial cable. The antenna module 1100 may be electrically connected to the TCU 300 through the connector part 313. The TCU 300 may be disposed inside the vehicle, but is not limited thereto. The TCU 300 may be disposed on a dashboard inside the vehicle or a ceiling region inside the vehicle, but is not limited thereto.

Meanwhile, when the transparent antenna assembly according to the present specification is attached to the inside or surface of the glass panel 310, a transparent electrode part including an antenna pattern and a dummy pattern may be arranged in the transparent region 311. On the other hand, an opaque substrate part may be arranged in the opaque region 312.

Figure 6A:
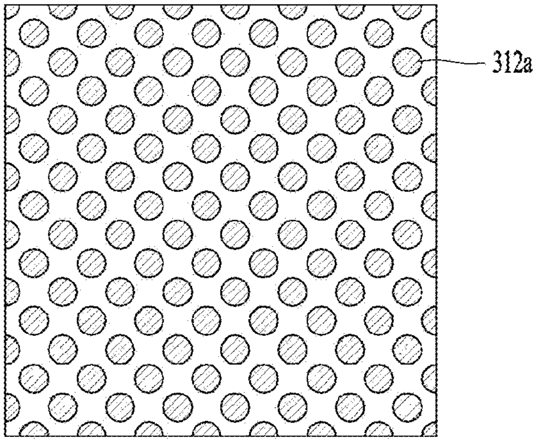
FIG. 6A illustrates various embodiments of frit patterns according to the present specification.
Figure 6A:
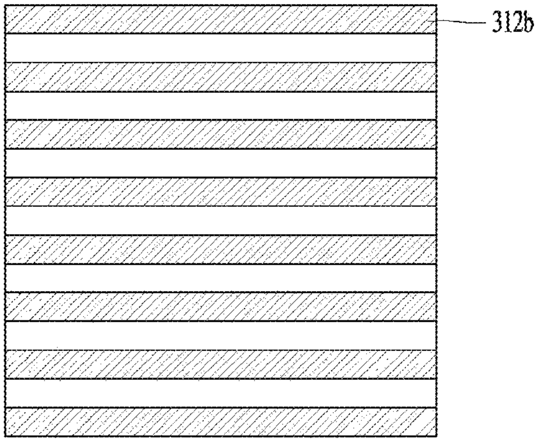
Figure 6A:
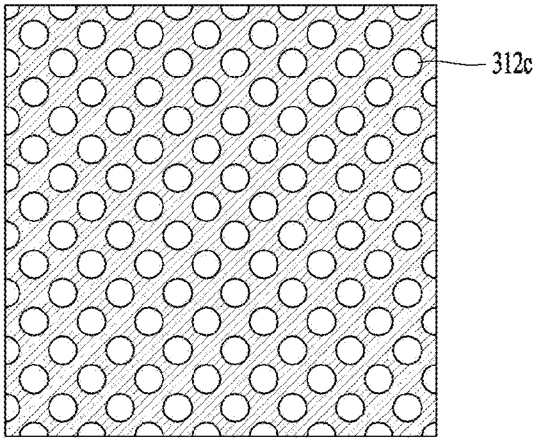
Figure 6B:
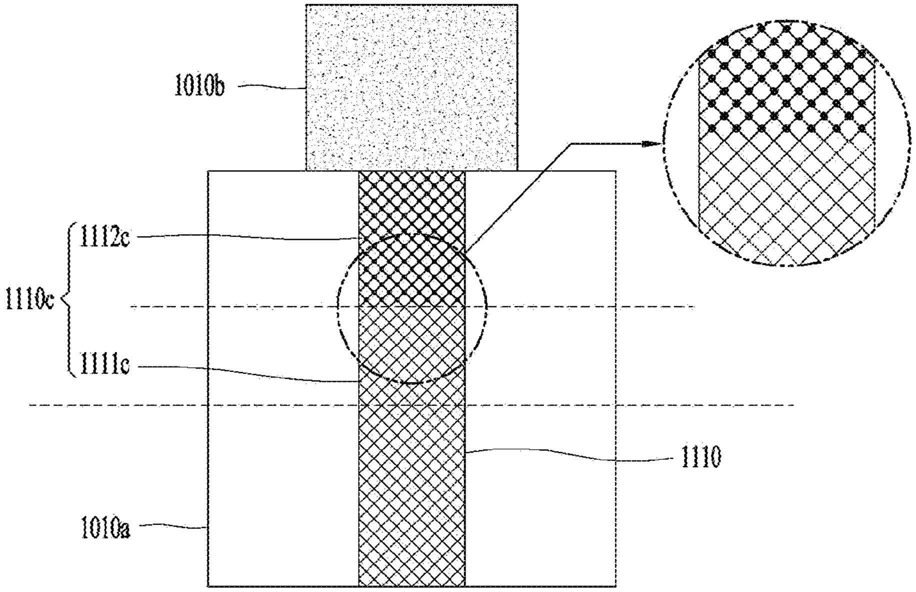
FIGS. 6B and 6C illustrate transparent antenna patterns and structures in which the transparent antenna patterns are arranged on vehicle glass according to embodiments.
Figure 6B:
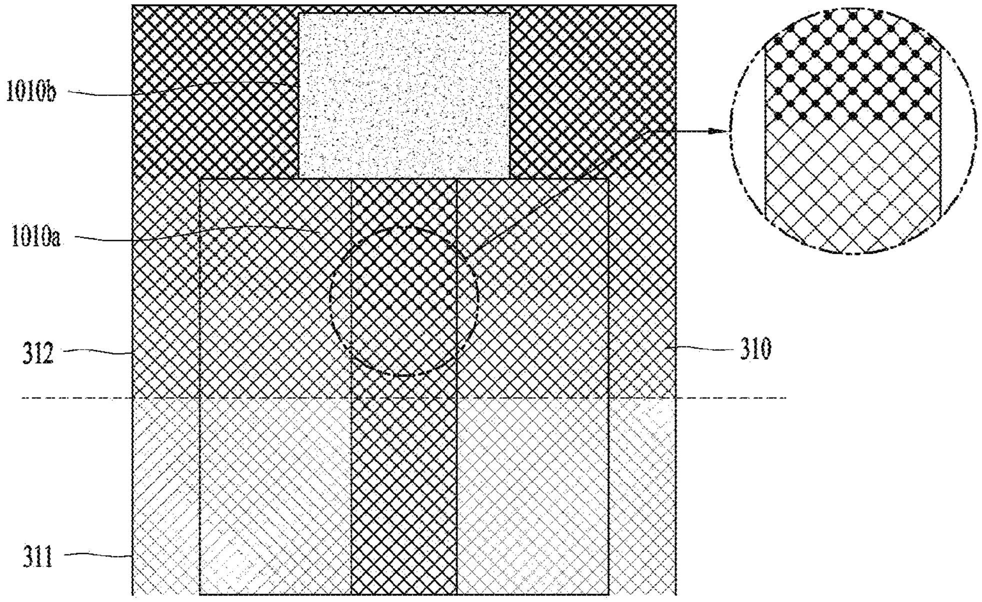
Figure 6C:
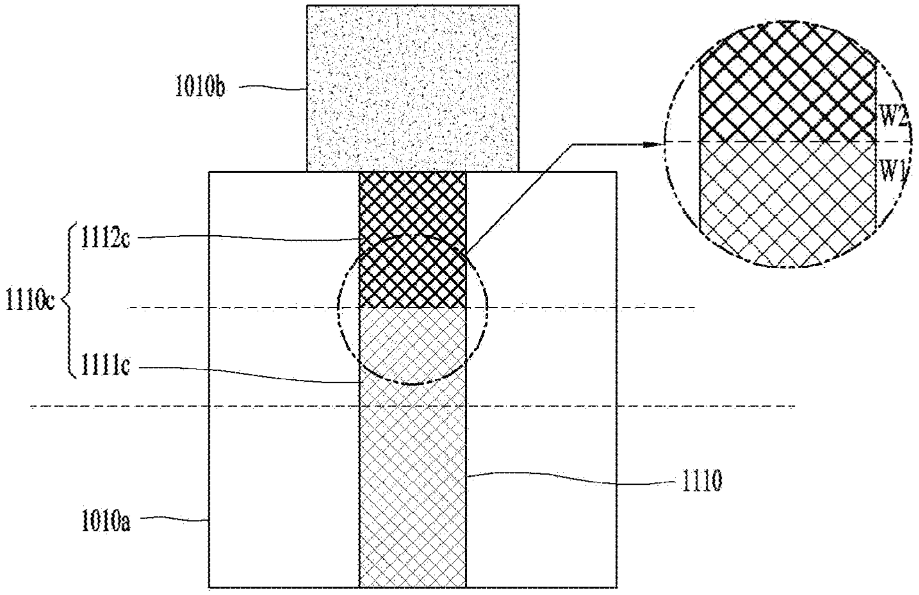
Figure 6C:
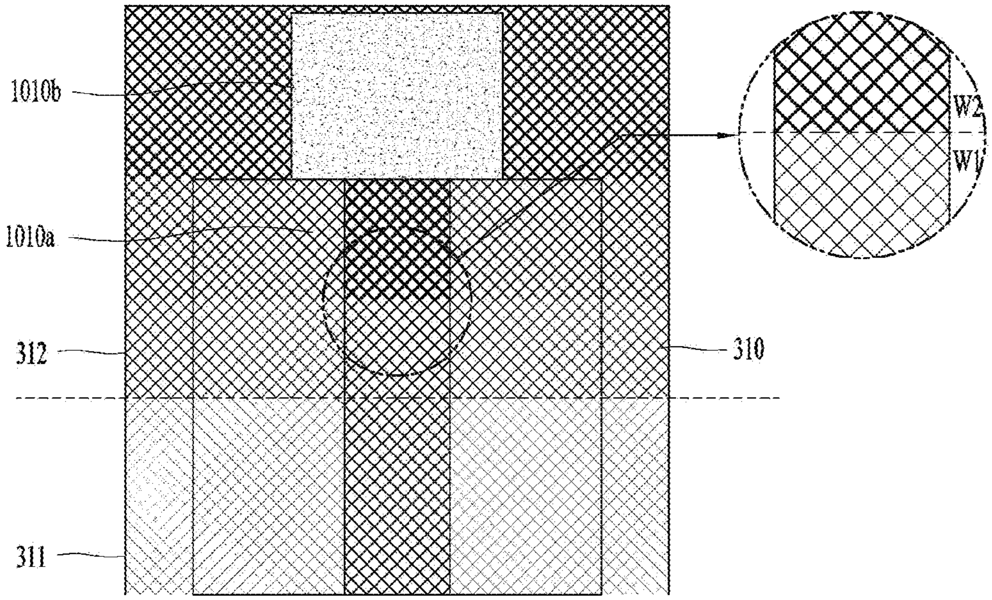

The antenna assembly formed on the vehicle glass according to the present specification may be arranged in the transparent region and the opaque region. In this regard, FIG. 6A illustrates various embodiments of frit patterns according to the present specification. FIGS. 6B and 6C illustrate transparent antenna patterns and structures in which the transparent antenna patterns are arranged on vehicle glass according to embodiments.

Referring to (a) of FIG. 6A, a frit pattern 312*a* may be a metal pattern in a circular (polygonal, or oval) shape with a certain diameter. The frit pattern 312*a* may be arranged in a two-dimensional (2D) structure in both axial directions. The frit pattern 312*a* may be formed in an offset structure where center points between patterns forming adjacent rows are spaced apart by a certain distance.

Referring to (b) of FIG. 6A, the frit pattern 312*b* may be formed as a rectangular pattern in one axial direction. The frit pattern 312*c* may be arranged in a one-dimensional structure in one axial direction or in a 2D structure in both axial directions.

Referring to (c) of FIG. 6A, the frit pattern 312*c* may be formed as a slot pattern, from which a metal pattern has been removed, in a circular (polygonal or oval) shape with a certain diameter. The frit pattern 312*b* may be arranged in a 2D structure in both axial directions. The frit pattern 312*c* may be formed in an offset structure where center points between patterns forming adjacent rows are spaced apart by a certain distance.

Referring to FIGS. 5A to 6C, the opaque substrate 1010*b* and the transparent substrate 1010*a* may be electrically connected to each other in the opaque region 312. In this regard, a dummy pattern, which is electrically very small to have a certain size or less, may be disposed adjacent to the antenna pattern to secure the invisibility of a transparent antenna pattern. Accordingly, a pattern within a transparent electrode can be made invisible to the naked eye without deterioration of antenna performance. The dummy pattern may be designed to have similar light transmittance to that of the antenna pattern within a certain range.

The transparent antenna assembly including the opaque substrate 1010*b* bonded to the transparent electrode part may be mounted on the glass panel 310. In relation to this, to ensure invisibility, the opaque substrate 1010*b* connected to an RF connector or coaxial cable is placed in the opaque region 312 of the vehicle glass. Meanwhile, the transparent electrode part may be placed in the transparent region 311 of the vehicle glass to ensure the invisibility of the antenna from the outside of the vehicle glass.

A portion of the transparent electrode part may be attached to the opaque region 312 in some cases. The frit pattern of the opaque region 312 may be gradated from the opaque region 312 to the transparent region 311. The transmission efficiency of a transmission line may be improved while improving the invisibility of the antenna when the light transmittance of the frit pattern is adjusted to match the light transmittance of the transparent electrode part within a certain range. Meanwhile, sheet resistance may be reduced while ensuring invisibility by adopting a metal mesh shape similar to the frit pattern. In addition, the risk of disconnection of the transparent electrode layer during manufacturing and assembly may be reduced by increasing the line width of a metal mesh grid in a region connected to the opaque substrate 1010*b*.

Referring to (a) of FIG. 6A and FIG. 6B, a conductive pattern 1110 of the antenna module may include metal mesh grids with the same line width in the opaque region 312. The conductive pattern 1110 may include a connection pattern 1110*c* for connecting the transparent substrate 1010*a* and the opaque substrate 1010*b*. In the opaque region 312, the connection pattern 1110*c* and the frit patterns in a certain shape on both side surfaces of the connection pattern 1110*c* may be arranged at certain distances. The connection pattern 1110*c* may include a first transmittance section 1111*c* with a first transmittance and a second transmittance section 1112*c* with a second transmittance.

The frit patterns 312*a* formed in the opaque region 312 may include metal grids with a certain diameter arranged in one axial direction and another axial direction. The metal grids of the frit patterns 312*a* which correspond to the second transmittance section 1112*c* of the connection pattern 1110*c* may be arranged at intersections of the metal mesh grids.

Referring to (b) of FIG. 6A and FIG. 6B, the frit patterns 312*b* formed in the opaque region 312 may include slot grids with a certain diameter, from which a metal region has been removed, disposed in one axial direction and another axial direction. The slot grids of the frit patterns 312*b* may be arranged between the metal mesh grids in the connection pattern 1110*c*. Accordingly, the metal regions of the frit patterns 312*b* where slot grids are not formed may be arranged at the intersections of the metal mesh grids.

Referring to FIGS. 6A and 6C, the connection pattern 1110*c* may include metal mesh grids with a first line width W1 in the first transmittance section 1111*c* adjacent to the transparent region 311. The connection pattern 1110*c* may be formed with a second line width W2 thicker than the first line width W1 in the second transmittance section 1112*c* adjacent to the opaque substrate 1010*b*. In this regard, the first transparency of the first transmittance section 1111*c* may be set to be higher than the second transparency of the second transmittance section 1112*c*.

When the transparent antenna assembly is attached to the inside of the vehicle glass as illustrated in FIGS. 5A to 5C, the transparent electrode part may be disposed in the transparent region 311 and the opaque substrate 1010*b* may be disposed in the opaque region 312. In this regard, the transparent electrode part may be arranged in the opaque region 312 in some cases.

Metal patterns of a low-penetration pattern electrode part and a high-penetration pattern electrode part located in the opaque region 312 may partially be arranged in a gradation region of the opaque region 312. When the antenna pattern and a transmission line portion of the low-penetration pattern electrode part are configured as a transparent electrode, a decrease in antenna gain may be caused by the deterioration of transmission efficiency due to an increase in sheet resistance. As a way to overcome this loss of gain, the transmittance of the frit pattern 312 where an electrode is located and the transmittance of the transparent electrode may be made equal to each other within a certain range.

Low sheet resistance may be achieved by increasing the line width of the transparent electrode located in a region where the transmittance of the frit pattern 312*a*, 312*b*, 312*c* is low or by adding the same shape as that of the frit pattern 312*a*, 312*b*, 312*c*. Accordingly, invisibility can be secured while solving the problem of deteriorated transmission efficiency. The transmittance and pattern of the opaque region 312 are not limited to those in the structure of FIG. 6A and may differ depending on a glass manufacturer or vehicle manufacturer. Accordingly, the shape and transparency (line width and separation distance) of the transparent electrode of the transmission line may change in various ways.

Figure 7A:
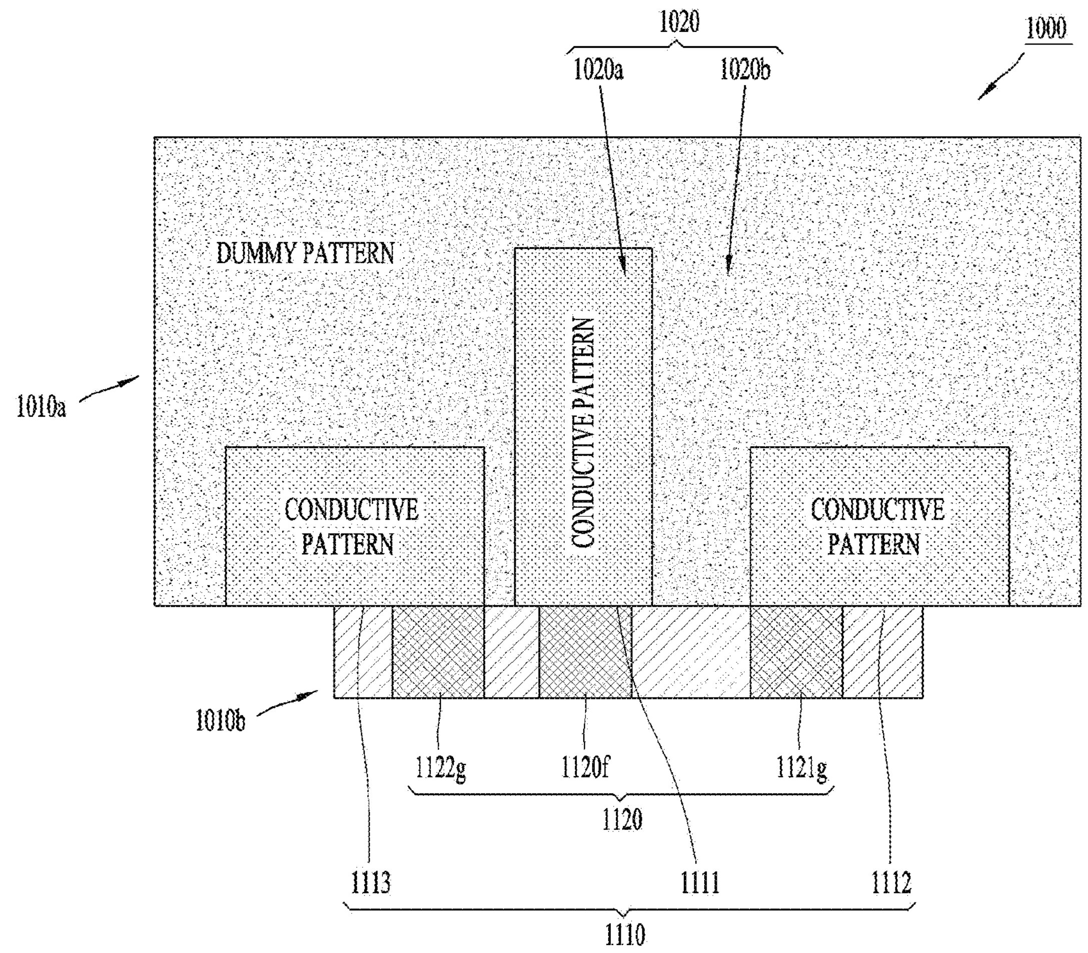
FIG. 7A shows a front view and a cross-sectional view of a transparent antenna assembly according to the present specification.
Figure 7A:
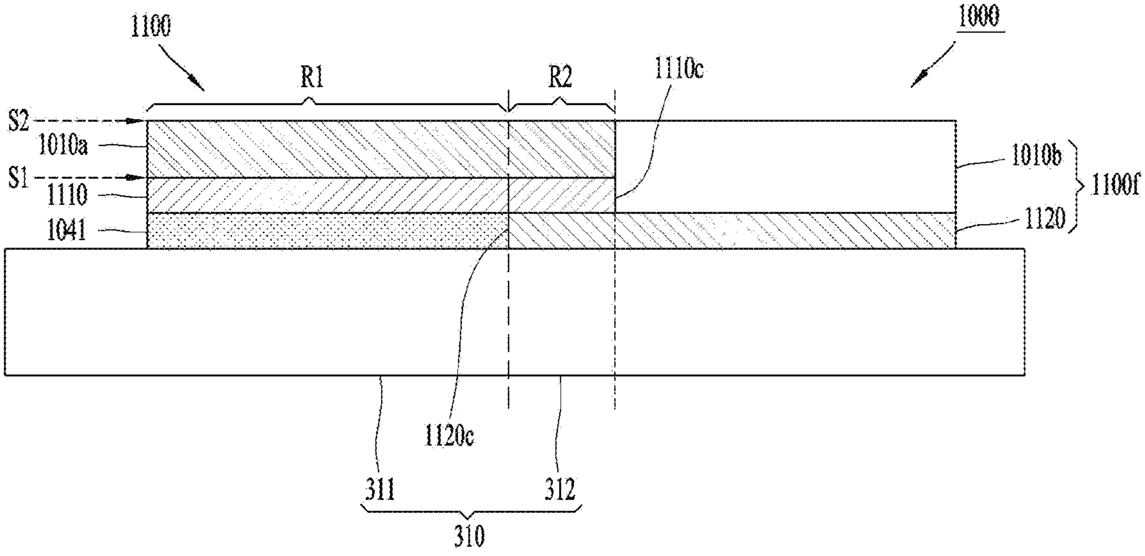
Figure 7B:
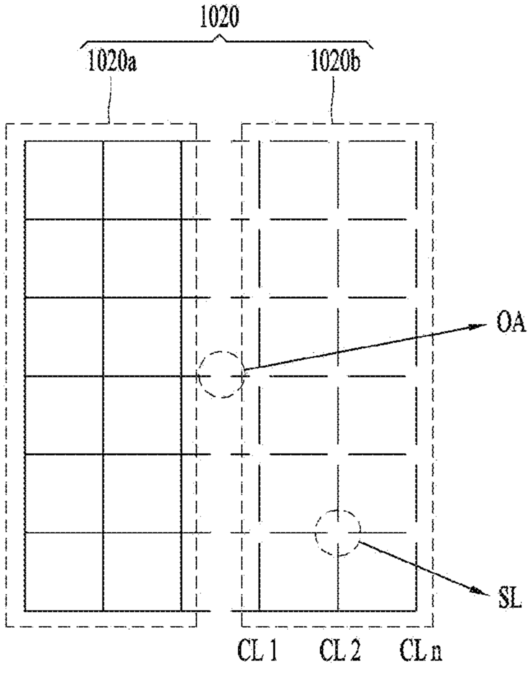
FIG. 7B illustrates a grid structure of a metal mesh radiator region and a dummy metal mesh region according to embodiments.
Figure 7B:
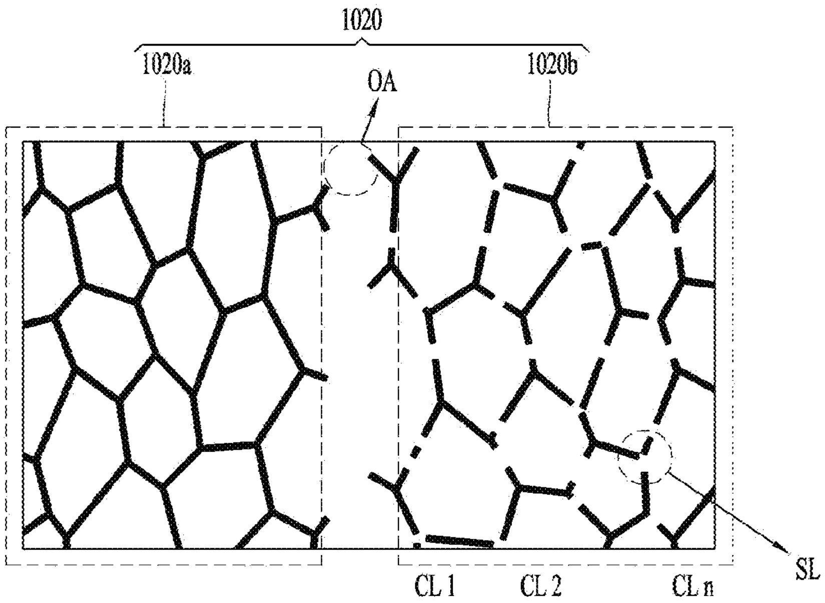

FIG. 7A shows a front view and a cross-sectional view of a transparent antenna assembly according to the specification. FIG. 7B is a diagram illustrating a grid structure of a metal mesh radiator region and a dummy metal mesh region according to embodiments.

(a) of FIG. 7A is a front view of a transparent antenna assembly 1000, and (b) of FIG. 7A is a cross-sectional view of the transparent antenna assembly 1000, showing the layered structure of the transparent antenna assembly 1000. Referring to FIG. 7A, the antenna assembly 1000 may include a first transparent dielectric substrate 1010*a* and a second dielectric substrate 1010*b*. Conductive patterns 1110 that act as a radiator may be disposed on one surface of the first transparent dielectric substrate 1010*a*. A feeding pattern 1120*f* and ground patterns 1121*g* and 1122*g* may be formed on one surface of the second dielectric substrate 1010*b*. The conductive patterns 1110 acting as the radiator may be configured to include one or more conductive patterns. The conductive patterns 1110 may include a first pattern 1111 connected to the feeding pattern 1120*f*, and a second pattern 1112 connected to the ground pattern 1121*g*. The conductive patterns 1110 may further include a third pattern 1113 connected to the ground pattern 1122*g*.

The conductive patterns 1110 constituting the antenna module may be implemented as a transparent antenna. Referring to FIG. 7B, the conductive patterns 1110 may be metal grid patterns 1020*a* with a certain line width or less to form a metal mesh radiator region. Dummy metal grid patterns 1020*b* may be formed in inner regions among or outer regions of the first to third patterns 1111, 1112, and 11113 of the conductive patterns 1100 to maintain transparency at a certain level. The metal grid patterns 1020*a* and the dummy metal grid patterns 1020*b* may form a metal mesh layer 1020.

(a) of FIG. 7B illustrates a l structure of the typical metal grid patterns 1020*a* and dummy metal grid patterns 1020*b*. (b) of FIG. 7 illustrates a structure of the atypical metal grid patterns 1020*a* and dummy metal grid patterns 1020*b*. As illustrated in (a) of FIG. 7B, the metal mesh layer 1020 may be formed in a transparent antenna structure by a plurality of metal mesh grids. The metal mesh layer 1020 may be formed in a typical metal mesh shape, such as a square shape, a diamond shape, or a polygonal shape. Conductive patterns may be configured such that the plurality of metal mesh grids operate as a feeding line or radiator. The metal mesh layer 1020 may constitute a transparent antenna region. As one example, the metal mesh layer 1020 may have a thickness of about 2 mm, but is not limited thereto.

The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form opening areas OA, thereby being electrically disconnected. The dummy metal grid patterns 1020*b* may have slits SL formed so that ends of mesh grids CL1, CL2, . . . , CLn are not connected.

Referring to (b) of FIG. 7B, the metal mesh layer 1020 may be formed by a plurality of atypical metal mesh grids. The metal mesh layer 1020 may include the metal grid patterns 1020*a* and the dummy metal grid patterns 1020*b*. The metal grid patterns 1020*a* and the dummy metal grid patterns 1020*b* may have ends disconnected from each other to form the opening areas OA, thereby being electrically disconnected. The dummy metal grid patterns 1020*b* may have slits SL formed so that ends of mesh grids CL1, CL2, . . . , CLn are not connected.

Figure 8A:
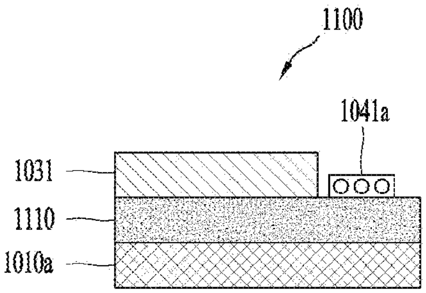
FIG. 8A illustrates the layered structure of an antenna module and a feeding module.
Figure 8A:
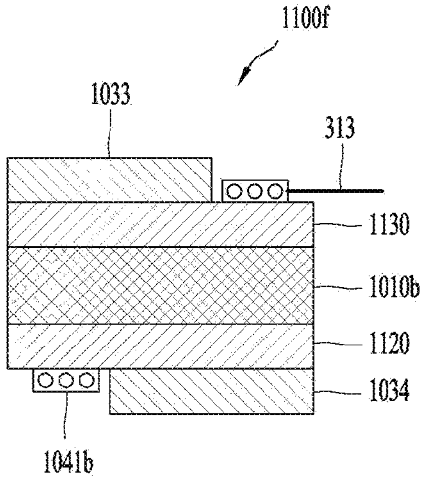
Figure 8B:
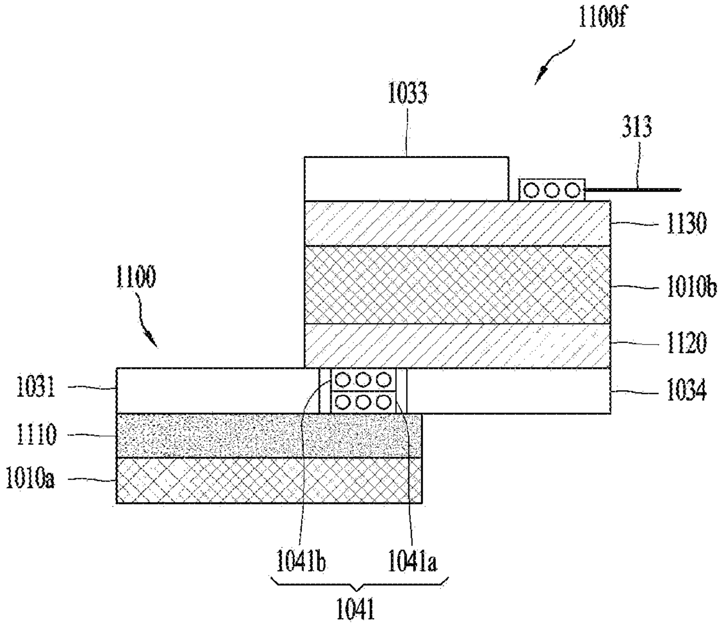
FIG. 8B illustrates an opaque substrate including the layered structure, in which the antenna module and the feeding structure are coupled to each other, and a coupling region.
Figure 8B:
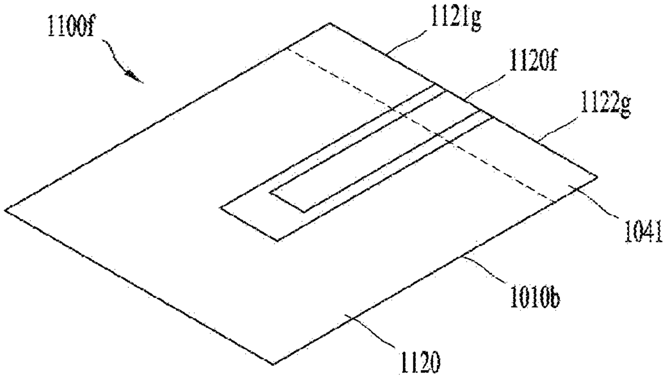

Meanwhile, the transparent substrate on which the transparent antenna according to the specification is formed may be placed on the vehicle glass. In this regard, FIG. 8A illustrates the layered structure of an antenna module and a feeding pattern. FIG. 8B illustrates an opaque substrate including the layered structure, in which the antenna module and the feeding structure are coupled to each other, and a coupling region.

Referring to (a) of FIG. 8A, the antenna module 1100 may include a first transparent dielectric substrate 1010*a* formed on a first layer, and a first conductive pattern 1110 formed on a second layer arranged on the first layer. The first conductive pattern 1110 may be implemented as the metal mesh layer 1020 including the metal grid patterns 1020*a* and the dummy metal grid patterns 1020*b*, as illustrated in FIG. 7B. The antenna module 1100 may further include a protective layer 1031 and an adhesive layer 1041*a* arranged on the second layer.

Referring to (b) of FIG. 8A, a feeding structure 1100*f* may include a second dielectric substrate 1010*b*, a second conductive pattern 1120, and a third conductive pattern 1130. The feeding structure 1100*f* may further include first and second protective layers 1033 and 1034 stacked on the second conductive pattern 1120 and the third conductive pattern 1130, respectively. The feeding structure 1100*f* may further include an adhesive layer 1041*b* formed on a partial region of the second conductive pattern 1120.

The second conductive pattern 1120 may be disposed on one surface of the second dielectric substrate 1010*b* implemented as an opaque substrate. The third conductive pattern 1130 may be disposed on another surface of the second dielectric substrate 1010*b*. The first protective layer 1033 may be formed on top of the third conductive pattern 1130. The second protective layer 1034 may be formed on the bottom of the second conductive pattern 1120. Each of the first and second protective layers 1033 and 1034 may be configured to have a low permittivity below a certain value, enabling low-loss feeding to the transparent antenna region.

Referring to (a) of FIG. 8B, the antenna module 1100 may be coupled with the feeding structure 1100*f* including the second dielectric substrate 1010*b*, which is the opaque substrate. The first conductive pattern 1110 implemented as the metal mesh layer, which is the transparent electrode layer, may be formed on top of the first transparent dielectric substrate 1010*a*. The protective layer 1031 may be formed on top of the first conductive pattern 1110. The protective layer 1031 and the first adhesive layer 1041*a* may be formed on top of the first conductive pattern 1110. The first adhesive layer 1041*a* may be formed adjacent to the protective layer 1031.

The first adhesive layer 1041*a* formed on top of the first conductive pattern 1110 may be bonded to the second adhesive layer 1041*b* formed on the bottom of the second conductive layer 1120. The first transparent dielectric substrate 1010*a* and the second dielectric substrate 1010*b* may be adhered by the bonding between the first and second adhesive layers 1041*a* and 1041*b*. Accordingly, the metal mesh grids formed on the first transparent dielectric substrate 1010*a* may be electrically connected to the feeding pattern formed on the second dielectric substrate 1010*b*.

The second dielectric substrate 1010*b* may be formed as the feeding structure 1100*f* that includes the second conductive pattern 1120 and the third conductive pattern 1130 arranged on one surface and another surface thereof. The feeding structure 1100*f* may be implemented as a flexible printed circuit board (FPCB), but is not limited thereto. The first protective layer 1033 may be disposed on top of the third conductive pattern 1130, and the second protective layer 1034 may be disposed on the bottom of the second conductive pattern 1120. The adhesive layer 1041*b* on the bottom of the third conductive pattern 1130 may be bonded to the adhesive layer 1041*a* of the antenna module 1100. Accordingly, the feeding structure 1100*f* may be coupled with the antenna module 1100 and the first and second conductive patterns 1110 and 1120 may be electrically connected.

The antenna module 1100 implemented with the first transparent dielectric substrate 1010*a* may be formed to have a first thickness. The feeding structure 1100*f* implemented with the second dielectric substrate 1010*b* may be formed to have a second thickness. For example, the thicknesses of the dielectric substrate 1010*a*, the first conductive pattern 1110, and the protective layer 1031 of the antenna module 1100 may be 75 μm, 9 μm, and 25 μm, respectively. The first thickness of the antenna module 1100 may be 109 um. The thicknesses of the second dielectric substrate 1010*b*, the second conductive pattern 1120, and the third conductive pattern 1130 of the feeding structure 1100*f* may be 50 um, 18 um, and 18 um, respectively, and the thicknesses of the first and second protective layers 1033 and 1034 may be 28 um. Accordingly, the second thickness of the feeding structure 1100*f* may be 142 um. Since the adhesive layers 1041*a* and 1041*b* are formed on the top of the first conductive pattern 1110 and the bottom of the second conductive pattern 1120, the entire thickness of the antenna assembly may be smaller than the sum of the first thickness and the second thickness. For example, the antenna assembly 1000 including the antenna module 1100 and the feeding structure 1100*f* may have a thickness of 198 um.

Referring to (b) of FIG. 8B, the conductive pattern 1120 may be formed on one surface of the second dielectric substrate 1010*b* forming the feeding structure 1100*f*. The conductive pattern 1120 may be formed in a CPW-type feeding structure that includes the feeding pattern 1120*f* and the ground patterns 1121*g* and 1122*g* formed on both sides of the feeding pattern 1120*f*. The feeding structure 1100*f* may be coupled with the antenna module 1100, as illustrated in (a) of FIG. 8B, through a region where the adhesive layer 1041 is formed.

The antenna module and the feeding structure constituting the antenna assembly according to the specification may be arranged on the vehicle glass and coupled through a specific coupling structure. In this regard, FIG. 9A illustrates a coupling structure of a transparent antenna that is disposed in a transparent region and a frit region of vehicle glass.

Figure 9A:
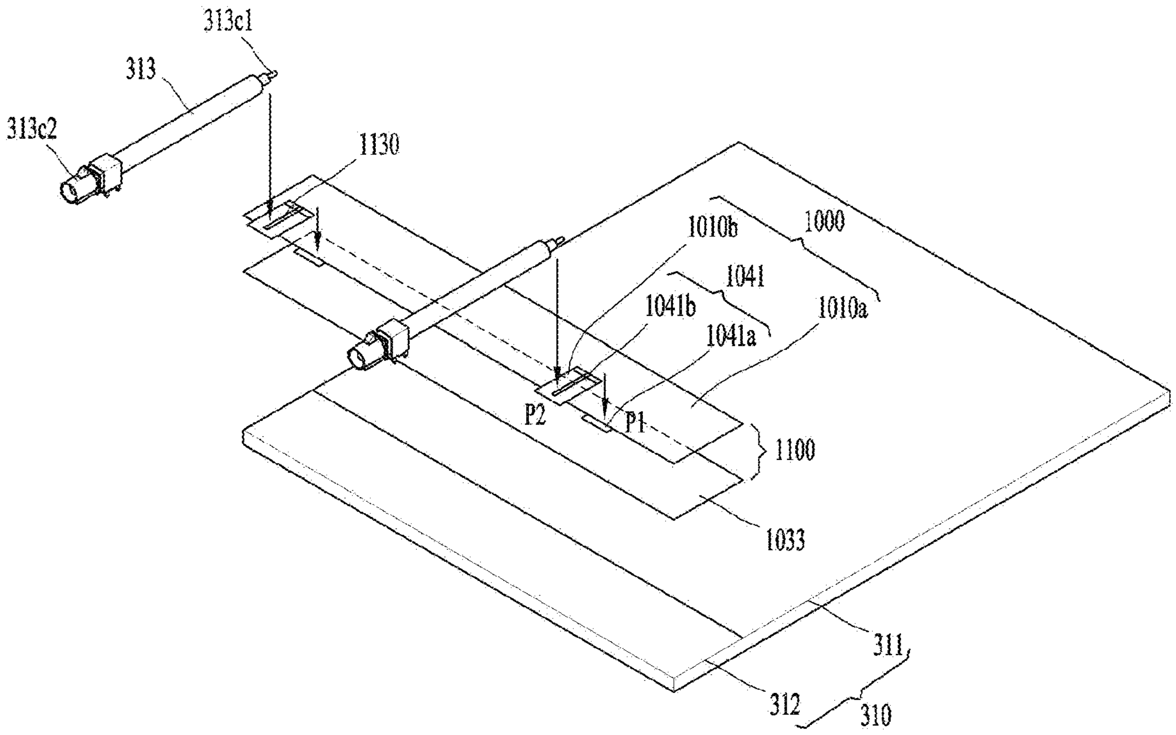
FIG. 9A illustrates a coupling structure of a transparent antenna that is disposed in a transparent region and a frit region of vehicle glass.

Referring to FIG. 9A, the first transparent dielectric substrate 1010*a* may be adhered to the glass panel 310 through the adhesive layer 1041. The conductive pattern of the first transparent dielectric substrate 1010*a* may be bonded to the conductive pattern 1130 of the second dielectric substrate 1010*b* through ACF bonding. ACF bonding involves bonding of a tape, to which metal balls are added, to a bonding surface at high temperature/high pressure (e.g., 120 to 150 degrees, 2 to 5 Mpa) for a few seconds, and may be achieved by allowing electrodes to be in contact with each other through the metal balls therebetween. ACF bonding electrically connects conductive patterns and simultaneously provides adhesive strength by thermally hardening the adhesive layer 1041.

The first transparent dielectric substrate 1010*a* on which the transparent electrode layer is formed and the second dielectric substrate 1010*b* in the form of the FPCB may be attached to each other through local soldering. The connection pattern of the FPCB and the transparent antenna electrode may be connected through the local soldering using a coil in a magnetic field induction manner. During such local soldering, the FPCB may be maintained flat without deformation due to an increase in temperature of a soldered portion. Accordingly, an electrical connection with high reliability may be achieved through the local soldering between the conductive patterns of the first transparent dielectric substrate 1010*a* and the second dielectric substrate 1010*b*.

The first transparent dielectric substrate 1010*a*, the metal mesh layer 1020 of FIG. 7A, the protective layer 1033, and the adhesive layer 1041 may form a transparent electrode. The second dielectric substrate 1010*b*, which is the opaque substrate, may be implemented as the FPCB, but is not limited thereto. The second dielectric substrate 1010*b*, which is the FPCB with the feeding pattern, may be connected to the connector part 313 and the transparent electrode.

The second dielectric substrate 1010*b*, which is the opaque substrate, may be attached to a partial region of the first transparent dielectric substrate 1010*a*. The first transparent dielectric substrate 1010*a* may be formed in the transparent region 311 of the glass panel 310. The second dielectric substrate 1010*b* may be formed in the opaque region 312 of the glass panel 310. The partial region of the first transparent dielectric substrate 1010*a* may be formed in the opaque region 312, and the first transparent dielectric substrate 1010*a* may be coupled to the second dielectric substrate 1010*b* in the opaque region 312.

The first transparent dielectric substrate 1010*a* and the second dielectric substrate 1010*b* may be adhered by the bonding between the adhesive layers 1041*a* and 1041*b*. A position at which the second dielectric substrate 1010*b* is bonded to the adhesive layer 1041 may be set to a first position P1. A position at which the connector part 313 is soldered to the opaque substrate 1010*b* may be set to a second position P2.

Figure 9B:
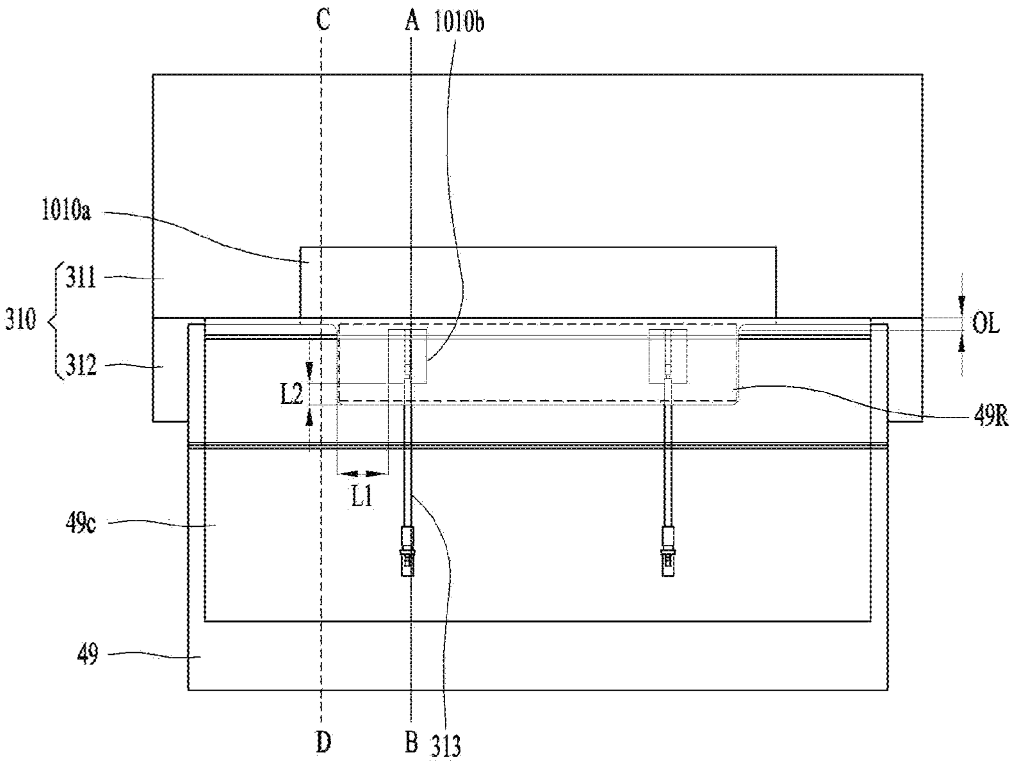
FIG. 9B is an enlarged front view of a region where glass with the transparent antenna of FIG. 9A is coupled to a body structure of the vehicle.
Figure 9C:
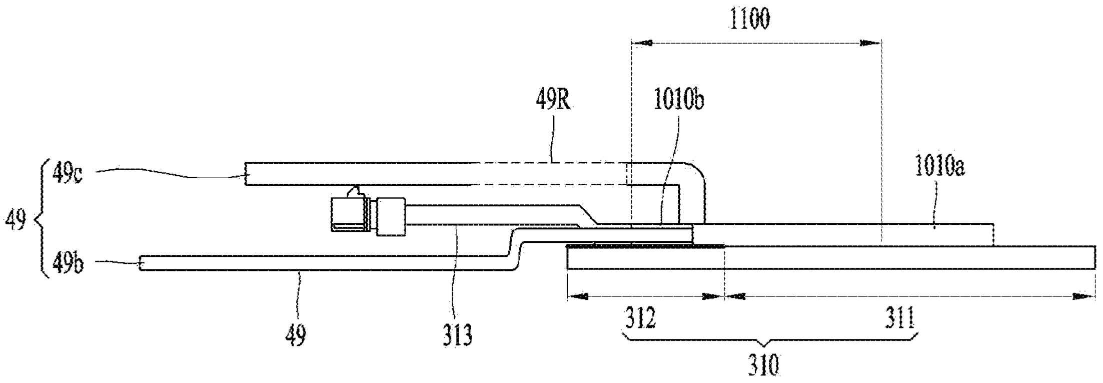
FIG. 9C is a cross-sectional view illustrating the coupling structure between the vehicle glass and the body structure of FIG. 9B, viewed from different positions.
Figure 9C:
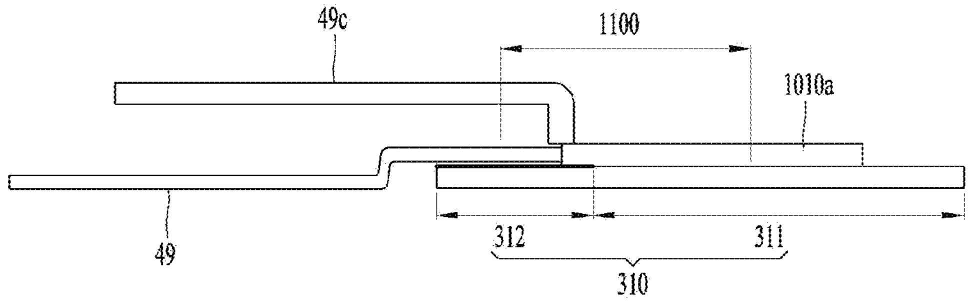

Meanwhile, the vehicle glass on which the antenna assembly according to the specification is formed may be coupled to a body structure of the vehicle. In this regard, FIG. 9B is an enlarged front view of a region where glass with the transparent antenna of FIG. 9A is coupled to a body structure of a vehicle. FIG. 9C is a cross-sectional view illustrating the coupling structure between the vehicle glass and the body structure of FIG. 9B, viewed from different positions.

Referring to FIG. 9B, the first transparent dielectric substrate 1010*a* on which a transparent antenna is formed may be disposed in the transparent region 311 of the glass panel 310. The second dielectric substrate 1010*b* may be disposed in the opaque region 312 of the glass panel 310. Since the transmittance of the opaque region 312 is lower than that of the transparent region 311, the opaque region 312 may also be referred to as a black matrix (BM) region. A portion of the first transparent dielectric substrate 1010*a* on which the transparent antenna is formed may extend up to the opaque region 312 corresponding to the BM region. The first transparent dielectric substrate 1010*a* and the opaque region 312 may be formed to overlap each other by an overlap length OL in one axial direction.

(a) of FIG. 9C is a cross-sectional view of the antenna assembly, cut along the line AB in FIG. 9B. (a) of FIG. 9C is a cross-sectional view of the antenna assembly, cut along the line CD in FIG. 9B.

Referring to FIG. 9B and (a) of FIG. 9C, the first transparent dielectric substrate 1010*a* on which the transparent antenna is formed may be disposed in the transparent region 311 of the glass panel 310. The second dielectric substrate 1010*b* may be disposed in the opaque region 312 of the glass panel 310. The partial region of the first transparent dielectric substrate 1010*a* may extend up to the opaque region 312, so that the feeding pattern formed on the second dielectric substrate 1010*b* and the metal mesh layer of the transparent antenna are bonded to each other.

An interior cover 49*c* may be configured to accommodate the connector part 313 connected to the second dielectric substrate 1010*b*. The connector part 313 may be disposed in a space between a body 49*b* made of a metal material and the interior cover 49*c*, and the connector part 313 may be coupled to an in-vehicle cable. The interior cover 49*c* may be placed in the upper region of the metal body 49*b*. The interior cover 49*c* may be formed with one end bent to be coupled to the metal body 49*b*.

The interior cover 49*c* may be made of a metal material or dielectric material. When the interior cover 49*c* is made of a metal material, the interior cover 49*c* and the body 49*b* made of the metal material constitute a metal frame 49. In this regard, the vehicle may include the metal frame 49. The opaque region 312 of the glass panel 310 may be supported by a portion of the metal frame 49. To this end, a portion of the body 49*b* of the metal frame 49 may be bent to be coupled to the opaque region 312 of the glass panel 310.

When the interior cover 49*c* is made of a metal material, at least a portion of a metal region of the interior cover 49*c* in the upper region of the second dielectric substrate 1010*b* may be cut out. A recess portion 49R from which the metal region has been cut out may be formed in the interior cover 49*c*. Accordingly, the metal frame 49 may include the recess portion 49R. The second dielectric substrate 1010*b* may be placed within the recess portion 49R of the metal frame 49.

The recess portion 49R may also be referred to as a metal cut region. One side of the recess portion 49R may be formed to be spaced apart from one side of the opaque substrate 1010*b* by a first length L1 which is equal to or greater than a threshold value. A lower boundary side of the recess portion 49R may be formed to be spaced apart from a lower boundary side of the opaque substrate 1010*b* by a second length L2 which is equal to or greater than a threshold value. As the metal is removed from the partial region of the interior cover 49*c* made of the metal material, signal loss and changes in antenna characteristics due to a surrounding metal structure can be suppressed.

Referring to FIG. 9B and (b) of FIG. 9C, a recess portion like a metal cut region may not be formed in the interior cover 49*c* in a region where the connector part and the opaque substrate are not arranged. In this regard, while protecting the internal components of the antenna module 1100 by use of the interior cover 49*c*, internal heat may be dissipated to the outside through the recess portion 49R of FIG. 9B and (a) of FIG. 9C. In addition, whether it is necessary to repair a connected portion may be immediately determined through the recess portion 49R of the interior cover 49*c*. Meanwhile, since the recess portion is formed in the interior cover 49*c* in a region where the connector part and the second dielectric substrate are not arranged, the internal components of the antenna module 1100 may be protected.

Meanwhile, an antenna assembly 1000 according to the specification may be formed in various shapes on a glass panel 310, and the glass panel 310 may be attached to a vehicle frame. In this regard, FIG. 10 illustrates a laminated structure of an antenna assembly and a region where vehicle glass is attached to a vehicle frame according to embodiments.

Figure 10:
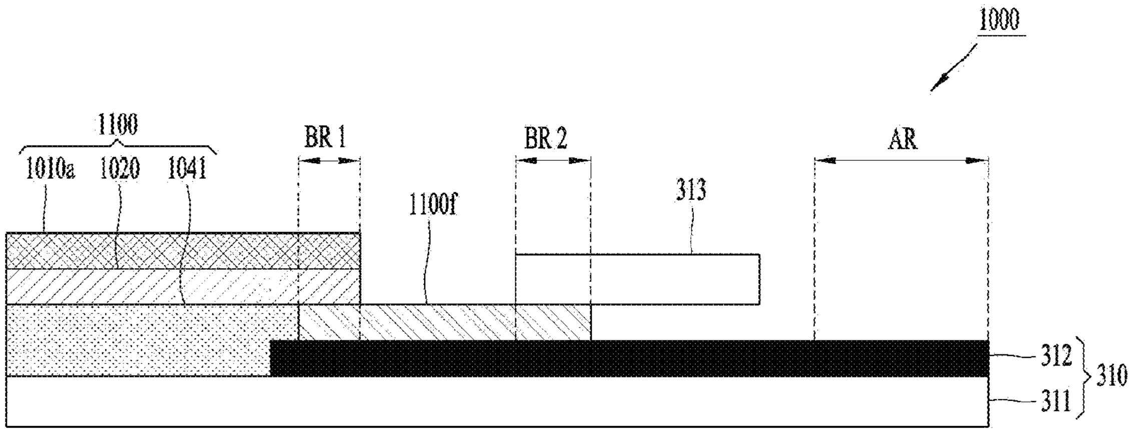
FIG. 10 is a diagram illustrating a laminated structure of an antenna assembly according to embodiments and an attachment region between vehicle glass and a vehicle frame.
Figure 10:
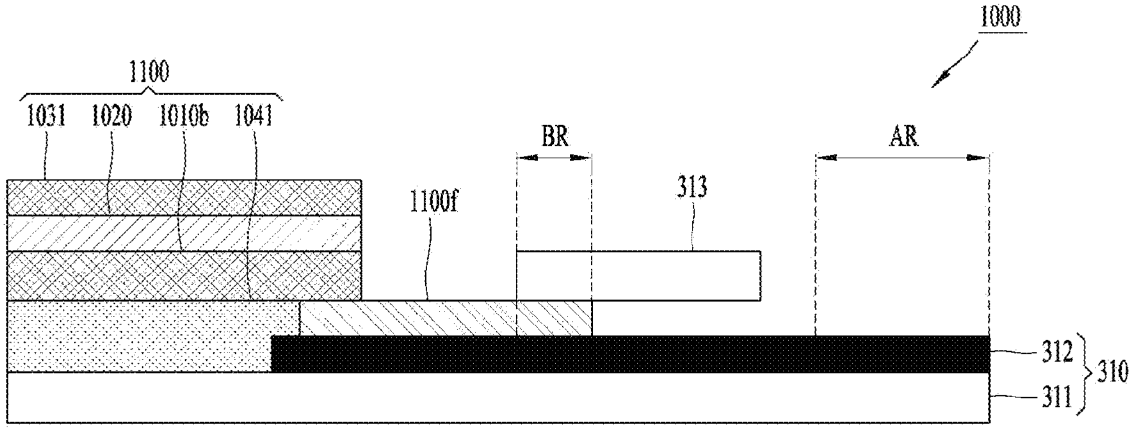

Referring to (a) of FIG. 10, the glass panel 310 may include a transparent region 311 and an opaque region 312. The antenna assembly 1000 may include an antenna module 1100 and a feeding structure 1100*f*. The antenna module 1100 may include a first transparent dielectric substrate 1010*a*, a transparent electrode layer 1020, and an adhesive layer 1041. The feeding structure 1100*f* implemented as an opaque region and the transparent electrode layer 1020 implemented as a transparent substrate may be electrically connected to each other. The feeding structure 1100*f* and the transparent electrode layer 1020 may be directly connected through a first bonding region BR1. The feeding structure 1100*f* and the connector part 313 may be directly connected through a second bonding region BR2. Heat may be applied for bonding in the first and second bonding regions BR1 and BR2. Accordingly, the bonding regions BR1 and BR2 may be referred to as heating sections. An attachment region AR corresponding to a sealant region for attachment of the glass panel 310 to the vehicle frame may be formed on a side end area in the opaque region 312 of the glass panel 310.

Referring to (b) of FIG. 10, the glass panel 310 may include a transparent region 311 and an opaque region 312. The antenna assembly 1000 may include an antenna module 1100 and a feeding structure 1100*f*. The antenna module 1100 may include a protective layer 1031, a transparent electrode layer 1020, a first transparent dielectric substrate 1010*a*, and an adhesive layer 1041. The feeding structure 1100*f* implemented as an opaque region may overlap a partial region of the antenna module 1100 implemented as a transparent substrate. The feeding structure **1100*f* and the transparent electrode layer 1020 of the antenna module 1100 may be connected in a coupling-feeding manner. The feeding structure 1100*f* and the connector part 313 may be directly connected through a bonding region BR. Heat may be applied for bonding in the bonding region BR1. Accordingly, the bonding region BR may be referred to as a heating section. An attachment region AR corresponding to a sealant region for attachment of the glass panel 310 to the vehicle frame may be formed on a side end area in the opaque region 312 of the glass panel 310**.

Referring to (a) and (b) of FIG. 10, the transparent substrate **1010*a* may include a (hard) coating layer to protect the transparent electrode layer 1020 from an external environment. Meanwhile, a UV-cut component may be added to the adhesive layer 1041** to suppress yellowing due to sunlight.

Figure 11:
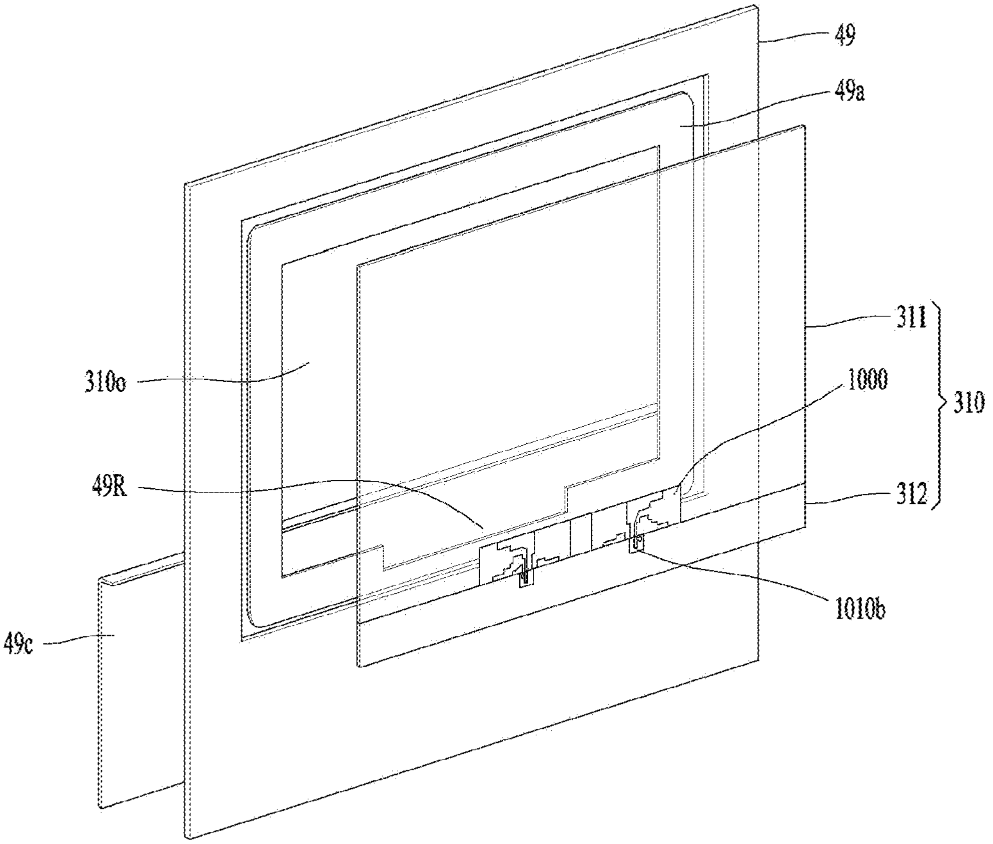
FIG. 11 illustrates a structure in which a glass panel of a vehicle, on which an antenna assembly is formed, is arranged on a metal frame of a vehicle body.
Figure 12A:
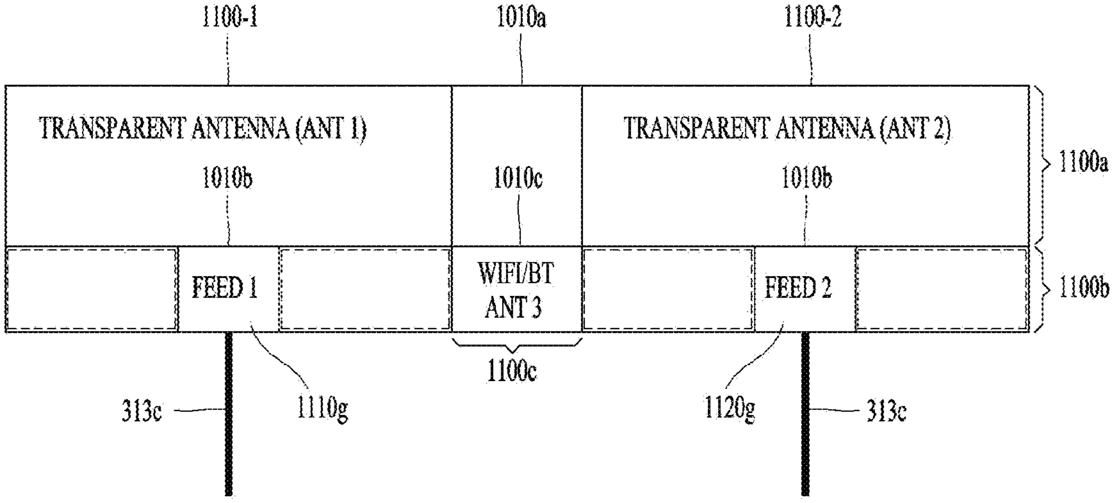
FIG. 12A illustrates a slot antenna region that may be located between first and second ground regions. Meanwhile.
Figure 12B:
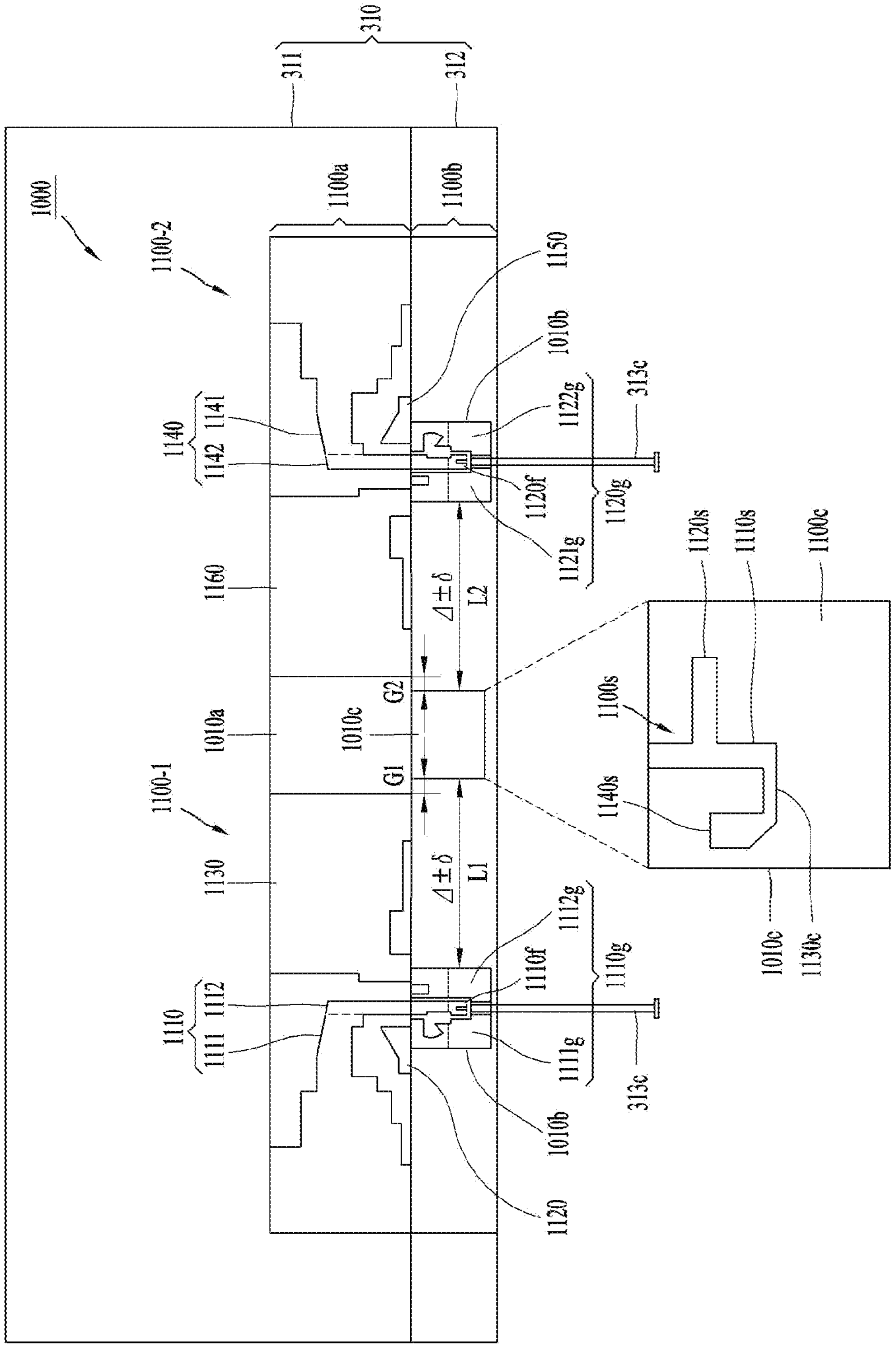
FIG. 12B illustrates an antenna assembly structure in which a slot antenna is arranged between first and second transparent antennas according to an embodiment.

Hereinafter, a vehicle having an antenna assembly that may be attachable to vehicle glass according to this specification will be described with reference to drawings. In this regard, FIG. 11 illustrates a structure in which a glass panel of a vehicle having an antenna assembly formed thereon is arranged on a metal frame of a vehicle body. FIG. 12A illustrates a slot antenna region that may be located between first and second ground regions. Meanwhile, FIG. 12B illustrates an antenna assembly structure in which a slot antenna is arranged between first and second transparent antennas according to an embodiment.

Referring to FIG. 11, the metal frame 49 may be configured to have an opening **310*o* formed therein so that the glass panel 310 may be inserted. An adhesive region 49*a* may be formed in an outer area of the metal frame 49 which surrounds the opening 310*o*. The metal frame 49 may have a recess portion 49R formed in one region (e.g., a lower region) of the opening 310*o* from which a metal region has been cut out. The glass panel 310 may be configured to include a transparent region 311 and an opaque region 311. The antenna assembly 1000 may be disposed on the glass panel 310**.

Referring to FIG. 12A, the antenna assembly 1000 may include a first region **1100*a* which is a radiator region implemented as a transparent antenna, and a second region 1100*b* which is implemented as a feeding structure (ground structure). The first region 1100*a* may be formed as a first transparent dielectric substrate 1010*a*. First and second transparent antennas 1100-1 and 1100-2 may be placed on the first transparent dielectric substrate 1010*a* of the first region 1100*a*. A second dielectric substrate 1010*b* configured to feed the first and second transparent antennas 1100-1 and 1100-2 may be arranged in the second region 1100*b*. First and second ground regions 1110*g* and 1120*g* may be formed on the second dielectric substrate 1010*b*. First and second feeding patterns may be arranged in the first and second ground regions 1110*g* and 1120*g* to feed the first and second transparent antennas 1100-1 and 1100-2**.

A third region **1100*c*, which is a slot antenna region for Wi-Fi/BT wireless communication, may be formed between the first ground region 1110*g* and the second ground region 1120*g*. Meanwhile, the slot antenna region for Wi-Fi/BT wireless communication is not limited to the region between the first ground region 1110*g* and the second ground region 1120*g*. The slot antenna region may be formed in an empty space of the second region 1100*b*, for example, on one side or another side of the first ground region 1110*g*. Additionally, the slot antenna region may be formed in an empty space of the second region 1100*b*, for example, on one side or another side of the second ground region 1120*g*. In this regard, the second region 1100*b* including the first and second ground regions 1110*g* and 1120*g*** may be implemented integrally with the slot antenna region using a flexible printed circuit board (FPCB).

Referring to FIGS. 1, 9A to 9C, and 11 to 12B, the vehicle may be configured to include a glass panel 310 and an antenna assembly 1000. The antenna assembly 1000 may be configured to include a first dielectric substrate **1010*a* which is a transparent substrate, a second dielectric substrate 1010*b* which is an opaque substrate, and a slot pattern 1100*s***.

The metal frame 49 may be configured to have an opening **310*o* formed therein so that the glass panel 310 may be inserted. An adhesive region 49*a* may be formed in an outer area of the metal frame 49 which surrounds the opening 310*o*. The metal frame 49 may have a recess portion 49R formed in one region (e.g., a lower region) of the opening 310*o* from which a metal region has been cut out. The glass panel 310 may be configured to include a transparent region 311 and an opaque region 311. The antenna assembly 1000 may be placed on the glass panel 310**.

The first region **1100*a* may include antenna elements 1100 that include conductive patterns on one side of the first dielectric substrate 1010*a* and are configured to radiate radio signals. The second region 1100*b* may include ground conductive patterns 1111*g* and 1112*g* and a feeding pattern 1110*f*. The first region 1100*a* and the second region 1100*b*** may also be referred to as a radiator area and a ground area (or a feeding area), respectively.

The first dielectric substrate **1010*a* may be disposed on the transparent region 311 of the glass panel 310. The first transparent antenna 1100-1 and the second transparent antenna 11002 may be formed on one side of the first dielectric substrate 1010*a*. The first transparent antenna 1100-1 and the second transparent antenna 11002 may be referred to as a first radiation structure and a second radiation structure, respectively. The second dielectric substrate 1010*b* may include a first ground region 1110*g* and a second ground region 1120*g*. The second dielectric substrate 1010*b* may be placed in the recess portion 49R of the metal frame 49 and the opaque region 312 of the glass panel 310**.

The slot pattern **1100*s* may be disposed between the first ground region 1110*g* and the second ground region 1120*g*. In this regard, FIGS. 13A and 13**B illustrate electric field distributions in first and second frequency bands formed in a slot antenna structure formed as a slot pattern.

Referring to FIGS. 12A to 13B, the slot pattern **1100*s* may be formed in a pattern region 1100*c* that is located between the first ground region 1110*g* and the second ground region 1120*g*. Since the slot pattern 1100*s* operates as a radiator that radiates radio signals, the slot pattern 1100*s* may also be referred to as a slot antenna. The slot pattern 1100*s* may include a first slot pattern 1110*s* and a second slot pattern 1120*s***.

The first slot pattern **1110*s* may be formed vertically in one axial direction on the pattern region 1100*c*. The first slot pattern 1110*s* may be configured to radiate a signal of a first operating frequency band. The second slot pattern 1120*s* may be formed horizontally in another axial direction perpendicular to the one axial direction on one point of the first slot pattern 1110*s*. The second slot pattern 1120*s*** may be configured to radiate a signal of a second operating frequency band which is higher than the first operating frequency band. In this regard, the first and second operating frequency bands may be set to 2.4 GHz and 5.5 GHz, respectively.

The first slot pattern **1110*s* may form a vertical slot region. The second slot pattern 1120*s* may form a horizontal slot region in a first direction of the another axial direction. The slot pattern 1110***s* may further include an additional slot pattern extending from one end of the first slot pattern 1110*s*. The slot pattern 1110*s* may further include a third slot pattern 1130*s* fed by the feeding pattern 1130*f*. The slot pattern 1110*s* may further include a fourth slot pattern 1140*s*. The third slot pattern 1130*s* and the fourth slot pattern 1140*s* may be referred to as a feeding slot pattern and a matching slot pattern, respectively.

The third slot pattern 1130*s* may be formed such that one end thereof extends from one end of the first slot pattern 1110*s*. The third slot pattern 1130*s* may be formed in an opposite direction to the second slot pattern 1120*s* to be horizontal in a second direction of the another axial direction. The third slot pattern 1130*s* may be configured to be coupling-fed by the feeding pattern 1130*f* so that the signal of the first or second operating frequency band is fed. The fourth slot pattern 1140*s* may be formed such that one end thereof extends from another end of the third slot pattern 1130*s*.

The fourth slot pattern 1140*s* may be formed parallel to the first slot pattern 1110*s*. Another end of the fourth slot pattern 1140*s* may be formed at a lower position than a position where the second slot pattern 1120 is formed. Accordingly, a current formed in the fourth slot pattern 1140*s* can maintain an interference level of a critical level or less with a current in the upper region of the first slot pattern 1110*s* and the second slot pattern 1120*s*.

Figure 13A:
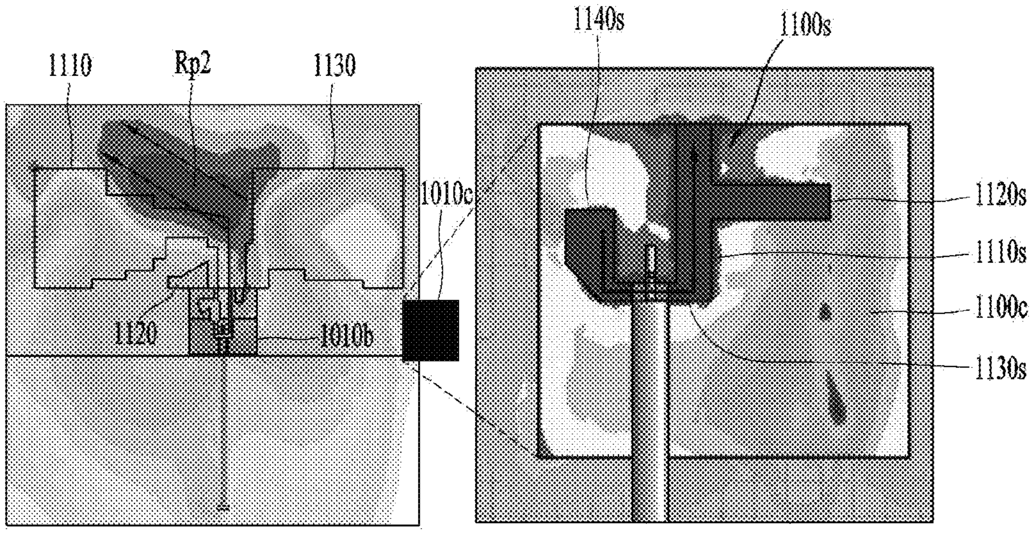
FIGS. 13A and 13B illustrate electric field distributions in first and second frequency bands formed in a slot antenna structure implemented as a slot pattern.

Referring to FIG. 13A, the first slot pattern 1110*s* may operate as a main radiator in the first operating frequency band corresponding to the 2.4 GHz band. The first slot pattern 1110*s*, the third slot pattern 1130*s*, and the fourth slot pattern 1140*s* may be configured to radiate a first signal of the first operating frequency band. Referring to FIGS. 9 to 13A, the first slot pattern 1110*s*, the third slot pattern 1130*s*, and the fourth slot pattern 1140*s* may be configured to radiate the first signal toward the transparent region 311 of the glass panel 310.

Figure 13B:
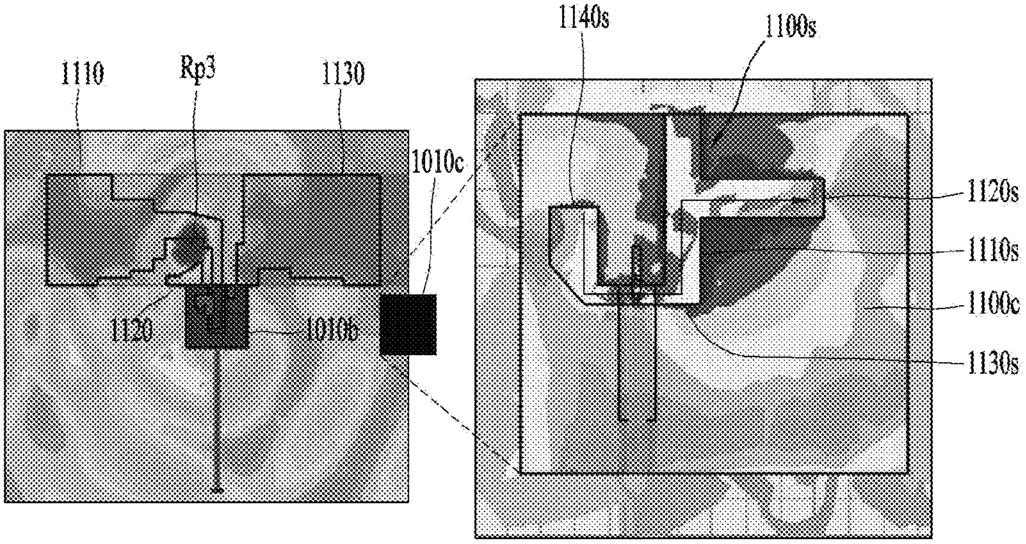

Referring to FIG. 13B, the second slot pattern 1120*s* may operate as a main radiator in the second operating frequency band corresponding to the 5.5 GHz band. The lower region of the first slot pattern 1110*s*, the second slot pattern 1120*s*, the third slot pattern 1130*s*, and the fourth slot pattern 1140*s* may be configured to radiate a second signal of the second operating frequency band. Referring to FIGS. 9 to 12B and 13B, the second slot pattern 1120*s*, the third slot pattern 1130*s*, and the fourth slot pattern 1140*s* may be configured to radiate the second signal toward the transparent region 311 of the glass panel 310. In this regard, the signals of the first and second operating frequency bands may be, but are not limited to, Wi-Fi signals of the 2.4 GHz band and the 5.5 GHz band or BL signals of the 2.4 GHz band.

In some embodiments, the slot antenna of the slot pattern for Wi-Fi/Bluetooth wireless communications according to this specification may be configured in various structures. In this regard, FIGS. 14A to 14C illustrate structures of slot antennas formed as slot patterns according to embodiments.

Referring to FIGS. 13A to 14C, a direction in which an open slot constituting a slot pattern is formed may be a direction oriented from the opaque region 312 of the glass panel, on which a frit layer is formed, toward the center of the transparent region 311. In this regard, the radiation pattern of the slot antenna structure implemented with the slot pattern may be formed in an end-fire form toward the center of the glass panel.

Figure 14A:
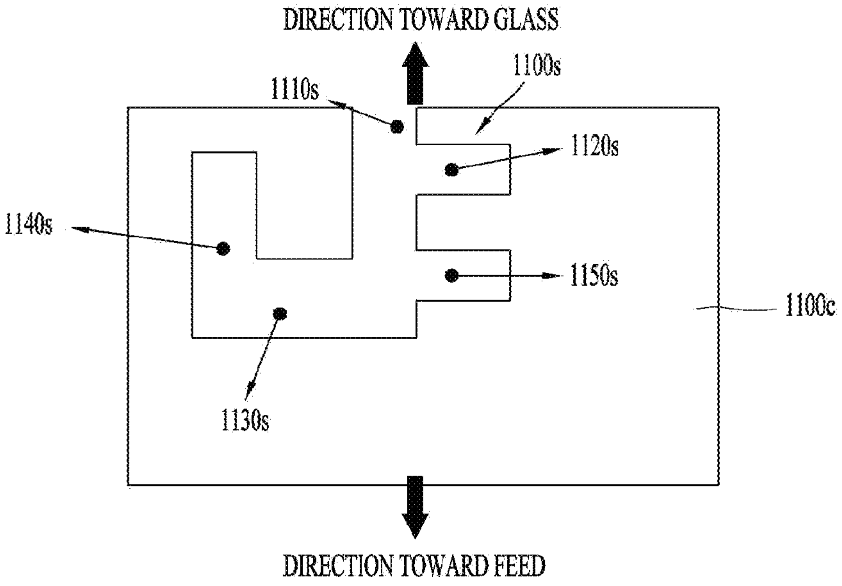
FIGS. 14A to 14C illustrate structures of slot antennas each formed as slot patterns according to embodiments.
Figure 14B:
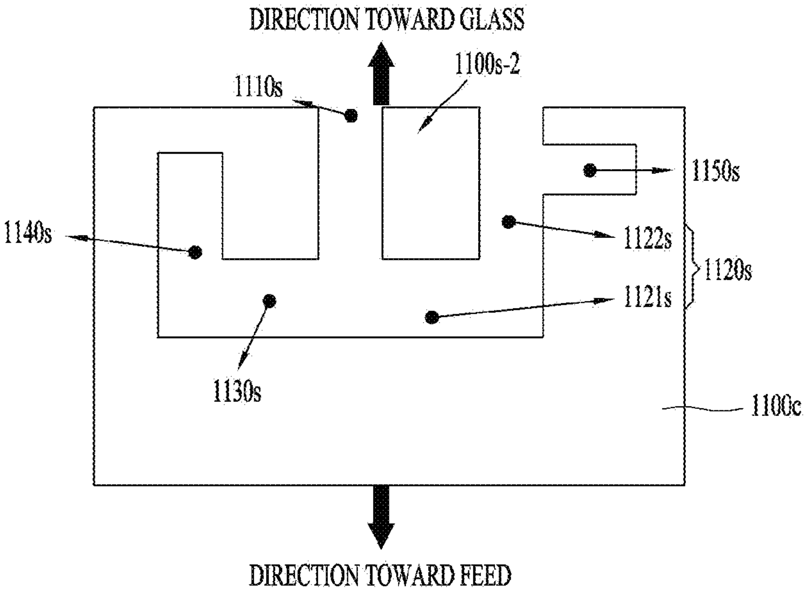
Figure 14C:
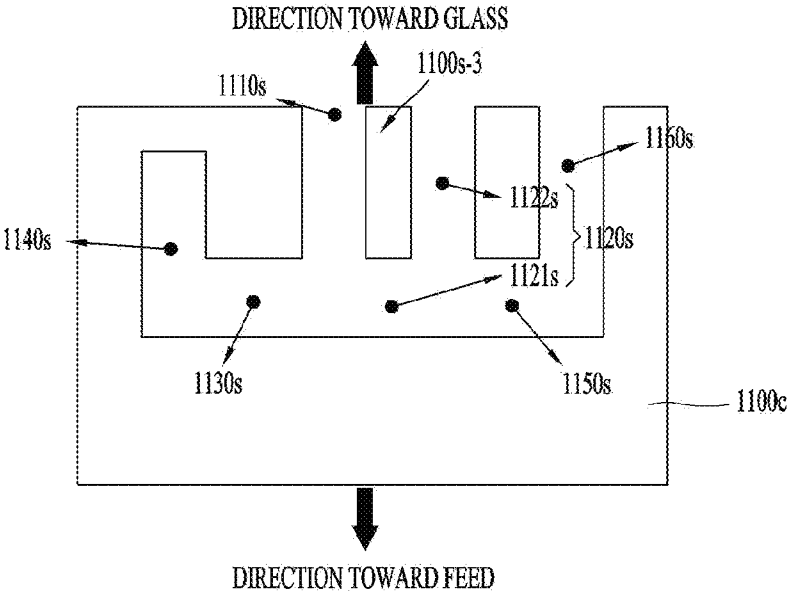

Referring to FIG. 14A, the slot pattern 1100*s*-1 may further include a fifth slot pattern 1150*s* parallel to the second slot pattern 1120*s*. The fifth slot pattern 1150*s* may be formed horizontally in another axial direction perpendicular to the one axial direction on a second point of the first slot pattern 1110*s*. The fifth slot pattern 1150*s* may be formed in a region lower than the second slot pattern 1120*s*. The fifth slot pattern 1150*s* may be disposed parallel to the second slot pattern 1120*s*. The length of the fifth slot pattern 1150*s* may be shorter than the length of the second slot pattern 1120*s*.

The second slot pattern 1120*s* may be configured to radiate a second signal of a first sub-frequency band of the second operating frequency band. The fifth slot pattern 1150*s* may be configured to radiate a third signal of a second sub-frequency band higher than the first sub-frequency band. Accordingly, the first slot pattern 1110*s* may radiate the first signal of the first operating frequency band. The second slot pattern 1120*s* may radiate the second signal of the first sub-frequency band of the second operating frequency band. The fifth slot pattern 1150*s* may radiate the third signal of the second sub-frequency band of the second operating frequency band. With regard to this, the first wavelength λ1 of the first signal, the second wavelength λ2 of the second signal, and the third wavelength λ3 of the third signal may be set as λ1>λ2>λ3.

Referring to FIG. 14B, the second slot pattern 1120*s* of the slot pattern 1100*s*-2 may be formed with a plurality of sub-slot patterns. The second slot pattern 1120*s* may include a first sub-slot pattern 1121*s* and a second sub-slot pattern 1122*s*.

The first sub-slot pattern 1121*s* may be formed such that one end thereof extends from an end of the first slot pattern 1110*s*. The first sub-slot pattern 1121*s* may be formed perpendicularly to the first slot pattern 1110*s*. The second sub-slot pattern 1122*s* may be formed perpendicularly to the first sub-slot pattern 1121*s* on an end of the first sub-slot pattern 1121*s*. The second sub-slot pattern 1122*s* may be disposed parallel to the first slot pattern 1110*s*. The slot pattern 1100*s*-2 may further include a fifth slot pattern 1150*s*. The fifth slot pattern 1150*s* may be formed horizontally in another axial direction perpendicular to the one axial direction on one point of the second sub-slot pattern 1122*s*.

The second sub-slot pattern 1122*s* of the second slot pattern 1120*s* may be configured to radiate a second signal of a first sub-frequency band of the second operating frequency band. The fifth slot pattern 1150*s* may be configured to radiate a third signal of a second sub-frequency band higher than the first sub-frequency band. Accordingly, the first slot pattern 1110*s* may radiate the first signal of the first operating frequency band. The second slot pattern 1120*s* may radiate the second signal of the first sub-frequency band of the second operating frequency band. The fifth slot pattern 1150*s* may radiate the third signal of the second sub-frequency band of the second operating frequency band. With regard to this, the first wavelength λ1 of the first signal, the second wavelength λ2 of the second signal, and the third wavelength λ3 of the third signal may be set as λ1>λ2>λ3.

Referring to FIG. 14C, the second slot pattern 1120*s* of the slot pattern 1100*s*-3 may be formed with a plurality of sub-slot patterns. The second slot pattern 1120*s* may include a first sub-slot pattern 1121*s* and a second sub-slot pattern 1122*s*.

The first sub-slot pattern 1121*s* may be formed such that one end thereof extends from an end of the first slot pattern 1110*s*. The first sub-slot pattern 1121*s* may be formed perpendicularly to the first slot pattern 1110*s*. The second sub-slot pattern 1122*s* may be formed perpendicularly to the first sub-slot pattern 1121*s* on an end of the first sub-slot pattern 1121*s*. The second sub-slot pattern 1122*s* may be disposed parallel to the first slot pattern 1110*s*.

The slot pattern 1100*s*-3 may include a fifth slot pattern 1150*s* and a sixth slot pattern 1160. The fifth slot pattern 1150*s* may be formed horizontally in another axial direction perpendicular to one axial direction on an end of the second sub-slot pattern 1122*s*. The sixth slot pattern 1160 may be formed horizontally in the one axial direction on an end of the fifth slot pattern 1150.

The second sub-slot pattern 1122*s* of the second slot pattern 1120*s* may be configured to radiate a second signal of a first sub-frequency band of the second operating frequency band. The sixth slot pattern 1160 may be configured to radiate a third signal of a second sub-frequency band higher than the first sub-frequency band. Accordingly, the first slot pattern 1110*s* may radiate the first signal of the first operating frequency band. The second slot pattern 1120*s* may radiate the second signal of the first sub-frequency band of the second operating frequency band. The sixth slot pattern 1160*s* may radiate the third signal of the second sub-frequency band of the second operating frequency band. With regard to this, the first wavelength λ1 of the first signal, the second wavelength λ2 of the second signal, and the third wavelength λ3 of the third signal may be set as λ1>λ2>λ3.

Referring to FIG. 12B, the antenna assembly may include antenna elements 1100 that radiate 4G/5G signals, in addition to the slot antenna that radiates Wi-Fi/BT signals. The antenna elements 1100 may be configured to include a plurality of antenna structures and may also be referred to as an antenna module 1100. The antenna module 1100 may include a first radiation structure 1100-1 and a second radiation structure 1110-2.

Each of the first radiation structure 1100-1 and the second radiation structure 1100-2 formed in the first region 1100*a* of the antenna assembly 1000 may be implemented with two or more conductive patterns and configured to operate in a plurality of frequency bands. The plurality of conductive patterns formed in the first region 1100*a* may be configured to include a first conductive pattern 1110 and a third conductive pattern 1130. The plurality of conductive patterns may be configured to further include a first conductive pattern 1110, a second conductive pattern 1120, and a third conductive pattern 1130.

The first radiation structure 1100-1 may be configured to include the first conductive pattern 1110, the second conductive pattern 1120, and the third conductive pattern 1130. The first conductive pattern 1110 may include a plurality of sub-patterns, namely, a plurality of conductive portions. The first conductive pattern 1110 may include a first part 1111 and a second part 1112. The first part 1111 may be formed perpendicularly to the second part 1112. The second part 1112 may be electrically connected to the feeding pattern 1110*f*. In this regard, the meaning of "being electrically connected" may include the respective conductive portions being connected either directly or by being spaced apart at a certain gap.

The second conductive pattern 1120 may be disposed on one side region or lower region of the first conductive pattern 1110. The second conductive pattern 1120 may be electrically connected to a first part 1111*g* of the ground conductive pattern 1110*g*. The second conductive pattern 1120 may further be arranged on the antenna assembly 1000 to resonate further in a frequency band different from the operating frequency bands of the first conductive pattern 1110 and the third conductive pattern 1130.

The third conductive pattern 1130 may be disposed in another side region of the first conductive pattern 1110. The third conductive pattern 1130 may be electrically connected to a second part 1112*g* of the ground conductive pattern 1110*g*. The size of the second conductive pattern 1120 may be smaller than the size of the third conductive pattern 1130. Accordingly, the antenna assembly 1000 may operate as a radiator in a higher frequency band by the second conductive pattern 1120.

The second conductive pattern 1120 may be disposed between the first part 1111 of the first conductive pattern 1110 and the ground conductive pattern 1110*g*. The second conductive pattern 1110 may be disposed between the first part 1111 of the first conductive pattern 1110 and the second part 1112 of the first conductive pattern 1110. Accordingly, the second conductive pattern 1120 may be arranged in a lower region of the first conductive pattern 1110, and the size of the antenna assembly 1000 may be reduced compared to the case where the second conductive pattern 1120 is arranged in one side region of the first conductive pattern 1110. The first part 1111 of the first conductive pattern 1110 and the third conductive pattern 1130 may be arranged on opposite sides with respect to the second part 1112 of the first conductive pattern 1110. The first part 1111 of the first conductive pattern 1110 and the third conductive pattern 1130 may be arranged in one side region and another side region with respect to the second part 1112 of the first conductive pattern 1110.

The second radiation structure 1100-2 may be configured to include a fourth conductive pattern 1140, a fifth conductive pattern 1150, and a third conductive pattern 1160. The fourth conductive pattern 1140 may include a plurality of sub-patterns, namely, a plurality of conductive portions. The fourth conductive pattern 1140 may include a third part 1141 and a fourth part 1142. The third part 1141 may be formed perpendicularly to the fourth part 1142. The fourth part 1142 may be electrically connected to the feeding pattern 1110*f*. In this regard, the meaning of "being electrically connected" may include the respective conductive portions being connected either directly or by being spaced apart at a certain gap.

The fifth conductive pattern 1150 may be disposed in one side region or lower region of the fourth conductive pattern 1140. The fifth conductive pattern 1150 may be electrically connected to a first part 1121*g* of the second ground conductive pattern 1120*g*. The fifth conductive pattern 1150 may further be arranged on the antenna assembly 1000 to resonate further in a frequency band different from the operating frequency bands of the fourth conductive pattern 1140 and the sixth conductive pattern 1160.

The sixth conductive pattern 1160 may be disposed on another side region of the fourth conductive pattern 1140. The sixth conductive pattern 1160 may be electrically connected to a second part 1122*g* of the second ground conductive pattern 1120*g*. The size of the fifth conductive pattern 1150 may be smaller than the size of the sixth conductive pattern 1160. Accordingly, the antenna assembly 1000 may operate as a radiator in a higher frequency band by the fifth conductive pattern 1150.

The fifth conductive pattern 1150 may be disposed between the third part 1141 of the fourth conductive pattern 1140 and the second ground conductive pattern 1120*g*. The fifth conductive pattern 1140 may be disposed between the third part 1141 of the fourth conductive pattern 1140 and the fourth part 1142 of the fourth conductive pattern 1110. Accordingly, the fifth conductive pattern 1150 may be arranged in a lower region of the fourth conductive pattern 1140, and the size of the antenna assembly 1000 may be reduced compared to the case where the fifth conductive pattern 1150 is arranged in one side region of the fourth conductive pattern 1140. The third part 1141 of the fourth conductive pattern 1140 and the sixth conductive pattern 1160 may be arranged on opposite sides with respect to the fourth part 1142 of the fourth conductive pattern 1140. The third part 1141 of the fourth conductive pattern 1140 and the sixth conductive pattern 1160 may be arranged in one side region and another side region with respect to the fourth part 1142 of the fourth conductive pattern 1140.

The first radiation structure 1100-1 and the second radiation structure 1100-2 may have a symmetrical structure with respect to one axis. With regard to this, the third conductive pattern 1130 of the first radiation structure 1100-1 may be disposed to face the sixth conductive pattern 1160 of the second radiation structure 1100-2. The first conductive pattern 1110 and the fourth conductive pattern 1140 may be spaced apart by a certain distance or more by the third and sixth conductive patterns 1130 and 1160 which are connected with the ground conductive patterns 1110*g* and 1120*g*. Additionally, the second conductive pattern 1120 and the fifth conductive pattern 1150 may be spaced apart by a certain distance or more by the third and sixth conductive patterns 1130 and 1160 which are connected with the ground conductive patterns 1110*g* and 1120*g*.

By virtue of the structure in which the third and sixth conductive patterns 1130 and 1160 face each other, the isolation between the first conductive pattern 1110 and the fourth conductive pattern 1140 that operate in a monopole antenna mode may be improved in the second frequency band. Also, by virtue of the structure in which the third and sixth conductive patterns 1130 and 1160 face each other, the isolation between the second conductive pattern 1120 and the fifth conductive pattern 1150 may be improved in the third frequency band.

The first radiation structure 1100-1 and the second radiation structure 1100-2 may be configured to perform MIMO. By the structure in which the third and sixth conductive patterns 1130 and 1160 face each other, the isolation between the first radiation structure 1100-1 and the second radiation structure 1100-2 may be improved in the second and third frequency bands. The isolation between the first radiation structure 1100-1 and the second radiation structure 1100-2 may be improved even in the first frequency band by virtue of an asymmetric structure between the first and third conductive patterns 1110 and 1130 and an asymmetric structure between the fourth and fifth conductive patterns 1140 and 1160.

Referring to FIGS. 12A and 12B, the slot antenna structure implemented as the slot pattern 1110*s* may be arranged between the first and second transparent antennas 1100-1 and 1100-2. A pattern region 1100*c* in which the slot pattern 1110*s* is formed may be located between the first and second ground regions 1110*g* and 1120*g*. One end of the pattern region 1100*c* where the slot pattern 1110*s* is formed and another end of the first ground region 1110*g* may be arranged to be spaced apart from each other by a first separation distance L1.

Another end of the pattern region 1100*c* and one end of the second ground region 1120*g* may be spaced apart from each other by a second separation distance L2 that is equal to the first separation distance L1, but the present specification is not limited thereto. The first separation distance L1 and the second separation distance L2 may be set to be greater than or equal to a minimum distance Δ. The first separation distance L1 and the second separation distance L2 may be set within a range between the minimum distance Δ and an effective distance d. The first separation distance L1 and the second separation distance L2 may be set within a range of [Δ, Δ+d]. The first separation distance L1 and the second separation distance L2 may be formed to be longer than a horizontal distance $L_H$ of the third conductive pattern 1130 and the sixth conductive pattern 1160 that constitute the first transparent antenna 1100-1 and the second transparent antenna 1100-2.

One end and another end of the pattern region 1100*c* constituting the slot antenna may be spaced apart from a boundary side of the first and second transparent antennas 1100-1 and 1100-2 by a certain gap distance or more. In this regard, one end of the pattern region 1100*c* in which the slot pattern 1100*s* is formed may have a first gap distance G1 to the boundary side of the third conductive pattern 1130 constituting the first transparent antenna 1100-1. Another end of the pattern region 1100*c* may form a second gap distance G2, which is equal to the first gap distance G1, to the boundary side of the sixth conductive pattern 1160 constituting the second transparent antenna 1100-2.

The first gap distance G1 and the second gap distance G2 may be set to α×λmin of a wavelength λmin, which corresponds to the lowest frequency of the first operating frequency band. Here, α denotes a positive real number. For example, the first gap distance G1 and the second gap distance G2 may be set to a certain range based on 0.25 λmin. Accordingly, the interference between a current component formed in the third and sixth conductive patterns 1130 and 1160 and a current component of the slot pattern 1100*s* may be maintained below a critical level. As another example, the first gap distance G1 and the second gap distance G2 may be set to a certain range based on 0.1 λmin. In this regard, the frequency bands in which the third and sixth conductive patterns 1130 and 1160 operate as radiators and the frequency band in which the slot pattern 1100*s* operates as a radiator do not overlap each other. Accordingly, even if the first gap distance G1 and the second gap distance G2 are decreased to 0.1 λmin, the interference between the current component formed in the third and sixth conductive patterns 1130 and 1160 and the current component of the slot pattern 1100*s* may be maintained below the critical level.

Figure 15A:
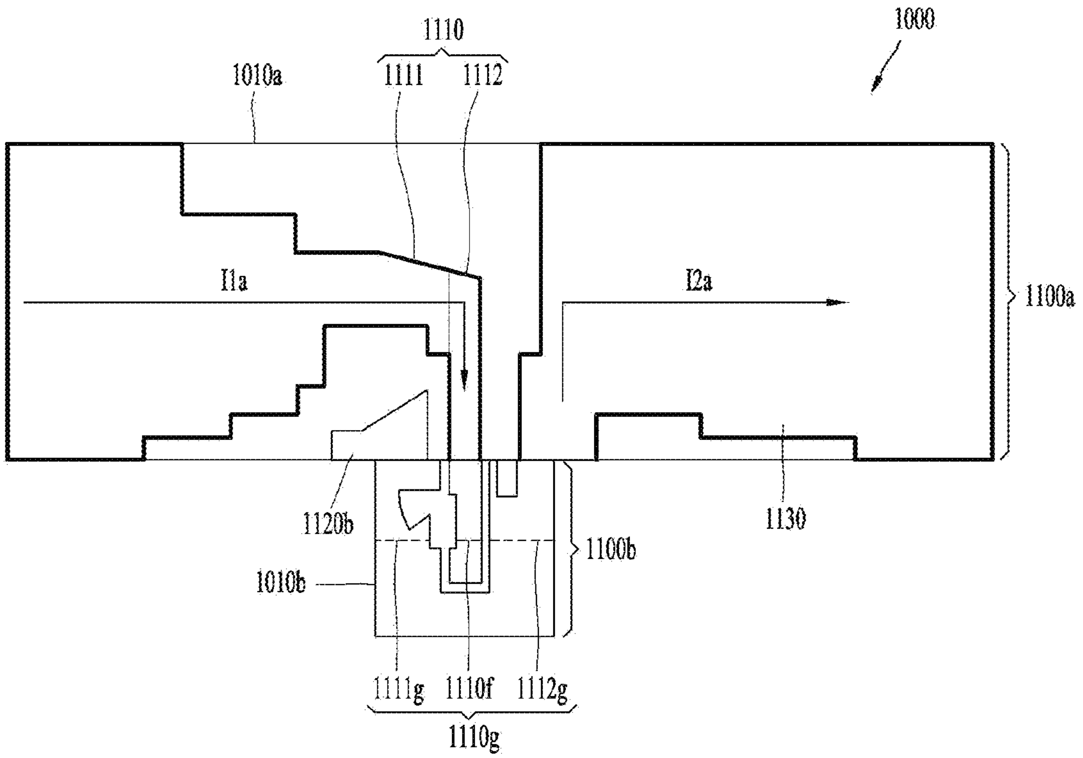
FIGS. 15A to 15C are conceptual views illustrating the operating principle of the antenna assembly of FIG. 12B in each frequency band.
Figure 15B:
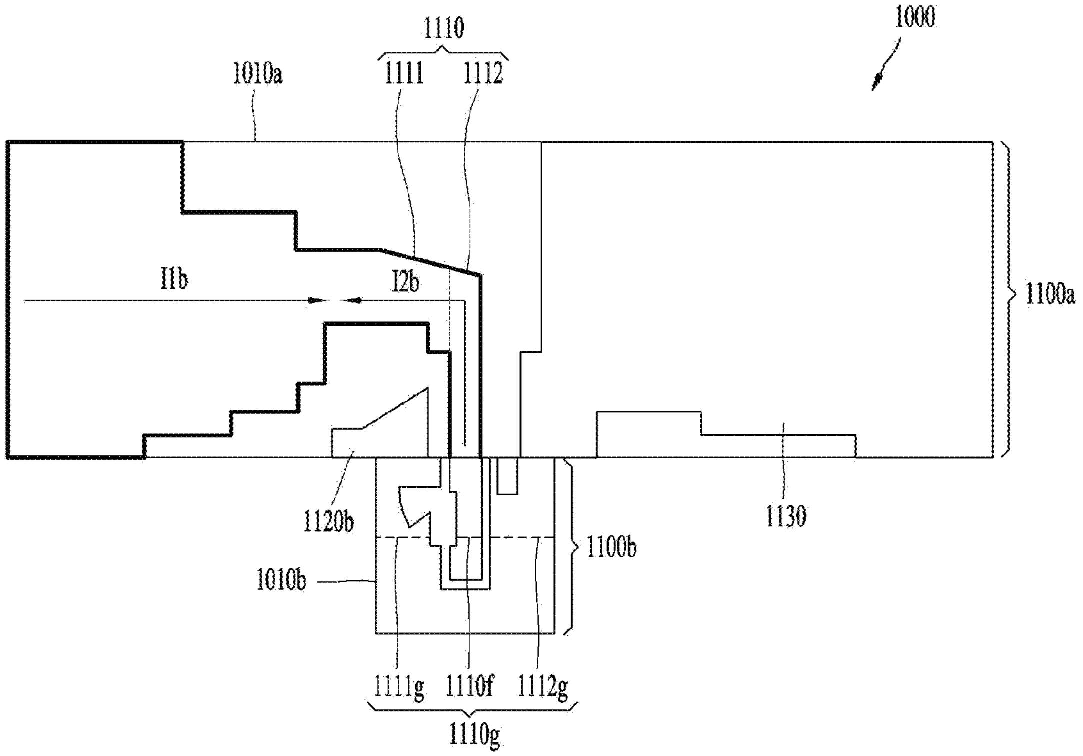
Figure 15C:
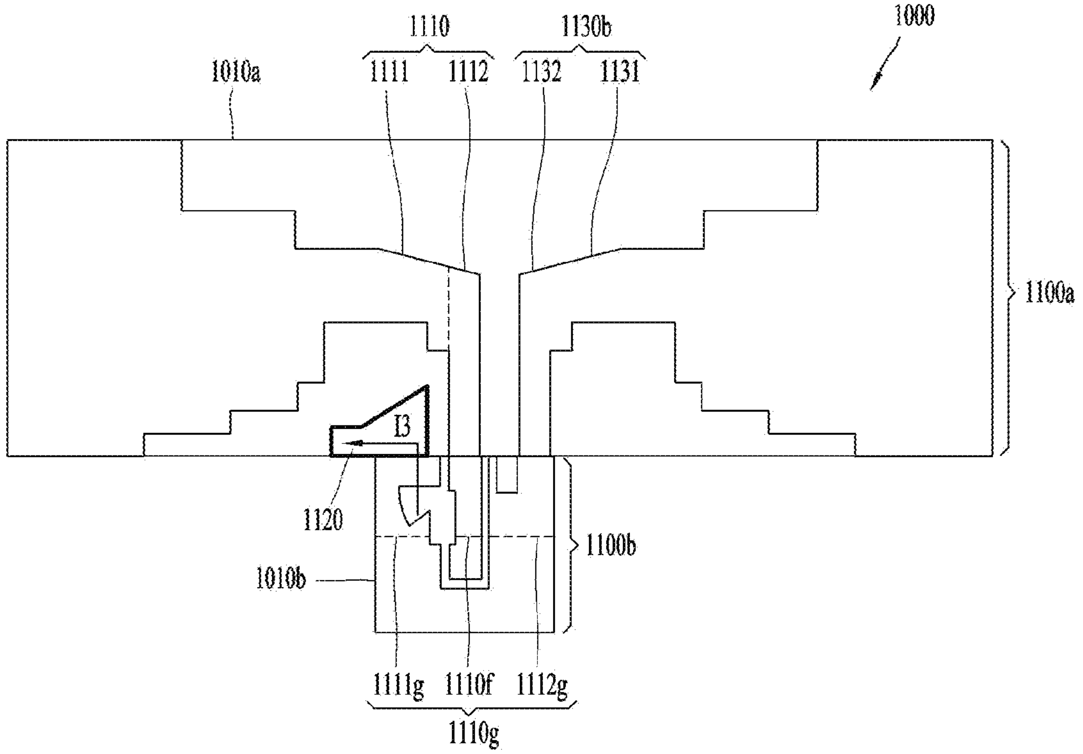

To this end, each of the plurality of conductive patterns of the antenna assembly 1000 and their combinations may operate as radiators in corresponding frequency bands. FIGS. 15A to 15C are conceptual views illustrating the operating principle of the antenna assembly 1000 of FIG. 12B in each frequency band.

Referring to FIGS. 12B, 14B, and 15A, the antenna assembly 1000 may operate in a dipole antenna mode in a first frequency band of 617 to 960 MHz. The first frequency band is not limited to this and may change depending on the application for 4G/5G LB communications. The first conductive pattern 1110 and the third conductive pattern 1130 of the first transparent antenna 1100-1 may operate in a first dipole antenna mode in the first frequency band. The first conductive pattern 1110 and the third conductive pattern 1130 may configure an asymmetrical structure. The fourth conductive pattern 1140 and the sixth conductive pattern 1160 of the second transparent antenna 1100-2 may operate in a second dipole antenna mode in the first frequency band. The fourth conductive pattern 1140 and the sixth conductive pattern 1160 may configure an asymmetrical structure.

Referring to FIGS. 12B, 14B, and 15B, the antenna assembly 1000 may operate in a monopole antenna mode in a second frequency band of 1520 to 4500 MHz. In this regard, the second frequency band which is a frequency band higher than the first frequency band may change depending on the application for 4G/5G MB/HB communications. The first conductive pattern 1110 of the first transparent antenna 1100-1 may operate in a first monopole antenna mode in the second frequency band. The fourth conductive pattern 1140 of the second transparent antenna 1100-2 may operate in a second monopole antenna mode in the second frequency band. With regard to this, a first current I1*b* may be formed from the first part 1111 to the second part 1112 of the first conductive pattern 1110 in the second frequency band. Also, a second current I2*b* may be formed from the second part 1112 to the first part 1111 of the first conductive pattern 1110 in the second frequency band. Accordingly, the first conductive pattern 1110 may operate in the monopole antenna mode in the second frequency band.

As described above, the slot pattern 1100*s* of the slot antenna structure may operate in a first slot mode through the first slot pattern 1110*s* in the first operating frequency band. The second frequency band and the first operating frequency band may at least partially overlap each other. In this regard, there is a need to suppress interference between horizontal current components I1*b* and I2*b* formed in the first conductive pattern 1110 and a vertical first slot current component Is1 formed in the first slot pattern 1110*s*. To this end, the third conductive pattern 1130 may be placed between the first conductive pattern 1110 and the first slot pattern 1110*s*.

Referring to FIGS. 12B, 14B, and 15C, the antenna assembly 1000 may operate as a radiator through additional resonance in a third frequency band of 4500 to 6000 MHz. With regard to this, a third current I3 may be formed in the second conductive pattern 1120 of the first transparent antenna 1100-1, so that the second conductive pattern 1120 operates as a radiator in the third frequency band. Likewise, the fifth conductive pattern 1150 of the second transparent antenna 1100-2 may operate as a radiator in the third frequency band.

In this regard, the third frequency band which is a frequency band higher than the second frequency band may change depending on the application for 4G/5G UHB and 5G Sub6 communications. The second conductive pattern 1120 of the first transparent antenna 1100-1 may operate as a first radiator in the third frequency band. The fifth conductive pattern 1150 of the second transparent antenna 1100-2 may operate as a second radiator in the third frequency band. The third frequency band may be set to be wider than the second frequency band. Accordingly, the antenna assembly 1000 may operate as a radiator even in the third frequency band in addition to the first and second frequency bands, thereby covering the entire frequency band for 4G/5G wireless communications.

As described above, the slot pattern 1100*s* of the slot antenna structure may operate in a second slot mode, which is different from the first slot mode, through the first slot pattern 1120*s* in the second operating frequency band. The third frequency band and the second operating frequency band may at least partially overlap each other. In this regard, there is a need to suppress interference between a current component I3 of a first horizontal direction formed in the second conductive pattern 1120, and a second slot current component Is2 of a second horizontal direction formed in the second slot pattern 1120*s*. To this end, the third conductive pattern 1130 may be placed between the first conductive pattern 1110 and the second slot pattern 1120*s*.

Meanwhile, in the slot antenna structure of the antenna assembly according to the specification, the lengths of the first and second slot patterns 1110*s* and 1120*s* may be realized within a certain range from a specific length. This may minimize an area occupied by the slot pattern 1110*s* that includes the first and second slot patterns 1110*s* and 1120*s* and the third and fourth slot patterns 1130*s* and 1140*s*. In this regard, the vertical length of the first slot pattern 1110*s* in one axial direction may be formed as a first length within a certain range based on 10 mm. The horizontal width of the first slot pattern 1110*s* in another axial direction may be formed as a first width. The horizontal length of the second slot pattern 1120*s* in the another axial direction may be formed as a second length within a certain range based on 6.8 mm. The vertical width of the second slot pattern 1120*s* in the one axial direction may be formed as a second width.

The pattern region 1100*c* in which the slot pattern 1100*s* is formed may be placed on one surface of the third dielectric substrate 1010*c*. The feeding pattern 1130*f* may be formed on another surface, for example, the bottom of the third dielectric substrate 1010*c*. A signal may be applied to the feeding pattern 1130*f* formed on the another surface of the third dielectric substrate 1010*c* through the third slot pattern 1130*s*. The signal applied through the third slot pattern 1130*s* may be radiated through the first slot pattern 1110*s* or the second slot pattern 1120*s* depending on an operating frequency band. The third slot pattern 1130*s* may be formed with a third length and a third width, which are horizontal lengths in the another axial direction. The third width of the third slot pattern 1130*s* may be set to be narrower than the first width of the first slot pattern 1110*s* and the second width of the second slot pattern 1120*s*. Accordingly, signals may be easily coupled through the third slot pattern 1130*s* having the third width. Additionally, signals may be radiated through the first slot pattern 1110*s* having the first width or the second slot pattern 1120*s* having the second width which are wider than the third width.

A current direction formed in the conductive patterns of the antenna assembly according to the specification and a current direction formed in the slot antenna may be formed perpendicularly to each other. In this regard, FIGS. 16A and 16B illustrate a current direction formed in conductive patterns of an antenna assembly and a current direction formed in a slot antenna according to embodiments.

Figure 16A:
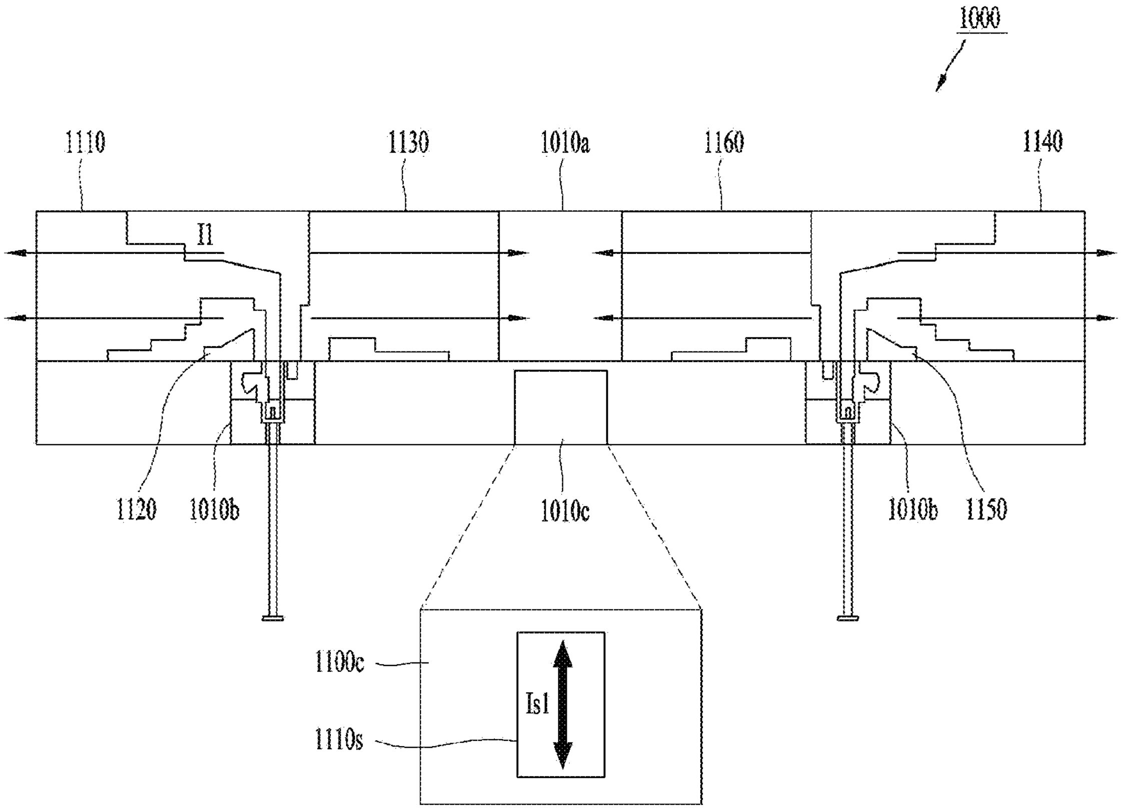
FIGS. 16A and 16B illustrate a current direction formed in conductive patterns of an antenna assembly according to embodiments and a current direction formed in a slot antenna.
Figure 16B:
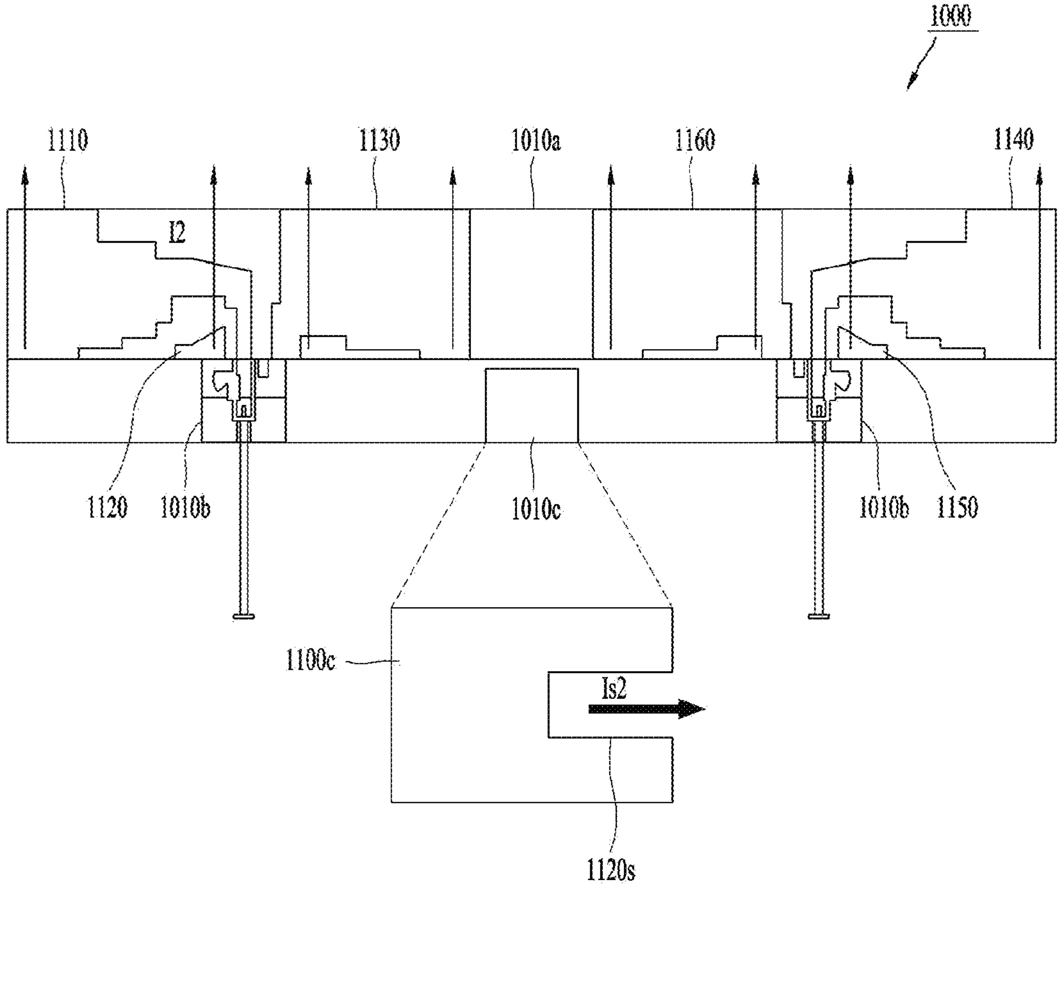

Referring to FIGS. 16A and 16B, first to sixth conductive patterns 1110 to 1160 implemented as a transparent antenna in the antenna assembly 1000 may be arranged. The first to sixth conductive patterns 1110 to 1160 may be placed on the first transparent dielectric substrate 1010*a*. A feeding pattern for feeding the transparent antenna may be arranged on the second dielectric substrate 1010*b*. The pattern region 1100*c* where the slot pattern is formed may be placed on the third dielectric substrate 1010*c*.

Referring to FIG. 16A, a first current I1 may be formed horizontally direction in the first to sixth conductive patterns 1110 to 1160 implemented as a transparent antenna in the antenna assembly 1000. The first slot pattern 1110*s* may be formed vertically in the pattern region 1100*c*. A first slot current Is1 may be formed vertically in the first slot pattern 1110. The first current I1 of the first to sixth conductive patterns 1110 to 1160 and the first slot current Is1 of the first slot pattern 1110*s* may be perpendicular to each other. Accordingly, the isolation characteristics between the transparent antenna and the slot antenna may be maintained below a critical level in the 2.4 GHz band, which is the first operating frequency band.

Referring to FIGS. 13A, 15B, and 16A, the 2.4 GHz band, which is the first operating frequency band, may correspond to the second frequency band of the transparent antenna. The first current I1 formed in the transparent antenna may be formed horizontally in the second frequency band. The first slot current Is1 formed in the slot antenna may be formed vertically in the 2.4 GHz band, which is the first operating frequency band.

Referring to FIG. 16B, a second current I2 may be formed vertically in the first to sixth conductive patterns 1110 to 1160 implemented as the transparent antenna in the antenna assembly 1000. The second slot pattern 1120*s* may be formed vertically in the pattern region 1100*c*. A second slot current Is2 may be formed vertically in the first slot pattern 1110. The first current I1 of the first to sixth conductive patterns 1110 to 1160 and the second slot current Is2 of the second slot pattern 1120*s* may be perpendicular to each other. Accordingly, the isolation characteristics between the transparent antenna and the slot antenna may be maintained below a critical level in the 5.5 GHz band, which is the second operating frequency band.

Referring to FIGS. 13B, 15C, and 16B, the 5.5 GHz band, which is the second operating frequency band, may correspond to the third frequency band of the transparent antenna. The second current I2 formed in the transparent antenna may be formed vertically in the third frequency band. In the 5.5 GHz band, which is the second operating frequency band, the second slot current Is2 formed in the slot antenna may be formed horizontally.

Referring to FIGS. 16A and 16B, the first and second transparent antennas 1100-1 and 1100-2 and the slot antenna 1100*s* may be placed within a limited space of the antenna assembly 1000. The first and second transparent antennas 1100-1 and 1100-2 may be formed as a dipole antenna structure. The first and second transparent antennas 1100-1 and 1100-2 may be formed as a 4G/5G MIMO transparent antenna structure. For this purpose, the first and second transparent antennas 1100-1 and 1100-2 may be formed as a structure with transparent electrode and FPCB. The slot antenna 1100*s* may operate as a radiator in the WIFI/BT band by utilizing a slot pattern of a separate FPCB part.

The slot antenna 1100*s* may not only operate as a radiator in the WIFI/BT band, but also maintain isolation characteristics below a critical level from 4G/5G transparent antennas. For the isolation characteristics, the formation direction of the slot pattern may be determined by considering the radiation pattern and current distribution (electric field distribution) of the first and second transparent antennas 1100-1 and 1100-2. To this end, the directions of the first and second slot currents Is1 and Is2 of the slot antenna 1100*s* may be determined as directions perpendicular to the directions of the first and second currents I1 and I2 formed in the first and second transparent antennas 1100-1 and 1100-2. Accordingly, the slot antenna 1100*s* may be configured to include first and second slot patterns 1110*s* and 1120*s*.

Meanwhile, the antenna assembly according to the specification may be configured to include a plurality of antenna elements. Referring to FIG. 12B, the first transparent antenna 1100-1 and the second transparent antenna 1100-2 may be referred to as first and second antennas, respectively. The slot antenna implemented with the slot pattern 1100*s* may be referred to as a third antenna.

Figure 17A:
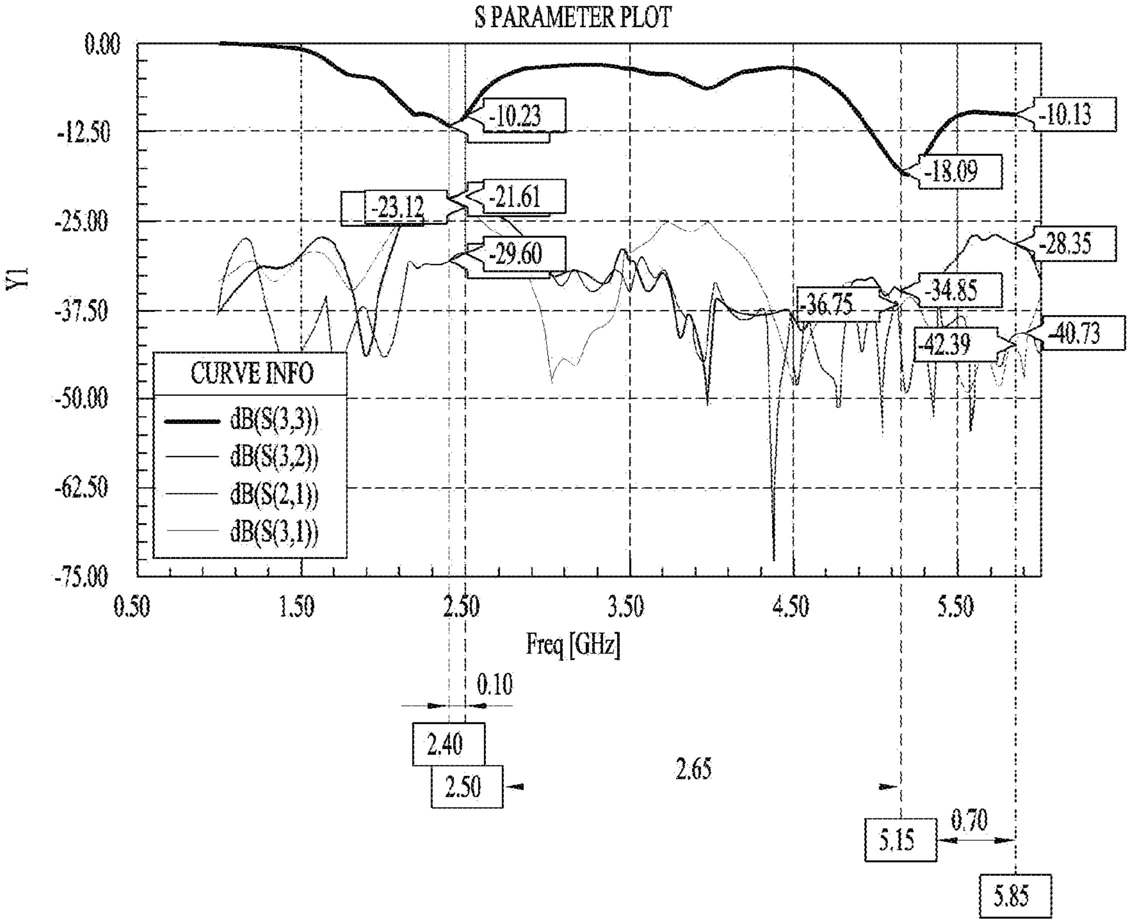
FIG. 17A illustrates the reflection coefficient characteristics of a slot antenna and the isolation characteristics between the slot antenna and first and second transparent antennas.

FIG. 17A illustrates the reflection coefficient characteristics of a slot antenna and the isolation characteristics between the slot antenna and first and second transparent antennas. Referring to FIGS. 12B and 17A, the reflection coefficient of the slot antenna implemented with the slot pattern 1100*s* may be realized as a value of about-8 dB or less in a band ranging from 2.4 GHz to 2.5 GHz and a band ranging from 5.15 GHz to 5.85 GHz. As described above, the first transparent antenna 1100-1 and the second transparent antenna 1100-2 may be referred to as the first and second antennas, respectively. The slot antenna implemented with the slot pattern 1100*s* may be referred to as the third antenna.

In this regard, dB(S(3,2)) represents the isolation characteristic between the second transparent antenna 1100-2 and the slot antenna 1100*s*. dB(S(2,1)) represents the isolation characteristic between the first transparent antenna 1100-1 and the second transparent antenna 1100-2. dB(S(3,1)) represents the isolation characteristic between the first transparent antenna 1100-1 and the slot antenna 1100*s*. The isolation values among the first and second transparent antennas 1100-1 and 1100-2 and the slot antenna 1100*s* may be realized to be equal to or greater than 20 dB in the entire band, so that mutual interference can be maintained below a certain level.

Figure 17B:
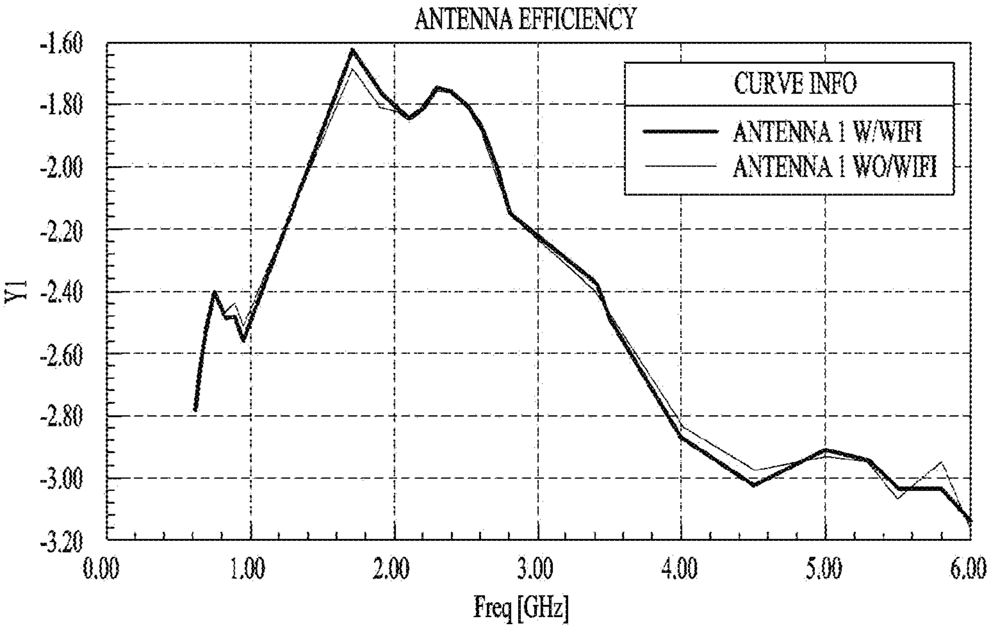
FIG. 17B illustrates the frequency-dependent antenna efficiencies of first and second transparent antennas depending on the presence or absence of a slot antenna arrangement.
Figure 17B:
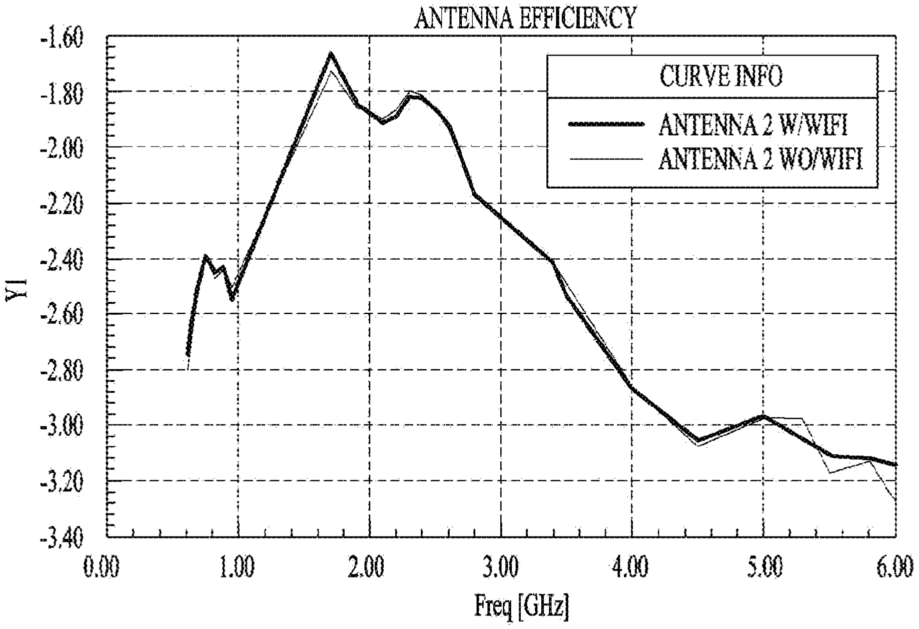
Figure 17C:
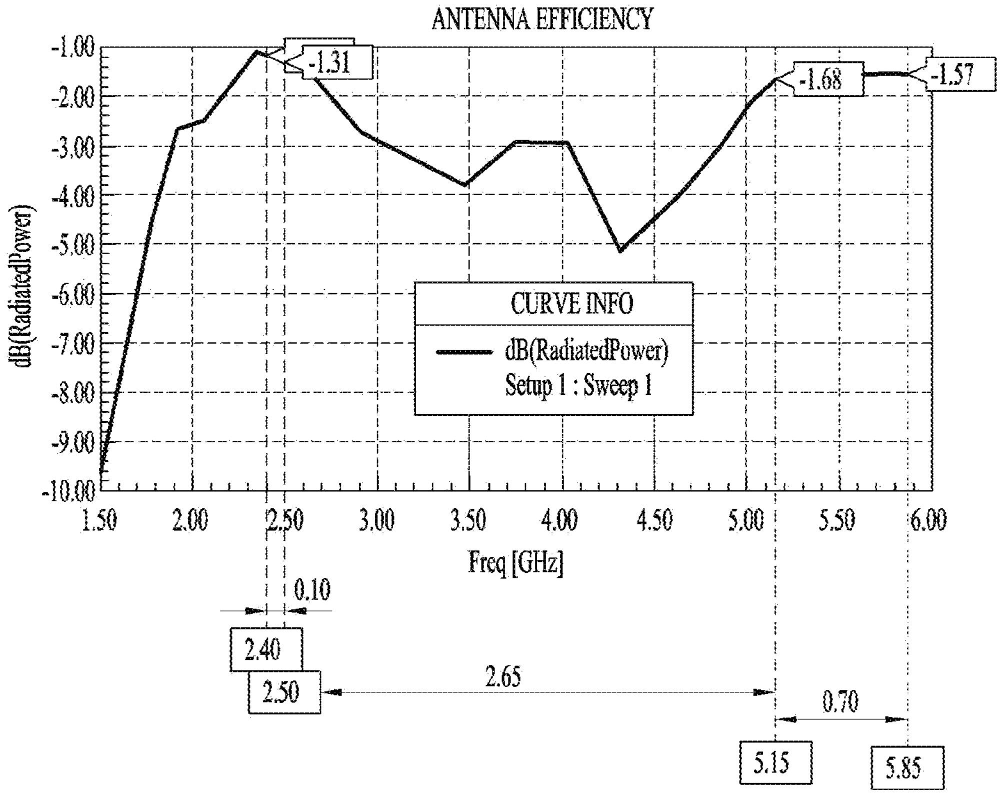
FIG. 17C illustrates the frequency-dependent antenna efficiency of a slot antenna operating in a Wi-Fi/BT band.

FIG. 17B illustrates the frequency-dependent antenna efficiencies of first and second transparent antennas depending on the presence or absence of a slot antenna arrangement. FIG. 17C illustrates the frequency-dependent antenna efficiency of a slot antenna operating in a Wi-Fi/BT band.

Referring to FIG. 12B and (a) of FIG. 17B, the first transparent antenna 1100-1 has a similar antenna efficiency value in the first to third frequency bands regardless of the presence or absence of the slot antenna 1100*s*. Even when the slot antenna 1100*s* is arranged, the decrease in antenna efficiency of the first transparent antenna 1100-1 may be maintained below 0.1 dB in a frequency band of 6 GHz or lower. When the slot antenna 1100*s* is arranged, the antenna efficiency of the first transparent antenna 1100-1 may further increase in a frequency band of 4 GHz or higher, compared to when a slot antenna is not arranged.

Referring to FIG. 12B and (b) of FIG. 17B, the second transparent antenna 1100-2 may have similar antenna efficiency values in the first to third frequency bands regardless of the presence or absence of the slot antenna 1100*s*. Even when the slot antenna 1100*s* is arranged, the decrease in antenna efficiency of the second transparent antenna 1100-2 may be maintained below 0.1 dB in a frequency band of 6 GHz or lower. When the slot antenna 1100*s* is arranged, the antenna efficiency of the second transparent antenna 1100-2 may further increase in a frequency band of 5 GHz or higher, compared to when a slot antenna is not arranged.

Referring to FIGS. 12B and 17C, the slot antenna 1100*s* may secure the antenna efficiency of −2 dBi or more in the WIFI/BT band (2.4 to 2.5 GHz, 5.15 to 5.85 GHz).

Figure 18A:
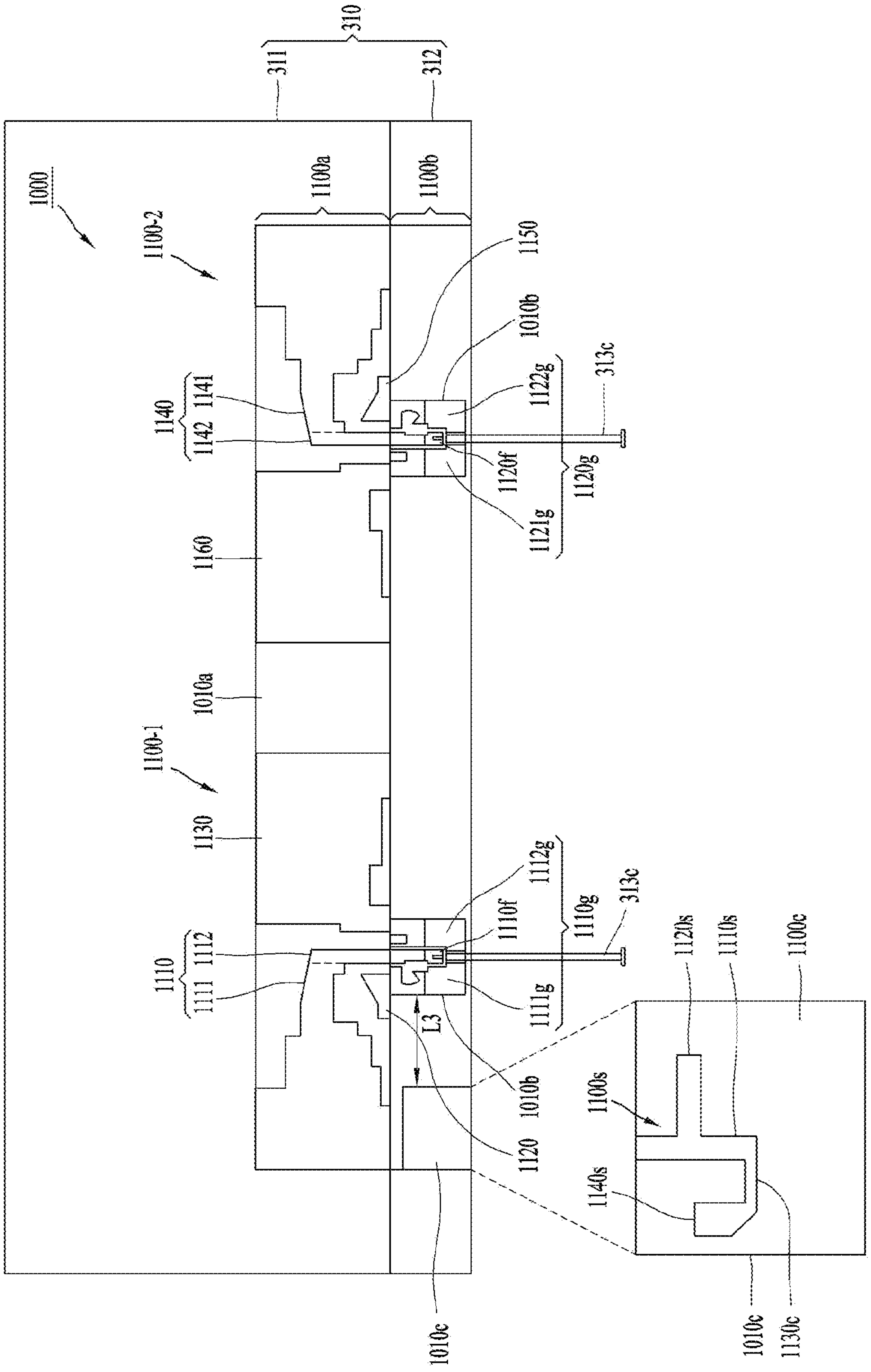
FIGS. 18A and 18B each illustrate the structure of an antenna assembly with a slot antenna according to embodiments.
Figure 18B:
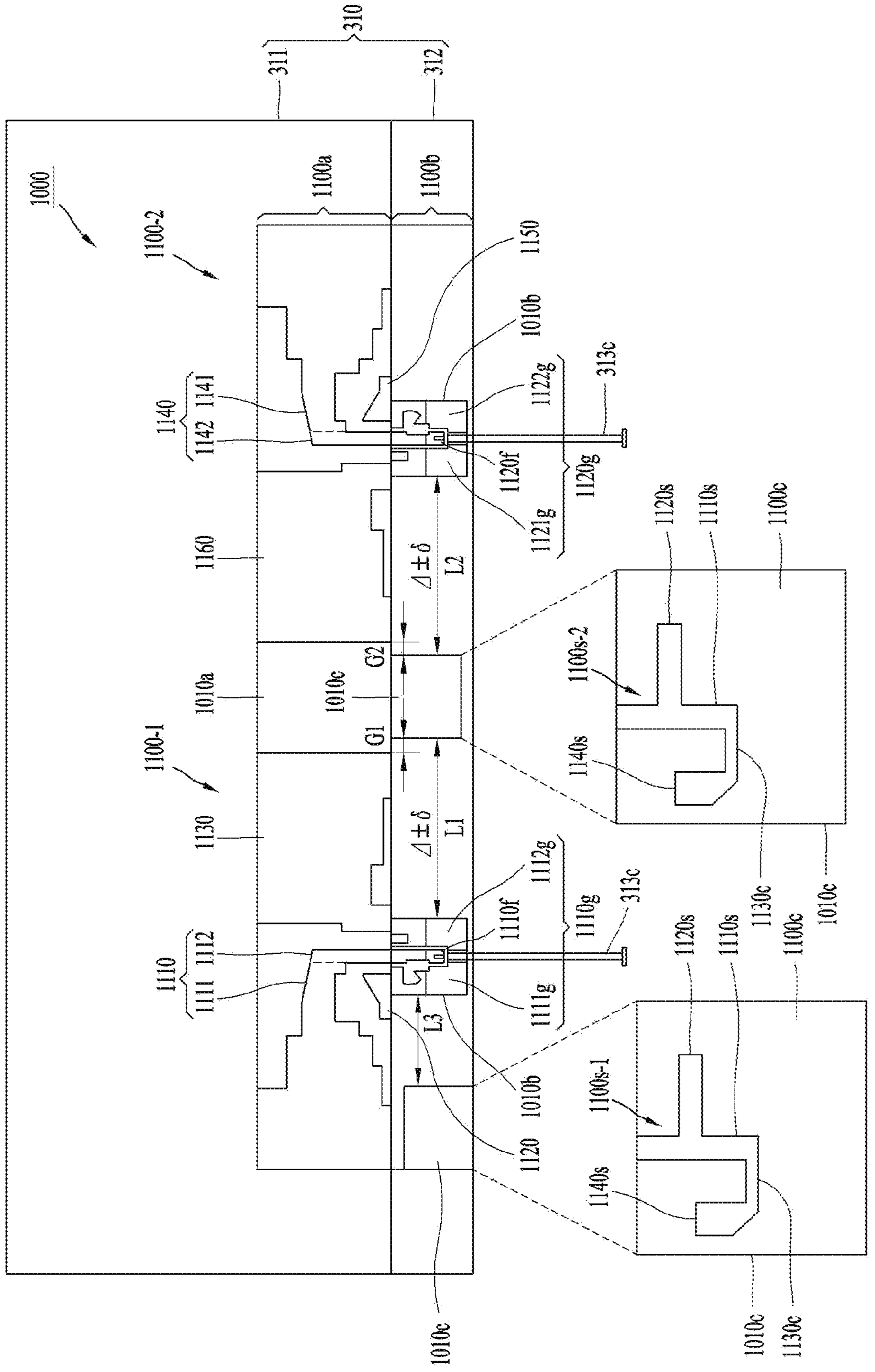
Figure 18C:
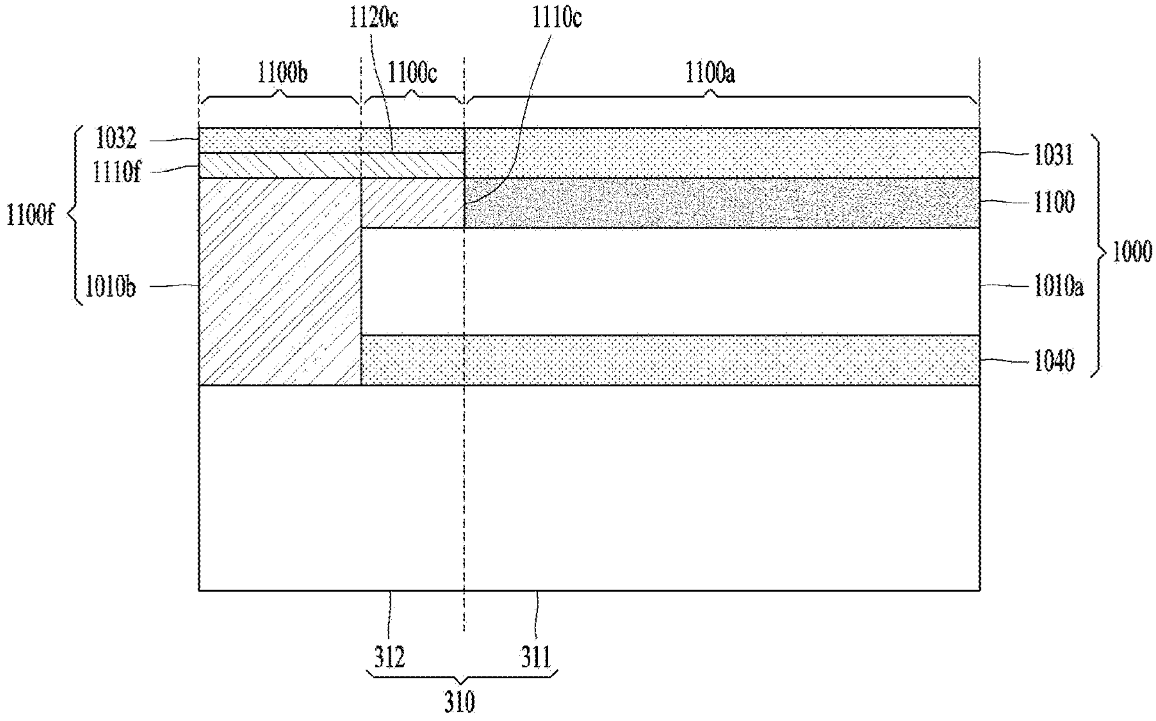
FIG. 18C illustrates a laminated structure of the antenna assembly of FIGS. 18A and 18B.

Hereinafter, a vehicle having an antenna assembly that may be attachable to vehicle glass according to another aspect of this specification will be described with reference to drawings. In this regard, FIGS. 18A and 18B illustrate the structures of antenna assemblies with slot antennas according to embodiments. FIG. 18C illustrates a laminated structure of the antenna assemblies of FIGS. 18A and 18B.

Referring to FIG. 18A, a structure is shown in which the slot antenna 1100*s* is arranged in the lower region of the first transparent antenna 1100-1. In this regard, the slot antenna 1100*s* is not limited to the structure arranged in the lower region of the first transparent antenna 1100-1, and may alternatively be arranged in the lower region of the second transparent antenna 1100-2.

FIG. 18B illustrates a structure in which the first slot antenna 1100*s*-1 is arranged in the lower region of the first transparent antenna 1100-1, and the second slot antenna 1100*s*-2 is arranged between the first and second transparent antennas 1100-1 and 1100-2. The first slot antenna 1100*s*-1 may be spaced a third separation distance L3 apart from the second dielectric substrate 1010*b* which feeds power to the first transparent antenna 1100-1. The second slot antenna

1100*s*-2 may be spaced apart from the second dielectric substrate 1010*b*, which feeds power to the first and second transparent antennas 1100-1 and 1100-2 by a first separation distance L1 and a second separation distance L2. Depending on the separation distance between the first and second radiation structures 1100-1 and 1100-2, the first and second separation distances L1 and L2 may be longer than the third separation distance L3. The first slot antenna 1100*s*-1 and the second slot antenna 1100-2 may be referred to as a first slot pattern region and a second slot pattern region, respectively.

Referring to FIGS. 1, 9A to 9C, 11 to 12B, and 18A and 18B, the vehicle may include the metal frame 49, the glass panel 310, and the antenna assembly 1000. The antenna assembly 1000 may be configured to include the first dielectric substrate 1010*a* which is the transparent substrate, the second dielectric substrate 1010*b* which is the opaque substrate, and the third dielectric substrate 1010*c* on which the slot pattern 1100*s* is formed.

The metal frame 49 may be formed to have an opening therein. The metal frame 49 may include the recess portion 49R from which the metal region has been cut out. The glass panel 310 may include the transparent region 311 and the opaque region 311. The antenna assembly 1000 may be placed on the glass panel 310.

The first region 1100*a* may include the antenna elements 1100 that include the conductive patterns on one side of the first dielectric substrate 1010*a* and are configured to radiate radio signals. The second region 1100*b* may include the ground conductive patterns 1111*g* and 1112*g* and the feeding pattern 1110*f*. The first region 1100*a* and the second region 1100*b* may also be referred to as a radiator region and a ground region (or a feeding region), respectively.

The first dielectric substrate 1010*a* may be disposed in the transparent region 311 of the glass panel 310. The first transparent antenna 1100-1 and the second transparent antenna 1100-2 may be formed on one side of the first dielectric substrate 1010*a*. The first transparent antenna 1100-1 and the second transparent antenna 11002 may be referred to as a first radiation structure and a second radiation structure, respectively. The second dielectric substrate 1010*b* may include a first ground region 1110*g* and a second ground region 1120*g*. The second dielectric substrate 1010*b* may be disposed in the recess portion 49R of the metal frame 49 and the opaque region 312 of the glass panel 310. The third dielectric substrate 1010*c* may be disposed to be spaced apart from one side of at least one of the first ground region 1110*g* and the second ground region 1120*g*. The third dielectric substrate 1010*c* may include the slot pattern 1100*s* formed in the pattern region 1100*c* on one side thereof.

The slot pattern 1100*s* may include a first slot pattern 1110*s* and a second slot pattern 1120*s*. The first slot pattern 1110*s* may be formed vertically in one axial direction on the pattern region 1100*c*. The first slot pattern 1110*s* may be configured to radiate a signal of a first operating frequency band. The second slot pattern 1120*s* may be formed horizontally in another axial direction perpendicular to the one axial direction on one point of the first slot pattern 1110*s*. The second slot pattern 1120*s* may be configured to radiate a signal of a second operating frequency band that is higher than the first operating frequency band. In this regard, the first and second operating frequency bands may be set to 2.4 GHz and 5.5 GHz, respectively.

The first slot pattern 1110*s* may form a vertical slot region. The second slot pattern 1120*s* may form a horizontal slot region in a first direction of the another axial direction. The slot pattern 1110*s* may further include an additional slot pattern extending from one end of the first slot pattern 1110*s*. The slot pattern 1110*s* may further include a third slot pattern 1130*s* fed by the feeding pattern 1130*f*. The slot pattern 1110*s* may further include a fourth slot pattern 1140*s*. The third slot pattern 1130*s* and the fourth slot pattern 1140*s* may be referred to as a feeding slot pattern and a matching slot pattern, respectively.

The third slot pattern 1130*s* may be formed such that one end thereof extends from one end of the first slot pattern 1110*s*. The third slot pattern 1130*s* may be formed in an opposite direction to the second slot pattern 1120*s* to be horizontal in a second direction of the another axial direction. The third slot pattern 1130*s* may be configured to be coupling-fed by the feeding pattern 1130*f* so that a signal of a first or second operating frequency band is fed. The fourth slot pattern 1140*s* may be formed such that one end thereof extends from another end of the third slot pattern 1130*s*. The fourth slot pattern 1140*s* may be formed parallel to the first slot pattern 1110*s*.

Referring to FIG. 13A, the first slot pattern 1110*s* may operate as a main radiator in the first operating frequency band corresponding to a 2.4 GHz band. The first slot pattern 1110*s*, the third slot pattern 1130*s*, and the fourth slot pattern 1140*s* may be configured to radiate a first signal of the first operating frequency band. Referring to FIGS. 9 to 13A, the first slot pattern 1110*s*, the third slot pattern 1130*s*, and the fourth slot pattern 1140*s* may be configured to radiate the first signal toward the transparent region 311 of the glass panel 310.

Referring to FIG. 13B, the second slot pattern 1120*s* may operate as a main radiator in a second operating frequency band corresponding to a 5.5 GHz band. The lower region of the first slot pattern 1110*s*, the second slot pattern 1120*s*, the third slot pattern 1130*s*, and the fourth slot pattern 1140*s* may be configured to radiate a second signal of the second operating frequency band. Referring to FIGS. 9 to 12B and 13B, the second slot pattern 1120*s*, the third slot pattern 1130*s*, and the fourth slot pattern 1140*s* may be configured to radiate the second signal toward the transparent region 311 of the glass panel 310. In this regard, the signals of the first and second operating frequency bands may be, but are not limited to, Wi-Fi signals of the 2.4 GHz band and the 5.5 GHz band or BL signals of the 2.4 GHz band.

The first transparent antenna 1100-1 may be configured to include the first conductive pattern 1110, the second conductive pattern 1120, and the third conductive pattern 1130. The first conductive pattern 1110 may include a first part 1111 and a second part 1112. The first part 1111 may be connected perpendicularly to the second part 1112. The second part 1112 may be electrically connected to the first feeding pattern 1111. The second conductive pattern 1120 may be electrically connected to the first part 1111*g* of the first ground conductive pattern of the first ground region 1110*g*. The third conductive pattern 1130 may be electrically connected to the second part 1112*g* of the first ground conductive pattern of the first ground region 1110*g*.

The size of the second conductive pattern 1120 may be smaller than the size of the third conductive pattern 1130. The second conductive pattern 1120 may be disposed between the first part 1111 of the first conductive pattern 1110 and the first ground conductive pattern 1110*g*. The first part 1111*g* of the first conductive pattern 1110 and the third conductive pattern 1130 may be arranged on opposite sides with respect to the second part 1112 of the first conductive pattern 1110.

The second transparent antenna 1100-2 may be configured to include the fourth conductive pattern 1140, the fifth conductive pattern 1150, and the sixth conductive pattern 1160. The fourth conductive pattern 1140 may include a third part 1141 and a fourth part 1142. The third part 1141 may be connected perpendicularly to the fourth part 1142. The fourth part 1142 may be electrically connected to the second feeding pattern 1120*f*. The fifth conductive pattern 1150 may be electrically connected to the first part 1121*g* of the second ground conductive pattern of the second ground region 1120*g*. The sixth conductive pattern 1160 may be electrically connected to the second part 1122*g* of the second ground conductive pattern of the second ground region 1120*g*.

The size of the fifth conductive pattern 1150 may be smaller than the size of the sixth conductive pattern 1150. The fifth conductive pattern 1150 may be disposed between the first part 1111 of the fourth conductive pattern 1140 and the second ground conductive pattern. The first part 1141*g* of the fourth conductive pattern 1140 and the sixth conductive pattern 1160 may be arranged on opposite sides with respect to the fourth part 1142 of the fourth conductive pattern 1140. The third conductive pattern 1130 may be disposed to face the sixth conductive pattern 1160.

As described above, the first slot pattern region 1100*s*-1 implemented with the slot pattern 1110*s* may be disposed below the first or second transparent antenna 1100-1 and 1100-2. Also, the slot antenna structure implemented as the second slot pattern 1100*s*-2 may be arranged between the first and second transparent antennas 1100-1 and 1100-2. The slot pattern 1110*s* may be disposed blow the first transparent antenna 1100-1. One end of the pattern region 1100*c* where the slot pattern 1110*s* is formed and one end of the first ground region 1100*g* may be arranged to be spaced apart from each other by the first separation distance L1.

Another end of the pattern region 1100*c* in which the second slot pattern region 1100*s*-2 is formed and one end of the second ground region 1120*g* may be spaced apart from each other by the second separation distance L2 that is equal to the first separation distance L1, but the disclosure is not limited thereto. The first separation distance L1 and the second separation distance L2 may be formed to be longer than a horizontal distance $L_H$ of the third conductive pattern 1130 and the sixth conductive pattern 1160 that constitute the first transparent antenna 1100-1 and the second transparent antenna 1100-2.

One end and another end of the pattern region 1100*c* constituting the slot antenna may be spaced apart from a boundary side of the first and second transparent antennas 1100-1 and 1100-2 by a certain gap distance or more. In this regard, one end of the pattern region 1100*c* in which the slot pattern 1100*s* is formed may have a first gap distance G1 to the lower boundary side of the first conductive pattern 1110 constituting the first transparent antenna 1100-1. Another end of the pattern region 1100*c* in which the second slot pattern region 1100*s*-2 is formed may form a second gap distance G2, which is equal to the first gap distance G1, to the boundary side of the sixth conductive pattern 1160 constituting the second transparent antenna 1100-2.

Referring to FIG. 18C, the antenna assemblies of FIGS. 18A and 18B may be arranged on the glass panel 310 of the vehicle. In this regard, the description of the laminated structure of FIG. 18C will be made based on the antenna assembly of FIG. 18A for convenience of explanation, but is not limited thereto and may also be applicable to the antenna assembly of FIG. 18B.

The glass panel 310 may include a transparent region 311 and an opaque region 312. A first region 1100*a* corresponding to the antenna region of the antenna assembly 1000 may be formed in the transparent region 311. A second region 1100*b* corresponding to the feeding region of the antenna assembly 1000 may be formed in the opaque region 312. A portion of the first region 1100*a* which is connected to the feeding pattern 1110*f* of the second region 1100*b* may be disposed in the opaque region 312.

The antenna assembly 1000 may include conductive patterns 1100 implemented as a metal mesh layer formed on the transparent dielectric substrate 1010*a*. A transparent antenna element may be implemented by the conductive patterns 1100 formed as the metal mesh layer. Dummy metal mesh grids spaced apart from the transparent antenna element may be disposed on the metal mesh layer 1020. A first protective layer 1031 may be formed on top of the metal mesh layer 1020. An adhesive layer 1040 may be formed on the bottom of the transparent dielectric substrate 1010*a*.

A conductive pattern including the feeding pattern 1110*f* and the ground pattern may be formed on the second dielectric substrate 1010*b*. The second dielectric substrate 1010*b* may be implemented as an FPCB, but is not limited thereto. A second protective layer 1032 may be formed on top of the feeding pattern 1110*f*. The second dielectric substrate 1010*b*, the conductive pattern including the feeding pattern 1110*f* and the ground pattern, and the second protective layer 1032 may form a feeding structure 1100*f*. The feeding pattern 1110*f* may be connected to the conductive patterns 1100 formed on the metal mesh layer in a third region 1100*c* corresponding to a bonding region. In the third region 1100*c*, a first connection pattern 1110*c* among the conductive patterns 1100 may be connected to a second connection pattern 1120*c*, which is an end of the feeding pattern 1110*f*.

Figure 19A:
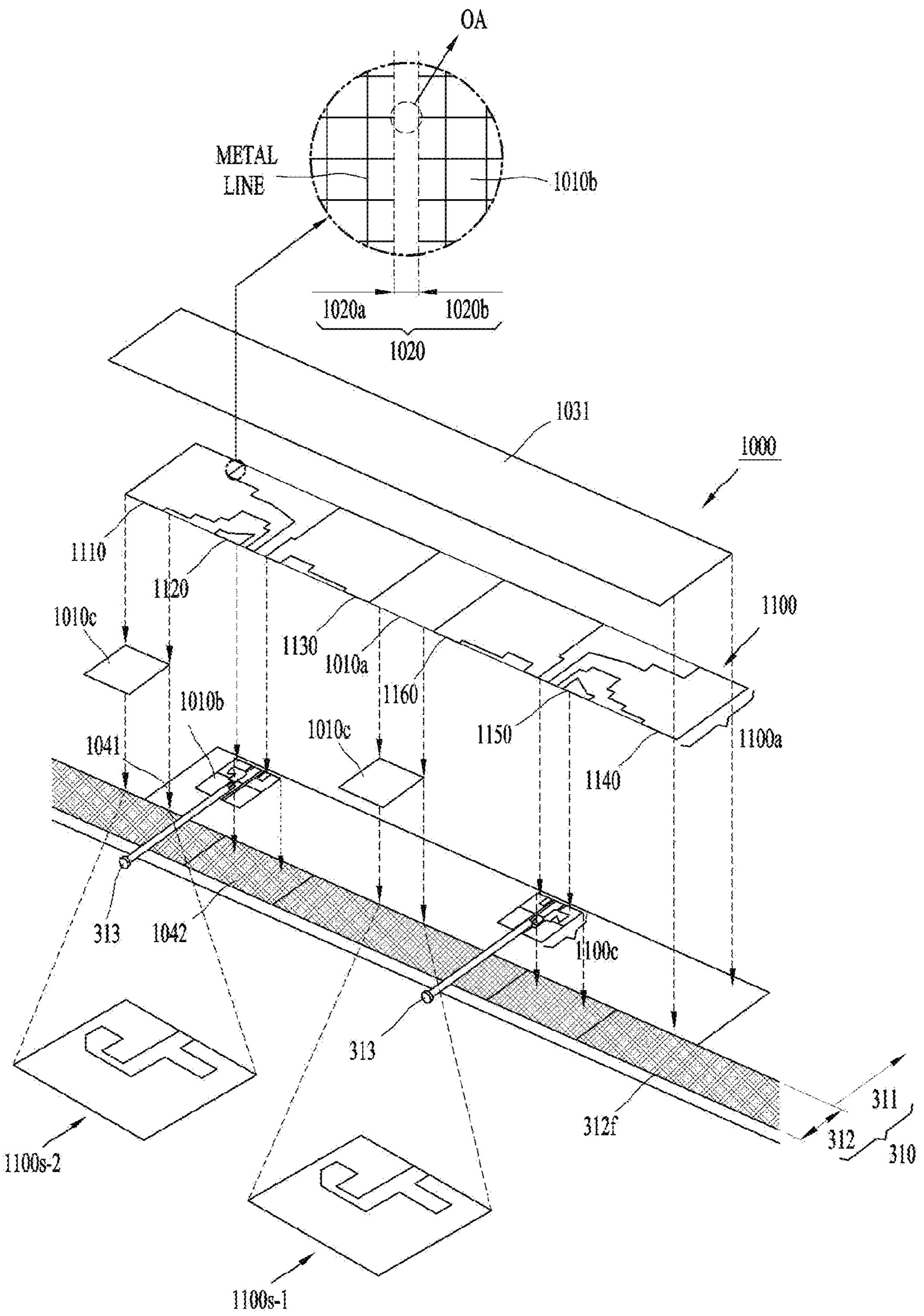
FIG. 19A illustrates the structure of an antenna assembly with a transparent antenna structure according to another aspect of the specification.
Figure 19B:
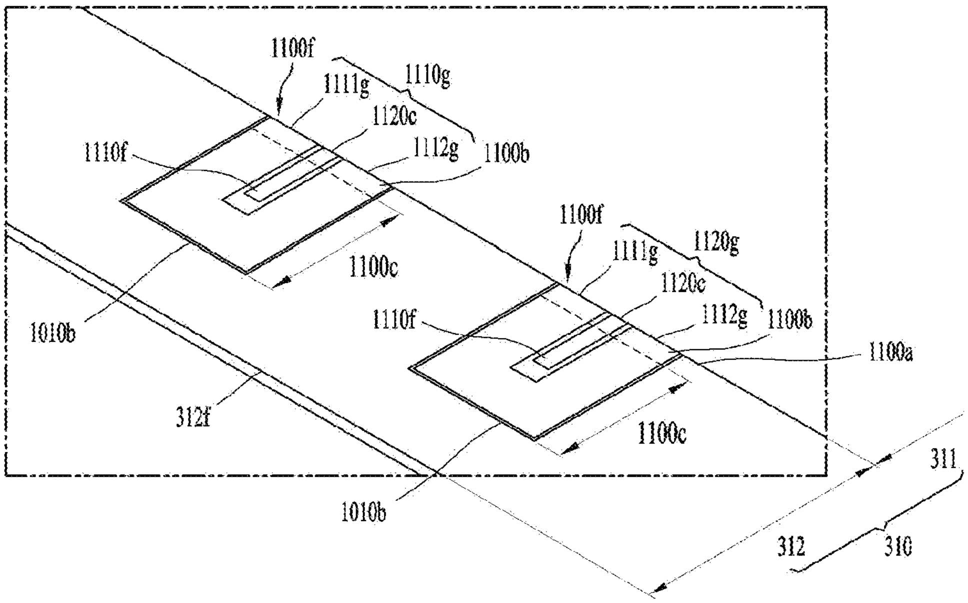
FIG. 19B illustrates a structure in which a second dielectric substrate of the antenna assembly of FIG. 19A is disposed in an opaque region of a glass panel.
Figure 19C:
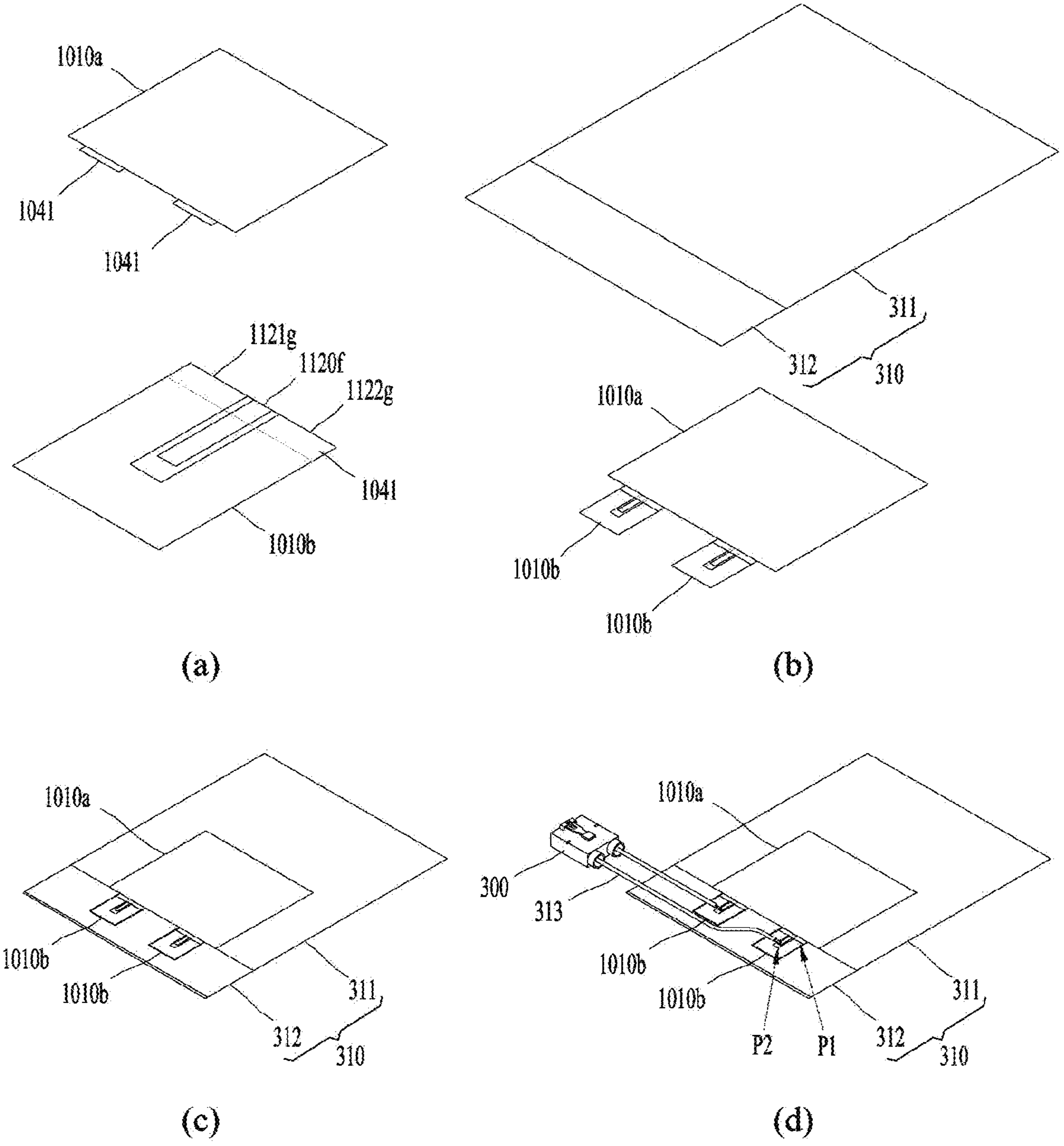
FIG. 19C illustrates the flow of processes in which an antenna assembly is manufactured by being coupled to a glass panel according to an embodiment.

The foregoing description has been given of the antenna assembly with the transparent antenna structure according to one aspect of the specification. Hereinafter, an antenna assembly with a transparent antenna structure according to another aspect of the specification will be described. In this regard, FIG. 19A illustrates the structure of an antenna assembly with a transparent antenna structure according to another aspect of the specification. FIG. 19B illustrates a structure in which a second dielectric substrate of the antenna assembly of FIG. 21A is disposed in an opaque region of a glass panel. FIG. 19C illustrates the flow of processes in which an antenna assembly according to an embodiment is manufactured by being coupled to a glass panel.

Referring to FIGS. 1, 9A to 9C, 11 to 12B, and 18A to 19C, a vehicle may be configured to include a glass panel 310 and an antenna assembly 1000. The glass panel 310 may be configured to include a transparent region 311 and an opaque region 312. The antenna assembly 1000 may be arranged on the glass panel 310. The antenna assembly 1000 may include a first transparent dielectric substrate 1010*a*, an antenna element 1100, connection patterns 1110*c* and 1120*c*, a second dielectric substrate 1010*b*, a ground conductive pattern 1110*g*, and a feeding pattern 1110*f*.

The antenna assembly 1000 implemented as a transparent antenna may be designed as a CPW antenna structure in the form of a single layer. Meanwhile, the antenna assembly 1000 may include a first conductive pattern 1110 to a third conductive pattern 1130. Referring to FIG. 11B, the antenna assembly 1000 may include a first conductive pattern 1110 to a fourth conductive pattern 1140.

The first transparent dielectric substrate 1010*a* may include a first region 1100*a* and a second region 1100*b*. The first region 1100*a* may include an antenna element 1100 on one side surface of the first transparent dielectric substrate 1010*a*. The antenna element 1100 may be referred to as an antenna module 1100 because it includes a plurality of conductive patterns. The first region on one side of the first transparent dielectric substrate 1010*a* may be disposed in the transparent region 311 of the glass panel 310.

The connection patterns 1110*c* and 1120*c* may be connected to the antenna element 1100. The connection patterns 1110*c* and 1120*c* may be disposed in the second region 1110*b* on one side of the first transparent dielectric substrate 1010*a*. The second region 1100*b* on the one side of the first transparent dielectric substrate 1010*b* may be disposed in the opaque region 312 of the glass panel 310.

The second dielectric substrate 1010*b* may be disposed in the opaque region 312 of the glass panel 310. The ground conductive pattern 1110*g* and the feeding pattern 1110*f* may be disposed in a third region 1100*c* on one side of the second dielectric substrate 1010*b*.

The first region 1100*a* may include antenna elements 1100 that include the conductive patterns on one side of the first dielectric substrate 1010*a* and are configured to radiate radio signals. The second region 1100*b* may include ground conductive patterns 1111*g* and 1112*g* and the feeding pattern 1110*f*. The first region 1100*a* and the second region 1100*b* may also be referred to as a radiator region and a ground region (or a feeding region), respectively.

The first dielectric substrate 1010*a* may be arranged on the transparent region 311 of the glass panel 310. A first transparent antenna 1100-1 and a second transparent antenna 1100-2 may be formed on one side of the first dielectric substrate 1010*a*. The first transparent antenna 1100-1 and the second transparent antenna 11002 may be referred to as a first radiation structure and a second radiation structure, respectively. The second dielectric substrate 1010*b* may include a first ground region 1110*g* and a second ground region 1120*g*. The second dielectric substrate 1010*b* may be disposed in the recess portion 49R of the metal frame 49 and the opaque region 312 of the glass panel 310.

A first slot pattern region 1100*s*-1 implemented with a slot pattern 1110*s* may be disposed below the first or second transparent antenna 1100-1 and 1100-2. Also, a slot antenna structure implemented as a second slot pattern 1100*s*-2 may be arranged between the first and second transparent antennas 1100-1 and 1100-2. The slot pattern 1110*s* may be disposed below the first transparent antenna 1100-1. One end of the pattern region 1100*c* where the slot pattern 1110*s* is formed and one end of the first ground region 1100*g* may be arranged to be spaced apart from each other by a first separation distance L1.

Another end of the pattern region 1100*c* in which the second slot pattern region 1100*s*-2 is formed and one end of the second ground region 1120*g* may be spaced apart from each other by a second separation distance L2 that is equal to the first separation distance L1, but the disclosure is not limited thereto. The first separation distance L1 and the second separation distance L2 may be formed to be longer than a horizontal distance $L_H$ of a third conductive pattern 1130 and a sixth conductive pattern 1160 that constitute the first transparent antenna 1100-1 and the second transparent antenna 1100-2.

One end and another end of the pattern region 1100*c* constituting the slot antenna may be spaced apart from a boundary side of the first and second transparent antennas 1100-1 and 1100-2 by a certain gap distance or more. In this regard, one end of the pattern region 1100*c* in which the slot pattern 1100*s* is formed may have a first gap distance G1 to the lower boundary side of the first conductive pattern 1110 constituting the first transparent antenna 1100-1. Another end of the pattern region 1100*c* in which the second slot pattern region 1100*s*-2 is formed may form a second gap distance G2, which is equal to the first gap distance G1, to the boundary side of the sixth conductive pattern 1160 constituting the second transparent antenna 1100-2.

The slot pattern 1100*s* may include a first slot pattern 1110*s* and a second slot pattern 1120*s*. The first slot pattern 1110*s* may be formed vertically in one axial direction on the pattern region 1100*c*. The first slot pattern 1110*s* may be configured to radiate a signal of a first operating frequency band. The second slot pattern 1120*s* may be formed horizontally in another axial direction perpendicular to the one axial direction on one point of the first slot pattern 1110*s*. The second slot pattern 1120*s* may be configured to radiate a signal of a second operating frequency band that is higher than the first operating frequency band. In this regard, the first and second operating frequency bands may be set to 2.4 GHz and 5.5 GHz, respectively.

The first slot pattern region 1100*s*-1 and the second slot pattern region 1100*s*-2 may each be configured to include a plurality of slot patterns, for example, a first slot pattern 1110*s* to a fourth slot pattern 1140*s*. The first slot pattern 1110*s* may form a vertical slot region. The second slot pattern 1120*s* may form a horizontal slot region in a first direction of the another axial direction. The slot pattern 1110*s* may further include an additional slot pattern extending from one end of the first slot pattern 1110*s*. The slot pattern 1110*s* may further include a third slot pattern 1130*s* fed by a feeding pattern 1130*f*. The slot pattern 1110*s* may further include a fourth slot pattern 1140*s*. The third slot pattern 1130*s* and the fourth slot pattern 1140*s* may be referred to as a feeding slot pattern and a matching slot pattern, respectively.

The third slot pattern 1130*s* may be formed such that one end thereof extends from one end of the first slot pattern 1110*s*. The third slot pattern 1130*s* may be formed in an opposite direction to the second slot pattern 1120*s* to be horizontal in a second direction of the another axial direction. The third slot pattern 1130*s* may be configured to be coupling-fed by the feeding pattern 1130*f* so that a signal of a first or second operating frequency band is fed. The fourth slot pattern 1140*s* may be formed such that one end thereof extends from another end of the third slot pattern 1130*s*. The fourth slot pattern 1140*s* may be formed parallel to the first slot pattern 1110*s*.

Meanwhile, an antenna assembly according to the specification may be configured to include a first transparent dielectric substrate, on which a transparent electrode layer is formed, and a second dielectric substrate. As described above, FIG. 19C illustrates the flow of processes in which the antenna assembly according to the embodiment is manufactured by being coupled to a glass panel.

Referring to (a) of FIG. 19C, the first transparent dielectric substrate 1000*a* on which the transparent electrode layer is formed may be manufactured. In addition, the second dielectric substrate 1010*b* that includes the feeding pattern 1120*f* and the ground patterns 1121g and 1122*g* formed on both sides of the feeding pattern 1120*f* may be manufactured. The second dielectric substrate 1010*b* may be implemented as an FPCB, but is not limited thereto. Adhesion regions corresponding to the adhesive layers 1041 may be formed on the first transparent dielectric substrate 1000*a* and the second dielectric substrate 1010*b*, respectively.

Referring to (b) of FIG. 19C, the glass panel 310 with the transparent region 311 and the opaque region 312 may be manufactured. In addition, the antenna assembly 1000 may be manufactured by coupling at least one second dielectric substrate 1010*b* to the lower region of the first transparent dielectric substrate 1000*a*. The first transparent dielectric substrate 1000*a* and the second dielectric substrate 1010*b* may be coupled through ACF bonding or low-temperature soldering to be implemented as the transparent antenna assembly. Through this, the conductive pattern formed on the first transparent dielectric substrate 1000*a* can be electrically connected to the conductive pattern formed on the second dielectric substrate 1010*b*. When a plurality of antenna elements are implemented on the glass panel 310, the feeding structure 1100*f* made of the second dielectric substrate 1010*b* may also be implemented as a plurality of feeding structures.

Referring to (c) of FIG. 19C, the transparent antenna assembly 1000 may be attached to the glass panel 310. In this regard, the first transparent dielectric substrate 1000*a* on which the transparent electrode layer is formed may be disposed in the transparent region 311 of the glass panel 310. Meanwhile, the second dielectric substrate 1010*b*, which is the opaque substrate, may be disposed in the opaque region 312 of the glass panel 310.

Referring to (d) of FIG. 19C, the first transparent dielectric substrate 1000*a* and the second dielectric substrate 1010*b* may be bonded at a first position P1. The connector part 313, such as a Fakra cable, may be bonded to the second dielectric substrate 1010*b* at a second position P2. The transparent antenna assembly 1000 may be coupled to the telematics control unit (TCU) 300 through the connector part 313. To this end, the second conductive pattern formed on the second dielectric substrate 1010*b* may be electrically connected to a connector of one end of the connector part 313. A connector of another end of the connector part 313 may be electrically connected to the telematics control unit (TCU) 300.

Figure 20A:
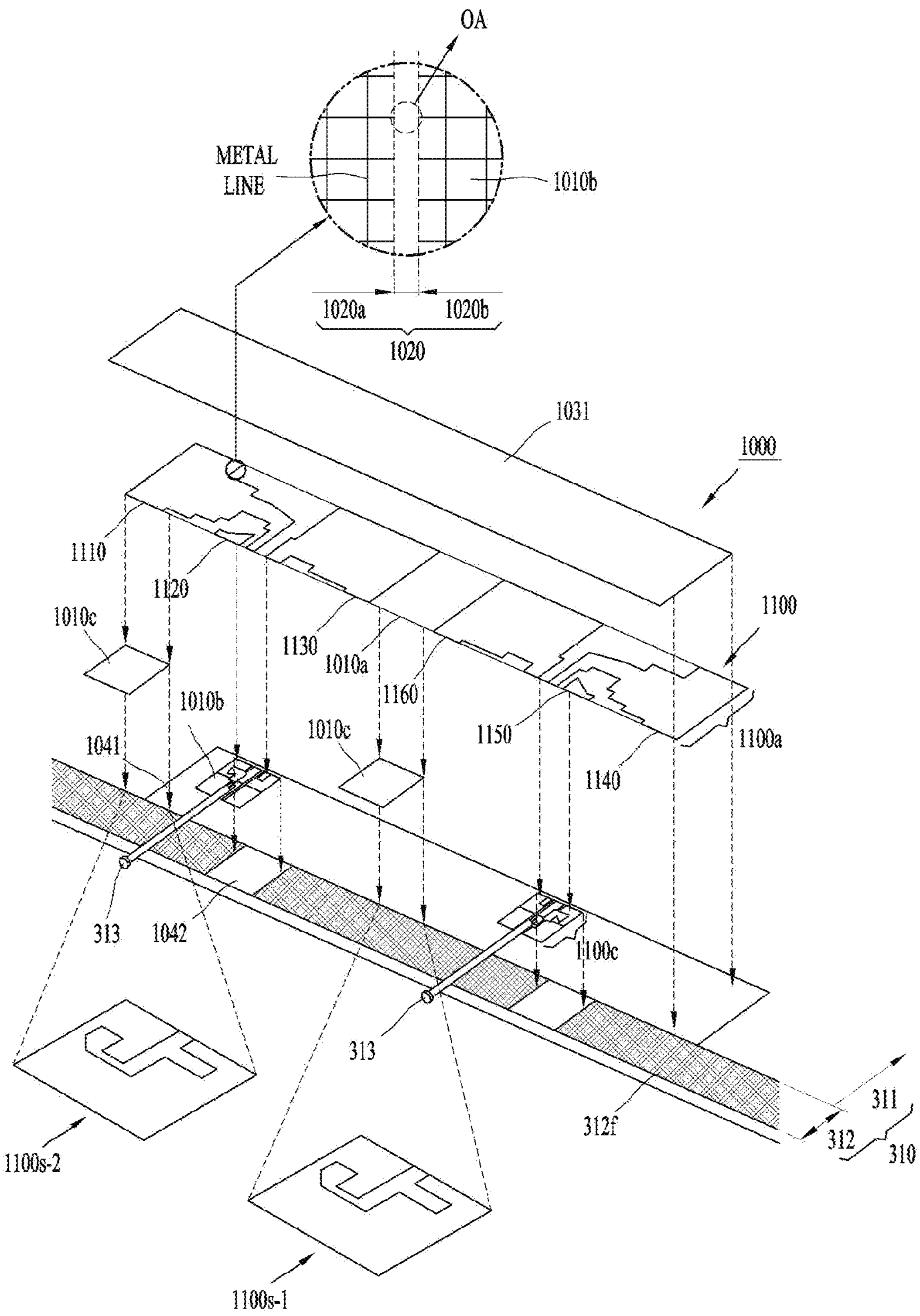
FIG. 20A illustrates the structure of an antenna assembly with a transparent antenna structure according to still another aspect of this specification.
Figure 20B:
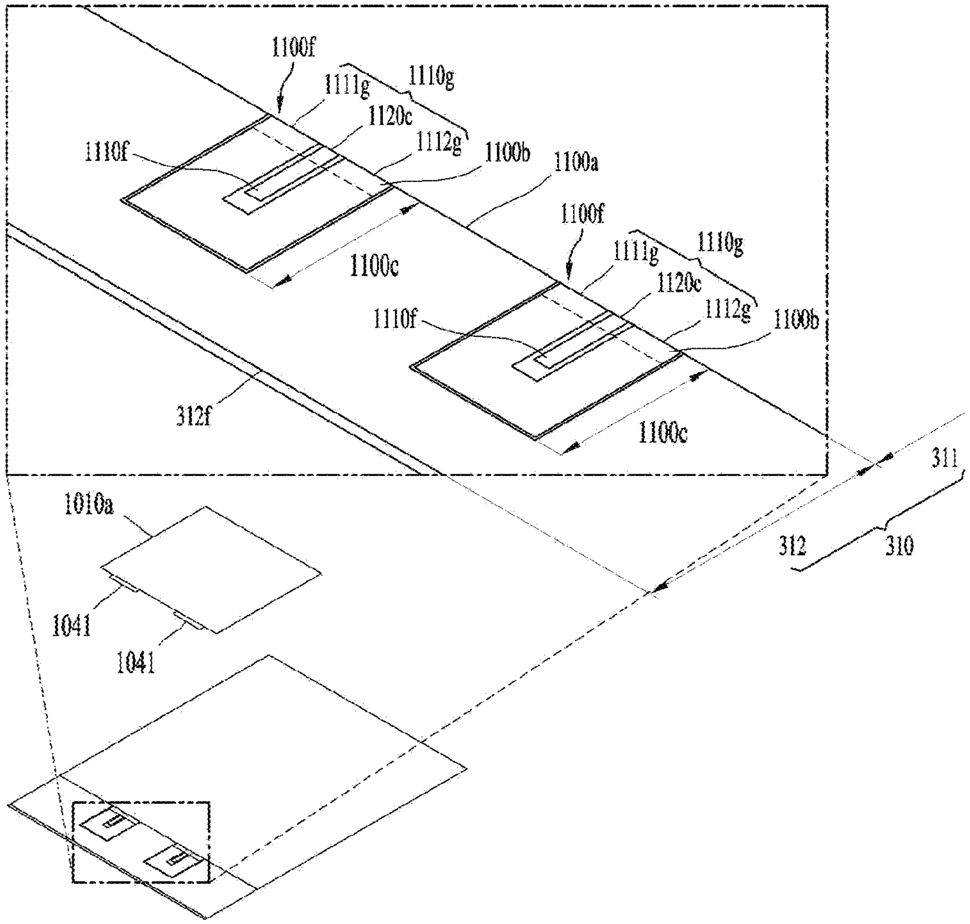
FIG. 20B is a process flowchart of a structure in which a feeding structure of the antenna assembly of FIG. 20A is disposed in an opaque region of a glass panel.
Figure 20B:
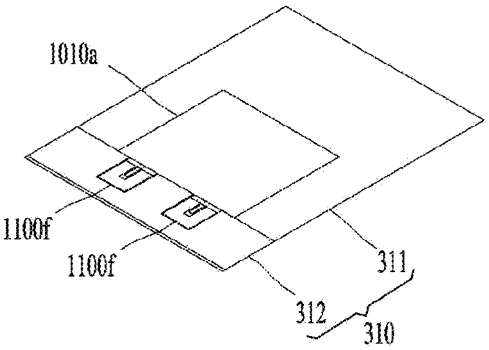
Figure 20B:
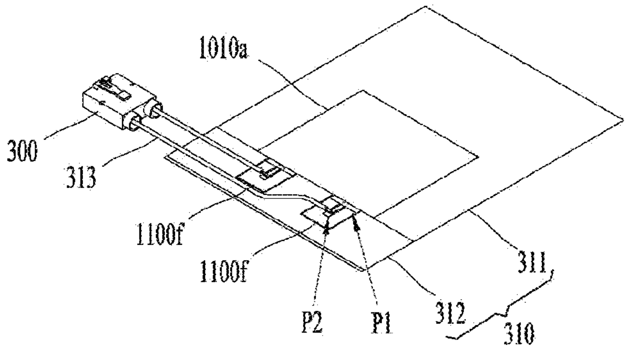

Hereinafter, an antenna assembly with a transparent antenna structure according to still another aspect of the specification will be described. In this regard, FIG. 20A illustrates the structure of an antenna assembly with a transparent antenna structure according to still another aspect of the specification. FIG. 20B is a process flowchart of a structure in which a feeding structure of the antenna assembly of FIG. 20A is disposed in an opaque region of a glass panel. In this regard, a feeding structure 1100*f* may be disposed in a region where a frit pattern 312*f* has been removed.

Referring to FIGS. 1, 9A to 9C, 11 to 12B, 18A to 18C, and 20A and 20B, a vehicle may be configured to include a glass panel 310 and an antenna assembly 1000. The glass panel 310 may be configured to include a transparent region 311 and an opaque region 312. One side of the opaque region 312 may include a ground conductive pattern 1110*g* and a feeding pattern 1110*f*. A frit pattern 312*f* may be cut out from a region where a second dielectric substrate 1010*b* having the ground conductive pattern 1110*g* and the feeding pattern 1110*f* is disposed.

The antenna assembly 1000 may be disposed on the glass panel 310. The antenna assembly 1000 may include a first transparent dielectric substrate 1010*a*, an antenna element 1100, connection patterns 1110*c* and 1120*c*, a second dielectric substrate 1010*b*, a ground conductive pattern 1110*g*, and a feeding pattern 1110*f*.

The first transparent dielectric substrate 1010*a* may include a first region 1100*a* and a second region 1100*b*. The first region 1100*a* may include an antenna element 1100 on one side of the first transparent dielectric substrate 1010*a*. The antenna element 1100 may be referred to as an antenna module 1100 because it includes a plurality of conductive patterns. The first region on one side of the first transparent dielectric substrate 1010*a* may be disposed in the transparent region 311 of the glass panel 310.

The connection patterns 1110*c* and 1120*c* may be connected to the antenna element 1100. The connection patterns 1110*c* and 1120*c* may be disposed in the second region 1110*b* on one side of the first transparent dielectric substrate 1010*a*. The second region 1100*b* on the one side of the first transparent dielectric substrate 1010*b* may be disposed in the opaque region 312 of the glass panel 310.

The second dielectric substrate 1010*b* may be disposed in the opaque region 312 of the glass panel 310. The ground conductive pattern 1110*g* and the feeding pattern 1110*f* may be disposed in a third region 1100*c* on one side of the second dielectric substrate 1010*b*.

The first region 1100*a* may include antenna elements 1100 that include the conductive patterns on one side of the first dielectric substrate 1010*a* and are configured to radiate radio signals. The second region 1100*b* may include ground conductive patterns 1111*g* and 1112*g* and the feeding pattern 1110*f*. The first region 1100*a* and the second region 1100*b* may also be referred to as a radiator area and a ground area (or a feeding area), respectively.

The first dielectric substrate 1010*a* may be disposed on the transparent region 311 of the glass panel 310. A first transparent antenna 1100-1 and a second transparent antenna 1100-2 may be formed on one side of the first dielectric substrate 1010*a*. The first transparent antenna 1100-1 and the second transparent antenna 11002 may be referred to as a first radiation structure and a second radiation structure, respectively. The second dielectric substrate 1010*b* may include a first ground region 1110*g* and a second ground region 1120*g*. The second dielectric substrate 1010*b* may be disposed in the recess portion 49R of the metal frame 49 and the opaque region 312 of the glass panel 310.

A first slot pattern region 1100*s*-1 implemented with a slot pattern 1110*s* may be disposed below the first or second transparent antenna 1100-1 or 1100-2. Also, a slot antenna structure implemented as a second slot pattern 1100*s*-2 may be arranged between the first and second transparent antennas 1100-1 and 1100-2. The slot pattern 1110*s* may be disposed below the first transparent antenna 1100-1. One end of the pattern region 1100*c* where the slot pattern 1110*s* is formed and one end of the first ground region 1100*g* may be arranged to be spaced apart from each other by a first separation distance L1.

Another end of the pattern region 1100*c* in which the second slot pattern region 1100*s*-2 is formed and one end of the second ground region 1120*g* may be spaced apart from each other by a second separation distance L2 that is equal to the first separation distance L1, but the disclosure is not limited thereto. The first separation distance L1 and the second separation distance L2 may be formed to be longer than a horizontal distance $L_H$ of a third conductive pattern 1130 and the sixth conductive pattern 1160 that constitute the first transparent antenna 1100-1 and the second transparent antenna 1100-2.

One end and another end of the pattern region 1100*c* constituting the slot antenna may be spaced apart from a boundary side of the first and second transparent antennas 1100-1 and 1100-2 by a certain gap distance or more. In this regard, one end of the pattern region 1100*c* in which the slot pattern 1100*s* is formed may have a first gap distance G1 to the lower boundary side of the first conductive pattern 1110 constituting the first transparent antenna 1100-1. Another end of the pattern region 1100*c* in which the second slot pattern region 1100*s*-2 is formed may form a second gap distance G2, which is equal to the first gap distance G1, to the boundary side of the sixth conductive pattern 1160 constituting the second transparent antenna 1100-2.

The slot pattern 1100*s* may include a first slot pattern 1110*s* and a second slot pattern 1120*s*. The first slot pattern 1110*s* may be formed vertically in one axial direction on the pattern region 1100*c*. The first slot pattern 1110*s* may be configured to radiate a signal of a first operating frequency band. The second slot pattern 1120*s* may be formed horizontally in another axial direction perpendicular to the one axial direction on one point of the first slot pattern 1110*s*. The second slot pattern 1120*s* may be configured to radiate a signal of a second operating frequency band that is higher than the first operating frequency band. In this regard, the first and second operating frequency bands may be set to 2.4 GHz and 5.5 GHz, respectively.

The first slot pattern region 1100*s*-1 and the second slot pattern region 1100*s*-2 may each be configured to include a plurality of slot patterns, for example, a first slot pattern 1110*s* to a fourth slot pattern 1140*s*. The first slot pattern 1110*s* may form a vertical slot region. The second slot pattern 1120*s* may form a horizontal slot region in a first direction of the another axial direction. The slot pattern 1110*s* may further include an additional slot pattern extending from one end of the first slot pattern 1110*s*. The slot pattern 1110*s* may further include a third slot pattern 1130*s* fed by a feeding pattern 1130*f*. The slot pattern 1110*s* may further include a fourth slot pattern 1140*s*. The third slot pattern 1130*s* and the fourth slot pattern 1140*s* may be referred to as a feeding slot pattern and a matching slot pattern, respectively.

The third slot pattern 1130*s* may be formed such that one end thereof extends from one end of the first slot pattern 1110*s*. The third slot pattern 1130*s* may be formed in an opposite direction to the second slot pattern 1120*s* to be horizontal in a second direction of the another axial direction. The third slot pattern 1130*s* may be configured to be coupling-fed by the feeding pattern 1130*f* so that a signal of a first or second operating frequency band is fed. The fourth slot pattern 1140*s* may be formed such that one end thereof extends from another end of the third slot pattern 1130*s*. The fourth slot pattern 1140*s* may be formed parallel to the first slot pattern 1110*s*.

The antenna assembly of FIG. 20B may have a structural difference, compared to the antenna assembly of FIG. 19C, in that the opaque substrate is not manufactured separately but is manufactured integrally with the glass panel 310. The antenna assembly of FIG. 20B is implemented in such a way that the feeding structure implemented as the opaque substrate is directly printed on the glass panel 310 rather than being separately manufactured as an FPCB.

Referring to (a) of FIG. 20B, the first transparent dielectric substrate 1000*a* on which the transparent electrode layer is formed may be manufactured. In addition, the glass panel 310 with the transparent region 311 and the opaque region 312 may be manufactured. In the process of manufacturing of the glass panel of the vehicle, metal wires/pads for connection of the connectors may be implemented (fired). Like heating wires implemented on the vehicle glass, a transparent antenna mounting portion may be implemented in a metal form on the glass panel 310. In this regard, the second conductive pattern may be implemented in the region where the adhesive layer 1041 is formed for electrical connection to the first conductive pattern of the first transparent dielectric substrate 1000*a*.

In this regard, the second dielectric substrate 1010*b* on which the second conductive pattern is formed may be manufactured integrally with the glass panel 310. The second dielectric substrate 1010*b* may be formed integrally with the glass panel 310 in the opaque region 312 of the glass panel 310. The frit pattern 312 may be removed from the opaque region 312 where the second dielectric substrate 1010*b* is formed. The second conductive pattern may be implemented by forming the feeding pattern 1120*f* and the ground patterns 1121*g* and 1122*g* on both sides of the feeding pattern 1120*f* on the second dielectric substrate 1010*b*.

Referring to (b) of FIG. 20B, the transparent antenna assembly 1000 may be attached to the glass panel 310. In this regard, the first transparent dielectric substrate 1000*a* on which the transparent electrode layer is formed may be disposed in the transparent region 311 of the glass panel 310. The antenna assembly 1000 may be manufactured by coupling at least one second dielectric substrate 1010*b* to the lower region of the first transparent dielectric substrate 1000*a*. The first transparent dielectric substrate 1000*a* and the second dielectric substrate 1010*b* may be coupled through ACF bonding or low-temperature soldering to be implemented as a transparent antenna assembly. Through this, the first conductive pattern formed on the first transparent dielectric substrate 1000*a* can be electrically connected to the second conductive pattern formed on the second dielectric substrate 1010*b*. When a plurality of antenna elements are implemented on the glass panel 310, the feeding structure 1100*f* made of the second dielectric substrate 1010*b* may also be implemented as a plurality of feeding structures.

Referring to (c) of FIG. 20B, the first transparent dielectric substrate 1000*a* and the second dielectric substrate 1010*b* may be bonded at a first position P1. The connector part 313, such as a Fakra cable, may be bonded to the second dielectric substrate 1010*b* at a second position P2. The transparent antenna assembly 1000 may be coupled to the telematics control unit (TCU) 300 through the connector part 313. To this end, the second conductive pattern formed on the second dielectric substrate 1010*b* may be electrically connected to a connector of one end of the connector part 313. A connector of another end of the connector part 313 may be electrically connected to the telematics control unit (TCU) 300.

Figure 21:
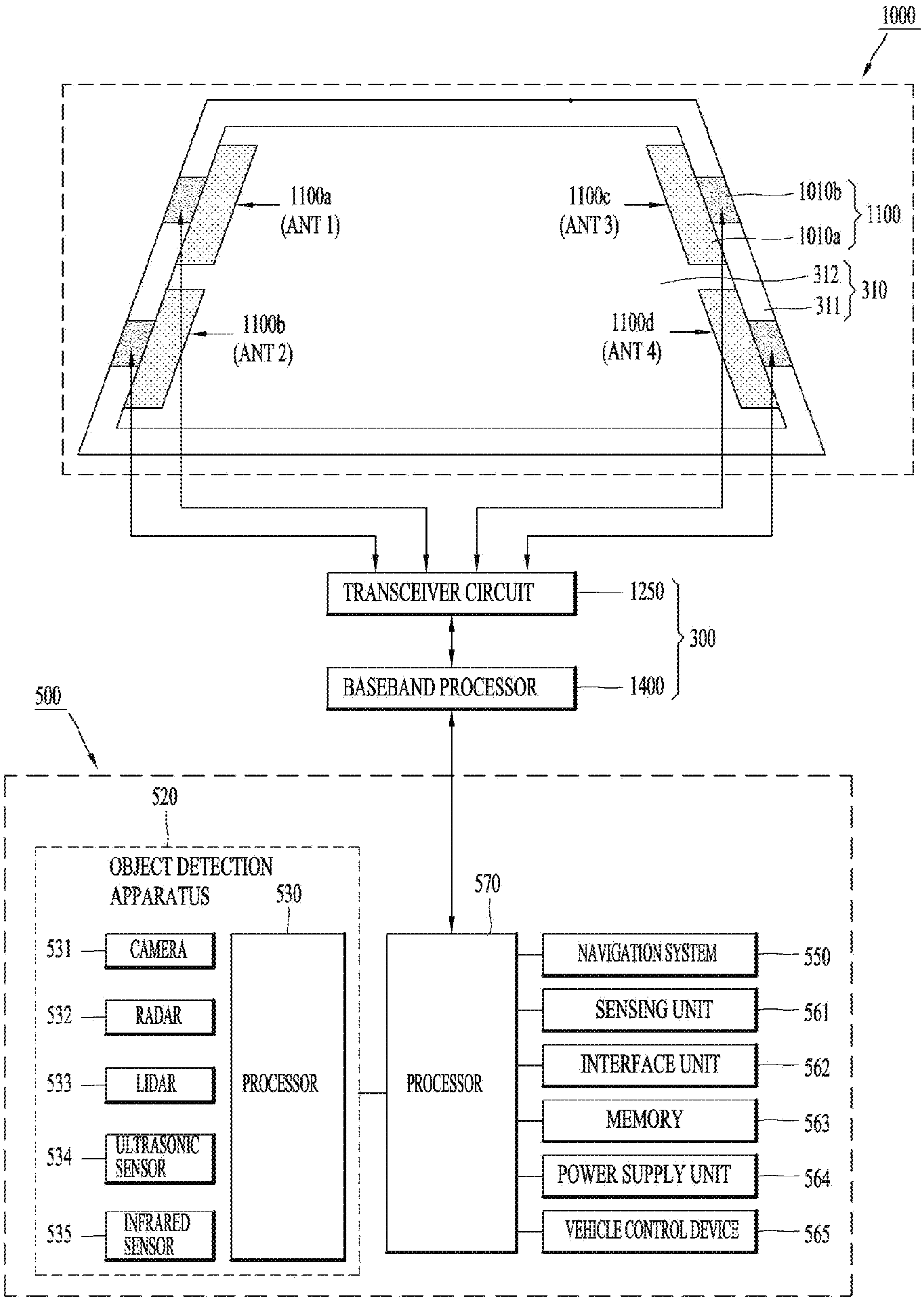
FIG. 21 illustrates an example of a configuration in which a plurality of antenna modules disposed at different positions of a vehicle are coupled with other components of the vehicle according to this specification.

Hereinafter, a vehicle having an antenna module according to one example will be described in detail. In this regard, FIG. 21 illustrates an example of a configuration in which a plurality of antenna modules disposed at different positions of a vehicle are coupled with other parts of the vehicle.

Referring to FIGS. 1 to 21, the vehicle 500 may include a conductive vehicle body operating as an electrical ground. The vehicle 500 may include a plurality of antennas 1100*a* to 1100*d* that may be disposed at different positions on the glass panel 310. The antenna assembly 1000 may be configured such that the plurality of antennas 1100*a* to 1100*d* include a communication module 300. The communication module 300 may include a transceiver circuit 1250 and a processor 1400. The communication module 300 may correspond to the TCU of the vehicle or may constitute at least a portion of the TCU.

The vehicle 500 may include an object detecting apparatus 520 and a navigation system 550. The vehicle 500 may further include a separate processor 570 in addition to the processor 1400 included in the communication module 300. The processor 1400 and the separate processor 570 may be physically or functionally separated and implemented on one substrate. The processor 1400 may be implemented as a TCU, and the processor 570 may be implemented as an electronic control unit (ECU).

In the case where the vehicle 500 is an autonomous vehicle, the processor 570 may be an autonomous driving control unit (ADCU) integrated with an ECU. Based on information detected through a camera 531, radar 532, and/or lidar 533, the processor 570 may search for a path and control the speed of the vehicle 500 to be accelerated or decelerated. To this end, the processor 570 may interoperate with a processor 530 corresponding to an MCU in the object detecting apparatus 520 and/or the communication module 300 corresponding to the TCU.

The vehicle 500 may include the first transparent dielectric substrate 1010*a* and the second dielectric substrate 1010*b* disposed on the glass panel 310. The first transparent dielectric substrate 1010*a* may be formed inside the glass panel 310 of the vehicle or may be attached to the surface of the glass panel 310. The first transparent dielectric substrate 1010*a* may be configured such that conductive patterns in the metal mesh grid shape are formed. The vehicle 500 may include an antenna module 1100 which is formed in a metal mesh shape on one side of the dielectric substrate 1010 to radiate radio signals.

The antenna assembly 1000 may include a first antenna module 1100*a* to a fourth antenna module 1100*d* to perform MIMO. The first antenna module 1100*a*, the second antenna module 1100*b*, the third antenna module 1100*c*, and the fourth antenna module 1100*d* may be disposed on the upper left, lower left, upper right, and lower right sides of the glass panel 310, respectively. The first antenna module 1100*a* to the fourth antenna module 1100*d* may be referred to as a first antenna ANT1 to a fourth antenna ANT4, respectively. The first antenna ANT1 to the fourth antenna ANT4 may be referred to as the first antenna module ANT1 to the fourth antenna module ANT4, respectively.

As described above, the vehicle 500 may include the telematics control unit (TCU) 300, which is the communication module. The TCU 300 may control signals to be received and transmitted through at least one of the first to fourth antenna modules 1100*a* to 1100*d*. The TCU 300 may include a transceiver circuit 1250 and a processor 1400.

Accordingly, the vehicle may further include a transceiver circuit 1250 and a processor 1400. A portion of the transceiver circuit 1250 may be disposed in units of antenna modules or in combination thereof. The transceiver circuit 1250 may control a radio signal of at least one of first to third frequency bands to be radiated through the antenna modules ANT1 to ANT4. The first to third frequency bands may be low band (LB), mid band (MB), and high band (HB) for 4G/5G wireless communications, but are not limited thereto.

The processor 1400 may be operably coupled to the transceiver circuit 1250 and may be configured as a modem operating in a baseband. The processor 1400 may receive or transmit a signal through at least one of the first antenna module ANT1 and the second antenna module ANT2. The processor 1400 may perform a diversity operation or MIMO using the first antenna module ANT1 and the second antenna module ANT2 such that a signal is transmitted to the inside of the vehicle.

Antenna modules may be disposed in different regions of one side surface and another side surface of the glass panel 310. The antenna modules may perform MIMO by simultaneously receiving signals from the front of the vehicle. In this regard, to perform 4×4 MIMO, the antenna modules may further include a third antenna module ANT3 and a fourth antenna module ANT4 in addition to the first antenna module ANT1 and the second antenna module ANT2.

The processor 1400 may select an antenna module to perform communication with an entity communicating with the vehicle based on a driving path of the vehicle and a communication path with the entity. The processor 1400 may perform MIMO by using the first antenna module ANT1 and the second antenna module ANT2 based on a direction that the vehicle travels. Alternatively, the processor 1400 may perform MIMO through the third antenna module ANT2 and the fourth antenna module ANT4 based on the direction that the vehicle travels.

The processor 1400 may perform MIMO in a first band through at least two of the first antenna ANT1 to the fourth antenna ANT4. The processor 1400 may perform MIMO in at least one of a second band and a third band through at least two of the first antenna ANT1 to the fourth antenna ANT4.

Accordingly, when signal transmission/reception performance of the vehicle in any one band deteriorates, signal transmission/reception in the vehicle can be performed in other bands. For example, the vehicle may preferentially perform communication connection in the first band, which is the low band, for wide communication coverage and connection reliability, and then perform communication connection in the second and third bands.

The processor 1400 may control the transceiver circuit 1250 to perform carrier aggregation (CA) or dual connectivity (DC) through at least one of the first antenna ANT1 to the fourth antenna ANT4. In this regard, communication capacity can be expanded through the aggregation of the second band and the third band, which are wider than the first band. In addition, communication reliability can be improved through the DC with neighboring vehicles or entities by using the plurality of antenna elements disposed in the different regions of the vehicle.

The foregoing description has been given of the broadband transparent antenna assembly that may be arranged on the vehicle glass and the vehicle equipped therewith. Hereinafter, the technical effects of a broadband transparent antenna assembly that may be disposed on vehicle glass and a vehicle equipped therewith will be described.

According to the specification, 4G/5G broadband wireless communications in a vehicle can be allowed by providing a broadband transparent antenna assembly having a plurality of conductive patterns that may be placed on vehicle glass.

According to the specification, the entire size of an antenna assembly can be minimized by arranging a WIFI/BT antenna structure, which may coexist with a transparent antenna, in an opaque region of vehicle glass in consideration of the arrangement structure of the transparent antenna placed on the vehicle glass and a vehicle body structure.

According to the specification, in a structure in which a WIFI/BT antenna and a transparent antenna are arranged, the electrical characteristics of the antennas, such as impedance matching characteristics and antenna efficiency, can be optimized.

According to the specification, radiation can be induced in a direction toward glass in an opaque region of a WIFI/BT antenna for vehicle glass, thereby minimizing the influence of radiation loss caused by a metal frame in a frit portion of the opaque region.

According to the specification, a WIFI/BT antenna can be implemented as a slot pattern of a dielectric substrate and arranged at certain separation distances or more from conductive patterns of a transparent antenna, so that the isolation between the WIFI/BT antenna and the transparent antenna can be maintained below a certain level.

According to the specification, a broadband antenna structure made of a transparent material that can reduce feeding loss and improve antenna efficiency while operating in a wide band can be provided.

According to the specification, the efficiency of a feeding structure of a broadband transparent antenna assembly that may be disposed on vehicle glass can be improved, and the reliability of a mechanical structure including the feeding structure can be secured.

Further scope of applicability of the disclosure will become apparent from the following detailed description. It should be understood, however, that the detailed description and specific examples, such as the preferred embodiment of the disclosure, are given by way of illustration only, since various changes and modifications within the spirit and scope of the disclosure will be apparent to those skilled in the art.

In relation to the aforementioned disclosure, the design and operations of an antenna assembly having transparent antennas and a vehicle controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A vehicle comprising:

a metal frame in which an opening is formed;

a glass panel comprising a transparent region and an opaque region; and an antenna assembly disposed on the glass panel, wherein the antenna assembly comprises:

a first dielectric substrate disposed at the transparent region of the glass panel and comprising a first transparent antenna and a second transparent antenna;

a second dielectric substrate comprising a first ground region and a second ground region and arranged at a recess portion of the metal frame and the opaque region of the glass panel; and a slot pattern formed at a pattern region positioned between the first ground region and the second ground region, wherein the slot pattern comprises:

a first slot pattern extending in a first axial direction on the pattern region, and configured to radiate a signal of a first operating frequency band; and a second slot pattern extending in a second axial direction perpendicular to the first axial direction from a first point along the first slot pattern, and configured to radiate a signal of a second operating frequency band higher than the first operating frequency band.

2. The vehicle of claim 1, wherein the slot pattern further comprises:

a third slot pattern extending from one end of the first slot pattern and extending in a third axial direction opposite the second axial direction, and configured to feed the signal of the first or second operating frequency band; and a fourth slot pattern extending from an end of the third slot pattern to be parallel to the first slot pattern.

3. The vehicle of claim 2, wherein:

the first slot pattern, the third slot pattern, and the fourth slot pattern are configured to radiate a first signal of the first operating frequency band toward the transparent region of the glass panel, a lower region of the first slot pattern, the second slot pattern, the third slot pattern, and the fourth slot pattern are configured to radiate a second signal of the second operating frequency band toward the transparent region of the glass panel, and the first and second signals of the first and second operating frequency bands, respectively, are Wi-Fi signals or Bluetooth signals.

4. The vehicle of claim 2, wherein:

the slot pattern further comprises a fifth slot pattern extending in the second axial direction from a second point along the first slot pattern and arranged parallel to the second slot pattern, the second slot pattern is configured to radiate a second signal of a first sub-frequency band of the second operating frequency band, and the fifth slot pattern is configured to radiate a third signal of a second sub-frequency band of the second operating frequency band that is higher than the first sub-frequency band.

5. The vehicle of claim 2, wherein the second slot pattern comprises:

a first sub-slot pattern extending from an end of the first slot pattern and formed perpendicular to the first slot pattern; and a second sub-slot pattern extending from an end of the first sub-slot pattern and arranged perpendicular to the first sub-slot pattern and parallel to the first slot pattern, wherein the slot pattern further comprises a fifth slot pattern extending in the second axial direction from a first point along the second sub-slot pattern, wherein the second sub-slot pattern is configured to radiate a second signal of a first sub-frequency band of the second operating frequency band, and wherein the fifth slot pattern is configured to radiate a third signal of a second sub-frequency band of the second operating frequency band that is higher than the first sub-frequency band.

6. The vehicle of claim 2, wherein the second slot pattern comprises:

a first sub-slot pattern extending from an end of the first slot pattern and formed perpendicular to the first slot pattern; and a second sub-slot pattern extending from an end of the first sub-slot pattern and arranged perpendicular to the first sub-slot pattern and parallel to the first slot pattern, wherein the slot pattern further comprises:

a fifth slot pattern formed extending in the second axial direction from an end of the second sub-slot pattern; and a sixth slot pattern extending in the first axial direction from an end of the fifth slot pattern, wherein the second sub-slot pattern of the second slot pattern is configured to radiate a second signal of a first sub-frequency band of the second operating frequency band, and wherein the sixth slot pattern is configured to radiate a third signal of a second sub-frequency band of the second operating frequency band that is higher than the first sub-frequency band.

7. The vehicle of claim 2, wherein a length of the first slot pattern in the first axial direction is in a range including 10 mm, and a length of the second slot pattern in the second axial direction is in a range including 6.8 mm.

8. The vehicle of claim 7, further comprising a feeding pattern formed below a third dielectric substrate where the pattern region is formed, wherein the feeding pattern is configured to apply a signal radiated through the third slot pattern, wherein a width of the third slot pattern is less than a width of the first slot pattern and a width of the second slot pattern.

9. The vehicle of claim 1, wherein the first transparent antenna comprises:

a first conductive pattern comprising a first part and a second part, wherein the first part is perpendicularly connected to the second part, and the second part is electrically connected to a first feeding pattern;

a second conductive pattern electrically connected to a first part of a first ground conductive pattern of the first ground region; and a third conductive pattern electrically connected to a second part of the first ground conductive pattern, wherein:

a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern, wherein the second transparent antenna comprises:

a fourth conductive pattern comprising a third part and a fourth part, wherein the third part is perpendicularly connected to the fourth part, and the fourth part is electrically connected to a second feeding pattern;

a fifth conductive pattern electrically connected to a first part of a second ground conductive pattern; and a sixth conductive pattern electrically connected to a second part of the second ground conductive pattern, wherein:

a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern, and wherein the third conductive pattern faces the sixth conductive pattern.

10. The vehicle of claim 9, wherein:

one end of the pattern region where the slot pattern is formed and an end of the first ground region are spaced apart by a first separation distance, another end of the pattern region and an end of the second ground region are spaced apart by a second separation distance equal to the first separation distance, and the first separation distance and the second separation distance are greater than a distance between the third conductive pattern and the sixth conductive pattern included in the first transparent antenna and the second transparent antenna, respectively.

11. The vehicle of claim 9, wherein:

one end of the pattern region where the slot pattern is formed is a first gap distance from a boundary side of the third conductive pattern included in the first transparent antenna, another end of the pattern region is a second gap distance from a boundary side of the sixth conductive pattern included in the second transparent antenna, wherein the first gap distance is equal to the second gap distance, the first gap distance and the second gap distance are set to $\alpha \times \lambda min$ of a wavelength $\lambda min$, which corresponds to a lowest frequency of the first operating frequency band, and where $\alpha$ denotes a positive real number.

12. The vehicle of claim 9, wherein the first conductive pattern and the third conductive pattern operate in a first dipole antenna mode in a first frequency band, the first conductive pattern and the third conductive pattern form an asymmetrical structure, the fourth conductive pattern and the sixth conductive pattern operate in a second dipole antenna mode in the first frequency band, and the fourth conductive pattern and the sixth conductive pattern form an asymmetric structure.

13. The vehicle of claim 12, wherein:

the first conductive pattern operates in a first monopole antenna mode in a second frequency band higher than the first frequency band, the fourth conductive pattern operates in a second monopole antenna mode in the second frequency band, the slot pattern operates in a first slot mode through the first slot pattern in the first operating frequency band, the second frequency band and the first operating frequency band overlap at least partially with each other, and the third conductive pattern is arranged between the first conductive pattern and the first slot pattern to suppress interference between a first current component in a horizontal direction, formed in the first conductive pattern, and a second current component in a vertical direction, formed in the first slot pattern.

14. The vehicle of claim 13, wherein:

the second conductive pattern operates as a radiator in a third frequency band higher than the second frequency band, the fifth conductive pattern operates as a radiator in the third frequency band, the slot pattern operates in a first slot mode through the second slot pattern in the second operating frequency band, the third frequency band and the second operating frequency band overlap at least partially with each other, and the third conductive pattern is arranged between the second conductive pattern and the second slot pattern to suppress interference between a third current component in a first horizontal direction, formed in the second conductive pattern, and a fourth current component in a second horizontal direction opposite to the first horizontal direction, formed in the second slot pattern.

15. A vehicle comprising:

a metal frame in which an opening is formed;

a glass panel comprising a transparent region and an opaque region; and an antenna assembly disposed on the glass panel, wherein the antenna assembly comprises:

a first dielectric substrate disposed at the transparent region of the glass panel and comprising a first transparent antenna and a second transparent antenna;

a second dielectric substrate comprising a first ground region and a second ground region and arranged at a recess portion of the metal frame and the opaque region of the glass panel; and a third dielectric substrate spaced apart from at least one of the first ground region or the second ground region, wherein the third dielectric substrate comprises a slot pattern formed in a pattern region at one side thereof, wherein the slot pattern comprises:

a first slot pattern formed extending in a first axial direction on the pattern region, and configured to radiate a signal of a first operating frequency band; and a second slot pattern formed extending in a second axial direction perpendicular to the first axial direction from a first point along of the first slot pattern, and configured to radiate a signal of a second operating frequency band higher than the first operating frequency band.

16. The vehicle of claim 15, wherein the slot pattern further comprises:

a third slot pattern extending from one end of the first slot pattern and extending in a third axial direction opposite the second axial direction, and configured to feed the signal of the first or second operating frequency band; and a fourth slot pattern extending from an end of the third slot pattern to be parallel to the first slot pattern.

17. The vehicle of claim 16, wherein:

the first slot pattern, the third slot pattern, and the fourth slot pattern are configured to radiate a first signal of the first operating frequency band toward the transparent region of the glass panel, a lower region of the first slot pattern, the second slot pattern, the third slot pattern, and the fourth slot pattern are configured to radiate a second signal of the second operating frequency band toward the transparent region of the glass panel, and the first and second signals of the first and second operating frequency bands, respectively, are Wi-Fi signals or Bluetooth signals.

18. The vehicle of claim 15, wherein the first transparent antenna comprises:

a first conductive pattern comprising a first part and a second part, wherein the first part is perpendicularly connected to the second part, and the second part is electrically connected to a first feeding pattern;

a second conductive pattern electrically connected to a first part of a first ground conductive pattern of the first ground region; and a third conductive pattern electrically connected to a second part of the first ground conductive pattern, wherein:

a size of the second conductive pattern is smaller than a size of the third conductive pattern, the second conductive pattern is arranged between the first part of the first conductive pattern and the first ground conductive pattern, and the first part of the first conductive pattern and the third conductive pattern are arranged on opposite sides with respect to the second part of the first conductive pattern, wherein the second transparent antenna comprises:

a fourth conductive pattern comprising a third part and a fourth part, wherein the third part is perpendicularly connected to the fourth part, and the fourth part is electrically connected to a second feeding pattern;

a fifth conductive pattern electrically connected to a first part of a second ground conductive pattern; and a sixth conductive pattern electrically connected to a second part of the second ground conductive pattern, wherein:

a size of the fifth conductive pattern is smaller than a size of the sixth conductive pattern, the fifth conductive pattern is arranged between the third part of the fourth conductive pattern and the second ground conductive pattern, and the third part of the fourth conductive pattern and the sixth conductive pattern are arranged on opposite sides with respect to the fourth part of the fourth conductive pattern, and wherein the third conductive pattern faces the sixth conductive pattern.

19. The vehicle of claim 18, further comprising a second slot pattern region formed in a pattern region positioned between the first ground region and the second ground region, wherein:

one end of the pattern region where the slot pattern is formed and an end of the first ground region are spaced apart by a first separation distance, another end of the pattern region where the second slot pattern region is formed and an end of the second ground region are spaced apart by a second separation distance equal to the first separation distance, and the first separation distance and the second separation distance are greater than a distance between the third conductive pattern and the sixth conductive pattern included in the first transparent antenna and the second transparent antenna, respectively.

20. The vehicle of claim 19, wherein:

one end of the pattern region where the slot pattern is formed is a first gap distance from a boundary side of the first conductive pattern included in the first transparent antenna, another end of the pattern region where the second slot pattern region is formed is a second gap distance from a boundary side of the sixth conductive pattern included in the second transparent antenna, wherein the first gap distance is equal to the second gap distance, the first gap distance and the second gap distance are set to $\alpha \times \lambda min$ of a wavelength $\lambda min$, which corresponds to a lowest frequency of the first operating frequency band, and where $\alpha$ denotes a positive real number.

* * * * *